(12) United States Patent
Lee et al.

(10) Patent No.: US 9,212,311 B2
(45) Date of Patent: Dec. 15, 2015

(54) LIQUID-CRYSTAL DISPLAY

(75) Inventors: Seung-Eun Lee, Seoul (KR); Eun Young Kim, Gunpo (KR); Dong-Mee Song, Hwasung (KR); Eun-Kyu Lee, Daejeon (KR)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 13/394,453

(22) PCT Filed: Aug. 13, 2010

(86) PCT No.: PCT/EP2010/004962
§ 371 (c)(1),
(2), (4) Date: Mar. 6, 2012

(87) PCT Pub. No.: WO2011/029510
PCT Pub. Date: Mar. 17, 2011

(65) Prior Publication Data
US 2012/0162595 A1  Jun. 28, 2012

(30) Foreign Application Priority Data
Sep. 8, 2009 (EP) .................................. 09011466

(51) Int. Cl.
*C09K 19/12* (2006.01)
*G02F 1/13* (2006.01)
*C09K 19/54* (2006.01)
*C09K 19/44* (2006.01)
*C09K 19/30* (2006.01)
*G02F 1/1334* (2006.01)
*C09K 19/04* (2006.01)

(52) U.S. Cl.
CPC ............... *C09K 19/542* (2013.01); *C09K 19/12* (2013.01); *C09K 19/3003* (2013.01); *C09K 19/44* (2013.01); *G02F 1/1334* (2013.01); *C09K 2019/0448* (2013.01); *C09K 2019/123* (2013.01); *C09K 2019/124* (2013.01); *C09K 2019/301* (2013.01); *C09K 2019/3004* (2013.01); *C09K 2019/3009* (2013.01); *C09K 2019/3015* (2013.01); *C09K 2019/3016* (2013.01); *C09K 2019/548* (2013.01); *Y10T 29/49117* (2015.01)

(58) Field of Classification Search
None
See application file for complete search history.

(56) References Cited

U.S. PATENT DOCUMENTS

| | | | |
|---|---|---|---|
| 6,329,027 B1 * | 12/2001 | Kondo et al. | 428/1.1 |
| 7,435,459 B2 | 10/2008 | Yanai et al. | |
| 7,635,505 B2 | 12/2009 | Manabe et al. | |
| 7,709,066 B2 | 5/2010 | Matsumura et al. | |
| 7,731,865 B2 | 6/2010 | Bernatz et al. | |
| 7,732,023 B2 | 6/2010 | Saito | |
| 8,114,310 B2 | 2/2012 | Bernatz et al. | |
| 8,133,410 B2 | 3/2012 | Saito et al. | |
| 8,153,021 B2 | 4/2012 | Kibe et al. | |
| 8,182,885 B2 | 5/2012 | Saito et al. | |
| 8,535,768 B2 | 9/2013 | Saito | |
| 2006/0115606 A1 * | 6/2006 | Ichinose et al. | 428/1.1 |
| 2007/0228329 A1 | 10/2007 | Yanai et al. | |
| 2008/0128653 A1 | 6/2008 | Manabe et al. | |
| 2009/0091703 A1 | 4/2009 | Matsumura et al. | |
| 2009/0103011 A1 | 4/2009 | Bernatz et al. | |
| 2009/0147210 A1 | 6/2009 | Saito | |
| 2009/0194738 A1 * | 8/2009 | Manabe et al. | 252/299.61 |
| 2009/0324853 A1 | 12/2009 | Bernatz et al. | |
| 2010/0309423 A1 * | 12/2010 | Bernatz et al. | 349/183 |
| 2011/0062383 A1 | 3/2011 | Kibe et al. | |
| 2011/0095228 A1 | 4/2011 | Saito et al. | |
| 2011/0261312 A1 | 10/2011 | Saito et al. | |
| 2011/0272631 A1 | 11/2011 | Saito | |
| 2012/0032112 A1 * | 2/2012 | Czanta et al. | 252/299.64 |

FOREIGN PATENT DOCUMENTS

| | | |
|---|---|---|
| EP | 2 053 113 A1 | 4/2009 |
| JP | 2005248182 A | 9/2005 |
| JP | 2009084560 A | 4/2009 |
| JP | 2009102639 A | 5/2009 |
| JP | 2009155642 A | 7/2009 |
| JP | 2011529129 A | 12/2011 |
| WO | 2008138643 A1 | 11/2008 |
| WO | 2009028367 A1 | 3/2009 |
| WO | 2009028368 A1 | 3/2009 |
| WO | 2009028443 A1 | 3/2009 |
| WO | WO 2009030329 A1 * | 3/2009 |
| WO | 2010012363 A1 | 2/2010 |
| WO | 2010084823 A1 | 7/2010 |
| WO | WO 2010089092 A1 * | 8/2010 |

OTHER PUBLICATIONS

International Search Report, issued on Oct. 29, 2010 in corresponding PCT/EP2010/004962.
English Translation of JP 2005248182—publication date Sep. 15, 2009.

* cited by examiner

*Primary Examiner* — Cynthia H Kelly
*Assistant Examiner* — Anna Malloy
(74) *Attorney, Agent, or Firm* — Csaba Henter; Anthony Zelano; John Sopp

(57) ABSTRACT

The present invention relates to the use of LC (liquid-crystal) compounds and LC media comprising them in LC displays of the PS (polymer stabilized) or PSA (polymer sustained alignment) type.

25 Claims, No Drawings

LIQUID-CRYSTAL DISPLAY

The present invention relates to the use of LC (liquid-crystal) compounds and LC media comprising them in LC displays of the PS (polymer stabilised) or PSA (polymer sustained alignment) type.

BACKGROUND OF THE INVENTION

The LC displays used at present are mostly those of the TN (twisted nematic) type. However, these have the disadvantage of a strong viewing-angle dependence of the contrast.

In addition, so-called VA (vertical alignment) displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the electrodes, a realignment of the LC molecules parallel to the electrode surfaces takes place.

Furthermore, OCB (optically compensated bend) displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are IPS (in-plane switching) displays, which contain an LC layer between two substrates, but wherein the two electrodes are located only on one of the substrates, usually with comb-shaped, interdigital structures. When applying a voltage to the electrodes, an electric field which has a significant component parallel to the LC layer is thereby generated. This causes realignment of the LC molecules in the layer plane. Furthermore, so-called FFS (fringe field switching) displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of a structured (comb-shaped) electrode, and the other electrode is unstructured. A strong, so-called "fringe field" is thereby generated, i.e. a strong electric field close to the edge of the electrodes, and, throughout the cell, an electric field which has both a strong vertical component and a strong horizontal component. Both IPS displays and also FFS displays have a low viewing-angle dependence of the contrast.

In VA displays of the more recent type, uniform alignment of the LC molecules is restricted to a plurality of relatively small domains within the LC cell. Disclinations can exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes. In so-called MVA (multidomain vertical alignment) displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In the so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences (tapping, etc.). For many applications, such as, for example, monitors and especially TV screens, however, a shortening of the response times and an improvement in the contrast and luminance (transmission) of the display are desired.

A further development are the so-called PS (polymer sustained) or PSA (polymer sustained alignment) displays, also known as "polymer stabilised" displays. In these, a small amount (for example 0.3% by weight, typically <1% by weight) of a polymerisable compound is added to the LC medium and, after introduction into the LC cell, is polymerised or crosslinked in situ, usually by UV photopolymerisation, optionally with an electrical voltage applied between the electrodes. The addition of polymerisable mesogenic or liquid-crystalline compounds, also known as "reactive mesogens" (RMs), to the LC mixture has proven particularly suitable.

In the meantime, the PS or PSA principle is being used in diverse classical LC displays. Thus, for example, PSA-VA, PSA-OCB, PS-IPS and PS-TN displays are known. In PSA-VA and PSA-OCB displays polymerisation is usually carried out while a voltage is applied to the electrodes, whereas in PSA-IPS displays polymerisation it is carried out with or without, preferably without application of a voltage. As can be demonstrated in test cells, the PSA method results in a pretilt in the cell. In the case of PSA-OCB displays, it is therefore possible for the bend structure to be stabilised so that an offset voltage is unnecessary or can be reduced. In the case of PSA-VA displays, this pretilt has a positive effect on response times. For PSA-VA displays, a standard MVA or PVA pixel and electrode layout can be used. In addition, however, it is possible, for example, to manage with only one structured electrode side and no protrusions, which significantly simplifies production and at the same time results in very good contrast at the same time as very good transparency to light.

PSA-VA displays are described, for example, in JP 10-036847 A, EP 1 170 626 A2, U.S. Pat. No. 6,861,107, U.S. Pat. No. 7,169,449, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

PSA displays, like the conventional displays described above, can be operated either as active matrix or passive matrix displays. In active matrix type displays the individual pixels are usually addressed by integrated, non-linear active elements like for example thin film transistors (TFT), in passive matrix type displays by multiplexing, with both methods being well-known from prior art.

In particular for monitor and especially TV applications, optimisation of the response times, but also of the contrast and luminance (i.e. also transmission) of the LC display, is still demanded. The PSA process still appears to provide crucial advantages here. In particular in the case of PSA-VA, a shortening of the response times, which correlate with a measurable pretilt in test cells, can be achieved without a significant adverse effects on other parameters.

However, it has been found that the LC mixtures and RMs known from the prior art still have some disadvantages on use in PSA displays. Thus, not every desired soluble RM is also suitable for PSA displays, and it often appears difficult to find more suitable selection criteria than the direct PSA experiment with pretilt measurements. The choice becomes even smaller if polymerisation by means of UV light without the addition of photoinitiators is desired, which may be advantageous for certain applications.

In addition, the selected material system of LC mixture (also referred to as "LC host mixture") and polymerisable component should have the best possible electrical properties, in particular a high "voltage holding ratio" (HR or VHR). A high HR after irradiation with UV light is important especially for use in a PSA display, because UV irradiation is an indispensable part of its manufacturing process, although it can also occur as "normal" stress in the finished display.

However, the problem arises that not every combination of LC mixture and polymerisable component works is suitable for use in PSA displays since, for example, an inadequate tilt or no tilt at all is established or since, for example, the HR is inadequate for TFT display applications.

In particular it is desired to have available novel and improved materials for PSA displays which enable the generation of a small pretilt. Especially desired are materials which will, during polymerisation, either generate a smaller pretilt after the same UV irradiation time as used for prior art materials, and/or generate the same pretilt as the prior art materials already after shorter exposure time. This allows to reduce the manufacturing time (tact time) and the manufacturing costs for the display.

Another problem when manufacturing PSA displays ist the presence and removal of unreacted RMs after the polymerisation step used for tilt angle generation. Such unreacted RMs can negatively affect the display properties and performance, for example by uncontrolled polymerisation in the display during its operation.

Thus, PSA displays of prior art often show the undesired "image sticking" or "image burn" effect, wherein the image generated in the display by addressing selected pixels remains visible, even when the voltage for this pixel has been switched off, or when other pixels have been addressed.

Image sticking can occur for example when using LC host mixtures with a low HR, wherein the UV component of ambient light or emitted by the display backlight can induce undesired cleavage reactions in the LC molecules. This can lead to ionic impurities which are enriched at the electrodes or alignment layers, where they cause a reduction of the effective voltage applied to the display. This effect is also known for conventional displays not containing a polymeric component.

In PSA displays an additional image sticking effect can be observed which is caused by the presence of residual unpolymerised RMs. In such displays the UV component of ambient light or emitted by the backlight causes undesired spontaneous polymerisation of the unreacted RMs. In the addressed pixels this can change the tilt angle after several addressing cycles, thereby causing a change of the transmission, whereas in the unaddressed pixels the tilt angle and transmission remain unaffected.

It is therefore desirable that the polymerisation reaction when manufacturing the PSA display is as complete as possible, and that the amount of residual unpolymerised RMs in the PSA display after its manufacture is as low as possible.

For these purposes RMs and LC host mixtures are desired which enable a complete and effective polymerisation reaction. In addition it is desired to achieve a controlled polymerisation of any residual amounts of unreacted RMs that are still present in the display. Also, RMs and LC host mixtures are desired that enable a faster and more effective polymerisation than the materials currently known.

Another problem is that conventional RMs used for manufacturing PSA displays by UV photopolymerisation often show maximum UV absorption at short wavelengths, especially below 300 nm. However, in the manufacturing process of PSA displays it is desired to avoid exposure to UV radiation of such short wavelengths, because these "hard UV components" are hazardous and increase the risk of damaging the various materials and components used in the display. Therefore, display manufacturers preferably use UV exposure systems of longer wavelengths, especially over 320 nm or even over 350 nm.

It is therefore desired to have available materials and material combinations, especially RMs and LC host mixtures, for use in PS or PSA displays, which are suitable to solve the above-mentioned problems. In particular, the materials should provide one or more of the following improvements:
  enable effective polymerisation using longer UV wavelengths, especially of 320 nm or more, preferably 350 nm or more,
  provide better protection against negative influence of the UV irradiation used for photopolymerisation of the RMs,
  generally provide improved UV stability,
  allow a faster and more effective polymerisation reaction,
  reduce the amount of residual unpolymerised RMs in the display,
  enable the faster generation of small tilt angles and/or the generation of smaller tilt angles compared to PSA displays and materials of prior art,
  reduce the image sticking in the PSA display.

It was an aim of the present invention to provide novel PSA displays and novel materials for use in PSA displays, in particular LC host mixtures and RMs, which are suitable for solving the above-mentioned problems, do not have the disadvantages described above, or only do so to a smaller extent, and provide one or more of the above-mentioned improvements and advantages.

In addition, the PSA displays should have high specific resistance at the same time as a large working-temperature range, short response times, even at low temperatures, and a low threshold voltage, which facilitate a large number of grey shades, high contrast and a wide viewing angle, and have high values for the HR after UV exposure. In PSA displays for mobile applications, the LC media should show low threshold voltage and high birefringence.

Surprisingly, it has now been found that these objects can be achieved by using LC compounds, LC mixtures and LC media according to the present invention as described hereinafter in PSA displays. In particular, it has surprisingly been found that, when using LC host mixtures containing specific terphenyl or quaterphenyl compounds in combination with RMs, it is possible to polymerise the RMS at higher wavelength and with UV radiation dosage, provide improved protection against hazardous and damaging UV light, enable photopolymerization with longer UV wavelengths, and achieve photopolymerisation of the RMs that is faster, more effective and more complete, compared to LC host mixtures of prior art. Also, it enables a faster generation of the pretilt angle and a reduction of the UV exposure time and/or UV intensity and/or UV radiation dose, allowing a more time- and cost-effective manufacturing process. Also, it allows to reduce the residual amount of unreacted RMs and to suppress the image sticking effect.

SUMMARY OF THE INVENTION

The invention relates to the use of compounds of formula I,

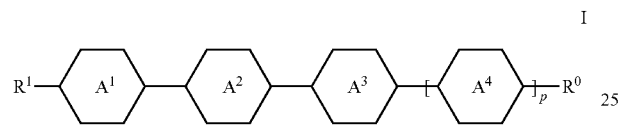

in which the individual radicals have the following meanings

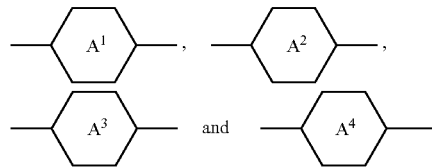

denote independently of each other

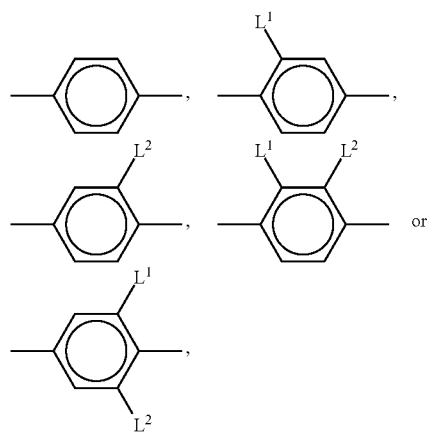

$R^1$ denotes alkyl or alkenyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $R^0$ has one of the meanings given for $R^1$ or denotes $X^0$, $X^0$ is F, Cl, halogenated alkyl or alkoxy having 1 to 6 C atoms, or halogenated alkenyl or alkenyloxy having 2 to 6 C atoms, $L^1$ and $L^2$ each, independently of one another, denote F, Cl, $OCF_3$, $CF_3$, $CH_3$, $CH_2F$, $CHF_2$, preferably F or Cl, most preferably F, p denotes 0 or 1, or of an LC mixture comprising one or more compounds of formula I, in an LC medium that further contains one or polymerisable compounds or RMs (reactive mesogens), preferably for use in LC displays, very preferably for use in PS (polymer sustained) or PSA (polymer sustained alignment) displays.

The invention further relates to an LC mixture comprising one or more compounds of formula I, and to its use in LC displays, especially in PS or PSA displays.

The invention further relates to an LC medium comprising one or more compounds of formula I, or comprising an LC mixture containing one or more compounds of formula I, and further comprising one or polymerisable compounds or RMs, and to its use in displays, especially in PS or PSA displays.

Especially preferred is an LC medium comprising
a polymerisable component A), comprising one or more polymerisable compounds, preferably selected from RMs, and
a liquid crystal component B), preferably having a nematic phase, comprising one or more compounds of formula I, preferably selected from LC mixtures as described above and below.

The invention further relates to a method of preparing an LC medium as described above and below, by mixing one or more compounds of formula I with one or more polymerisable compounds or RMs and optionally with one or more further liquid-crystalline compounds and/or additives.

The invention further relates to an LC display comprising one or more compounds of formula I, or an LC mixture or LC medium comprising them, as described above and below, which is preferably a PS or PSA display.

Especially preferred PS and PSA displays are PSA-VA, PSA-OCB, PS-IPS, PS-FFS and PS-TN displays, very preferred PSA-VA and PSA-IPS displays.

The invention further relates to an LC medium, its use in PS and PSA displays, and to PS and PSA displays comprising it as described above and below, wherein the polymerisable component(s) or polymerisable compound(s) or RM(s) is (are) polymerised.

The invention further relates to the use of compounds of formula I and LC mixtures comprising them, in an LC medium comprising one or more polymerisable compounds, for the generation of a pretilt angle in the LC medium by in situ polymerisation of the polymerisable compound(s) under application of a voltage.

The invention further relates to a PS or PSA display containing a display cell comprising two substrates and two electrodes, wherein at least one substrate is transparent to light and at least one substrate has one or two electrodes provided thereon, and a layer of an LC medium comprising a polymerised component and a low-molecular-weight component located between the substrates, wherein the polymerised component is obtainable by polymerisation of one or more polymerisable compounds between the substrates of the display cell in the LC medium, preferably while applying a voltage to the electrodes, and wherein the low-molecular-weight component is an LC mixture comprising one or more compounds of formula I as described above and below.

The invention further relates to a method of producing a PS or PSA display as described above and below, by providing an LC medium comprising one or more polymerisable compounds and an LC mixture comprising one or more compounds of formula I as described above and below into a display cell comprising two substrates and two electrodes, wherein at least one substrate is transparent to light and at least one substrate has one or two electrodes provided thereon, and polymerising one or more of the polymerisable compounds, preferably while applying a voltage to the electrodes.

The PS and PSA displays of the present invention contain two electrodes, preferably as transparent layers, wherein these two electrodes are provided on one or both of the two substrates forming the display cell.

Thus, either one electrode is provided on each of the two substrates, for example in displays of the VA type, or the two electrodes are both provided on one substrate and no electrode is provided on the other substrate, for example in displays of the IPS or FFS type.

DEFINITION OF TERMS

Unless stated otherwise, the term "PSA" is used above and below for both PS and PSA displays.

The terms "tilt" and "tilt angle" refer to a tilted or inclined orientation of the LC molecules in an LC mixture or LC medium relative to the surface of the cell walls in an LC display. The tilt angle herein means the average angle (<90°) between the molecular long axes of the LC molecules (LC director) and the surface of the plane parallel substrates forming the LC cell. A low value of the tilt angle (i.e. a large deviation from 90°) herein corresponds to a large tilt. A suitable method for measuring the tilt angle is described in the example section. Unless stated otherwise, the tilt angle values as given above and below refer to this measurement method.

The term "reactive mesogen" or "RM" denotes a compound containing a mesogenic group and one or more functional groups which are suitable for polymerisation (also known as polymerisable group or group P).

The LC mixture or LC component B) as described above and below, which contains the compounds of formula I and optionally contains further liquid crystalline or mesogenic compounds, but does not contain polymerisable or polymerised compounds, is hereinafter also referred to as "(LC) host mixture or "(LC) low-molecular-weight component".

The terms "low-molecular-weight" and "unpolymerisable" denote compounds, usually monomeric, which do not contain any functional group which is suitable for polymerisation under the usual conditions known to the person skilled in the art, in particular under the conditions applied during polymerisation of the polymerisable compounds and RMs as used in the LC media of the present invention.

The terms "nematic component" and "nematic LC mixture" as used hereinafter mean an LC mixture which has a nematic LC phase, but may in addition have other LC phases (like e.g. a smectic phase), but very preferably means an LC mixture that has only a nematic LC phase and no other LC phases.

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups ("mesogenic compounds") do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp", is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the terms "spacer group" or "spacer" above and below denotes a flexible group which connects the mesogenic group and the polymerisable group(s) to one another in a polymerisable mesogenic compound or RM.

DETAILED DESCRIPTION OF THE INVENTION

The LC media for use in the PSA displays according to the present invention contain one or more polymerisable compounds or RMs, which are preferably polymerisable by exposure to photoradiation, very preferably UV radiation. In addition, the LC media preferably contain an LC mixture comprising one or more compounds of formula I and one or more further compounds selected from mesogenic or liquid crystalline compounds, preferably selected from nematic or nematogenic compounds. The LC mixture preferably consists only of low-molecular-weight (i.e. monomeric or unpolymerised) compounds, which are stable or unreactive to a polymerisation reaction under the conditions used for the polymerisation of the polymerisable compounds or RMs.

The polymerisable compounds are preferably selected from RMs.

The LC host mixture is preferably a nematic LC mixture.

Preferably the LC media according to the present invention do essentially consist of one or more polymerisable compounds and an LC host mixture as described above and below. However, the LC media or LC host mixtures may additionally comprise one or more further components or additives, for example selected from chiral dopants, polymerisation initiators, inhibitors, stabilizers, surfactants, nanoparticles etc.

The concentration of the compounds of formula I in the LC host mixture (i.e. without any polymerisable components) is preferably from 0.1 to 30%, very preferably from 0.5 to 25%, most preferably from 0.5 to 12%. Especially preferred are LC mixtures containing from 0.5 to 5% of one compound of formula I, or LC mixtures containing from 0.5 to 12% of two or more compounds of formula I.

Especially preferred are LC mixtures containing 1 to 5, preferably 1, 2 or 3 compounds of formula I.

The invention further relates to novel LC mixtures as described above and below, which do not contain a polymerisable compound, but do essentially consist of unpolymerisable or low-molecular-weight compounds. These LC mixtures can be used in classic displays of the VA type, like VA- and MVA-displays. The invention further relates to LC displays, preferably VA and MVA displays containing such an LC mixture.

The compounds of formula I, and the LC mixtures and LC media comprising them are especially suitable for use in PS or PSA displays, and in particular provide one or more of the following improvements:

PSA displays can be manufactured by using longer UV wavelengths, preferably of 320 nm or more, very preferably of 350 nm or more, one or more of the UV exposure time, the UV radiation intensity, the UV radiation energy and the UV radiation dose can be reduced, better protection against negative influence of the UV irradiation used for photopolymerisation of the RMs is provided, the overall UV stability of the LC medium and the LC display are improved, the polymerisation reaction can carried out faster and more effective, and the extent of polymerisation of the RMS can be increased, thereby also reducing the amount of residual unpolymerised RMs in the display, the same small tilt angles as in displays using materials of prior art can be generated faster, and/or smaller tilt angles can be generated than in PSA displays using materials of prior art, the image sticking in the PSA display can be reduced.

It was also observed that the compounds of formula I in the polymerisable LC media act like a sensitizer, by transferring the UV radiation energy and activate the polymerisation of the RMs.

In addition, the LC media and LC mixtures of the present invention have high specific resistance values and a good low temperature stability (LTS) against undesired spontaneous crystallization, and when used in PSA displays, exhibit adequate tilt angles, even without the use of a photoinitiator. The LC mixtures and LC media according to the present invention are also advantageous as they show significantly lower threshold voltage and a higher birefringence compared to displays comprising LC mixtures as disclosed in prior art. They are therefore especially suitable for use in displays for mobile applications.

A first preferred embodiment of the present invention relates to a first subgroup consisting of compounds of formula I, which comprise one or more rings selected from

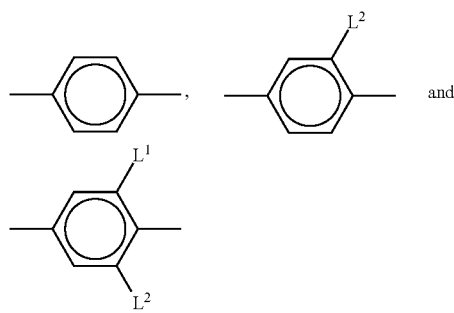

wherein $L^1$ and $L^2$ have the meanings given in formula I, and wherein $R^0$ denotes $X^0$, and p is 0 or 1. The compounds of this first sub-group preferably have a positive dielectric anisotropy $\Delta\epsilon > 1.5$.

Preferably in the compounds of this first sub-group the rings

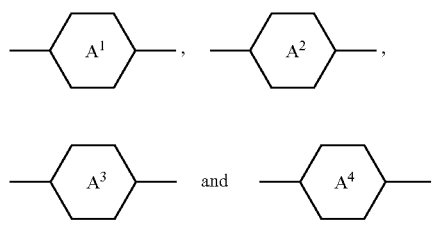

are selected from the group consisting of the following rings

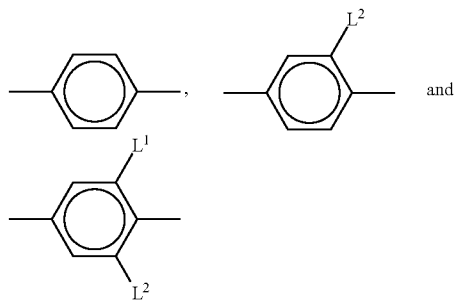

wherein $L^1$ and $L^2$ have the meanings given in formula I.

Very preferably the compounds of this first sub-group contain one or more rings

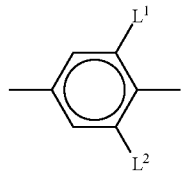

and/or two or more rings

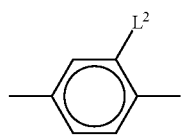

wherein $L^1$ and $L^2$ have the meanings given in formula I.

A second preferred embodiment of the present invention relates to a second sub-group consisting of compounds of formula I, which comprise one or more rings selected from

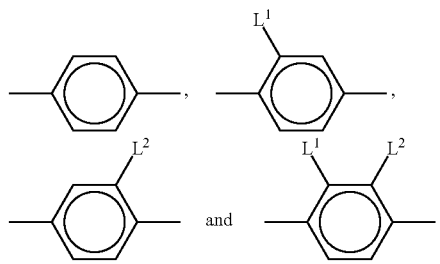

wherein $L^1$ and $L^2$ have the meanings given in formula I, and wherein $R^0$ has one of the meanings of $R^1$, and p is 0 or 1, preferably 1. The compounds of this second sub-group are dielectrically neutral, or more preferably have a negative dielectric anisotropy $\Delta\epsilon < -1.5$.

Preferably in the compounds of this second sub-group the rings

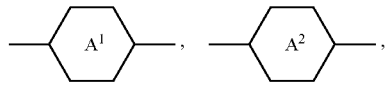

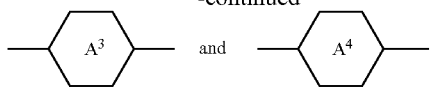 and 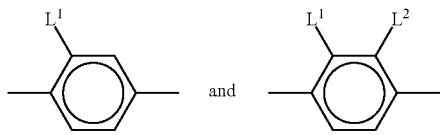

are selected from the group consisting of the following rings

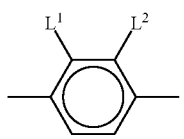 and 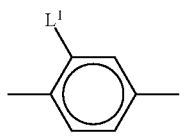

wherein $L^1$ and $L^2$ have the meanings given in formula I.

Very preferably the compounds of this second sub-group contain one or more rings

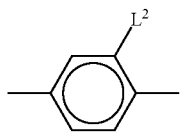

and/or one or more rings and not more than one ring wherein $L^1$ and $L^2$ have the meanings given in formula I.

Above and below, "dielectrically neutral" means compounds having a dielectric anisotropy $\Delta\epsilon$ from −1.5 to +1.5, Especially preferred are compounds of formula I and of the preferred embodiments as described above and below, wherein $L^1$ and $L^2$ denote F or Cl, preferably F, p is 0, p is 1, $R^1$ is straight chain alkyl or alkoxy having 1 to 6 C atoms or straight chain alkenyl having 2 to 6 C atoms, $R^0$ has one of the meanings of $R^1$, $R^0$ denotes $X^0$, and is preferably selected from F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or $CH=CF_2$, very preferably F or $OCF_3$, most preferably F.

The compounds of the first sub-group are preferably selected from the group consisting of the following sub-formulae:

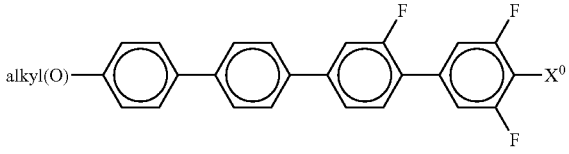

IA1

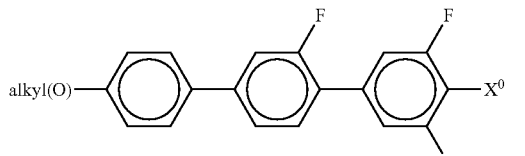

IA2

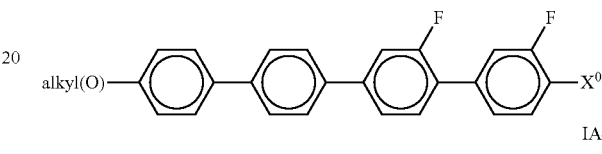

IA3

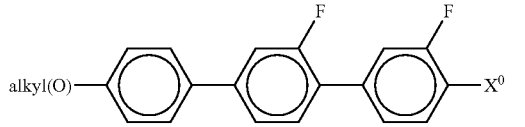

IA4 wherein alkyl denotes a straight-chain alkyl radical with 1 to 6 C atoms, (O) denotes an O atom or a single bond, and $X^0$ denotes F or $OCF_3$, preferably F.

Especially preferred are compounds of formula IA1 and IA2.

The compounds of the second sub-group are preferably selected from the group consisting of the following sub-formulae:

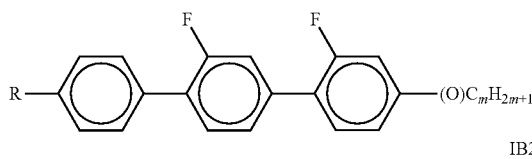

IB1

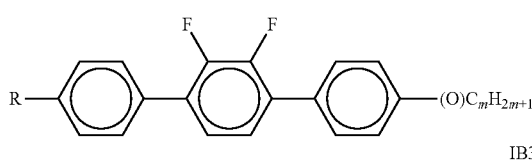

IB2

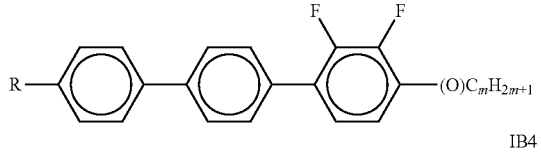

IB3

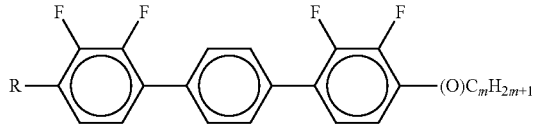

IB4

IB5
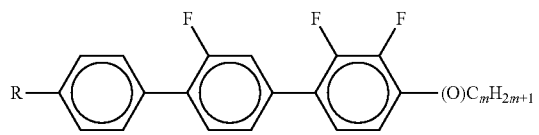
IB6
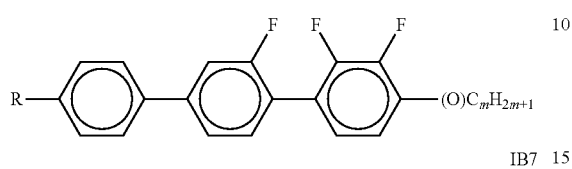
IB7
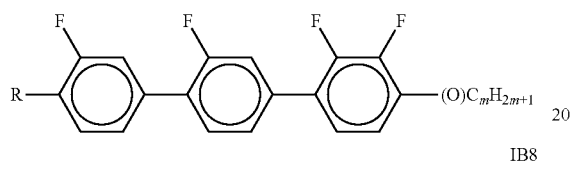
IB8
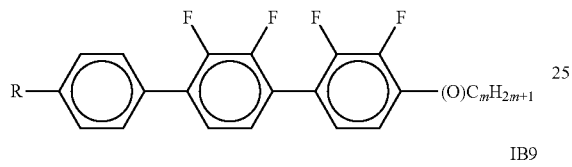
IB9
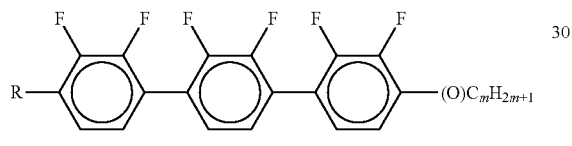
IB10
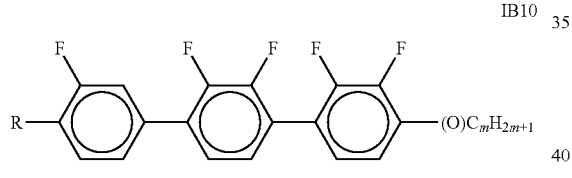
IB11
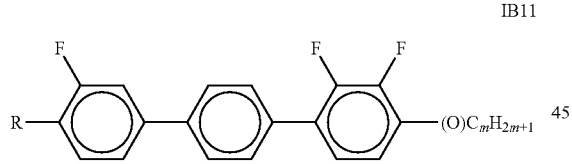
IB12
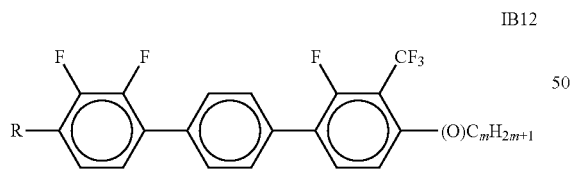
IB13
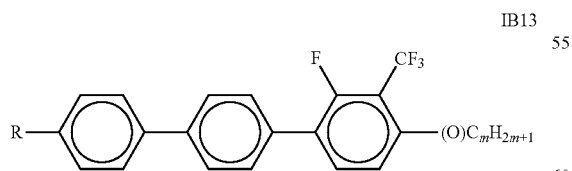
IB14
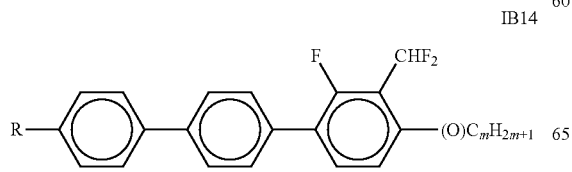
IB15
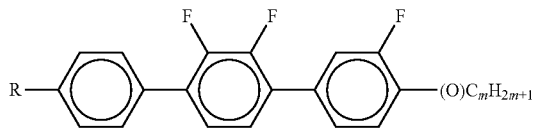
IB16
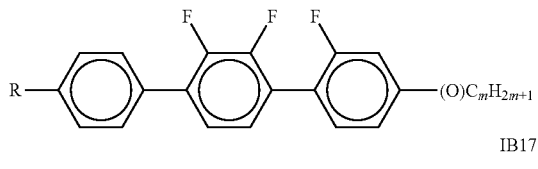
IB17
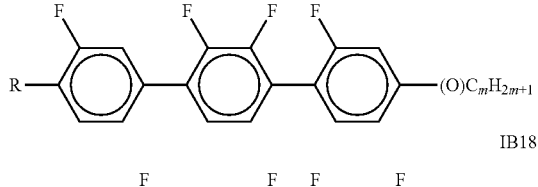
IB18
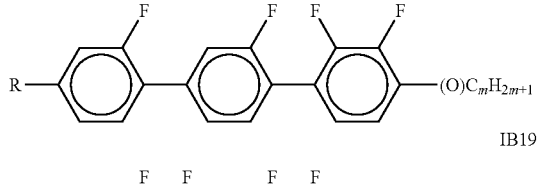
IB19
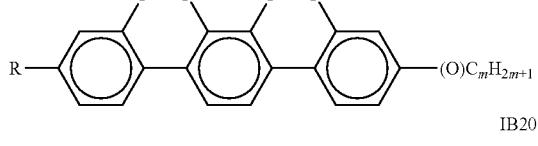
IB20
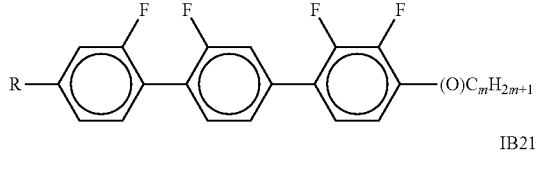
IB21
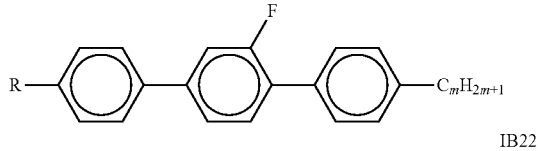
IB22
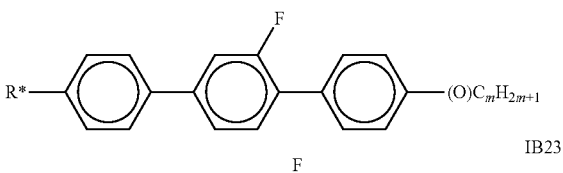
IB23
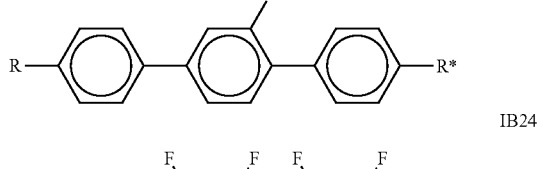
IB24
in which R denotes a straight-chain alkyl or alkoxy radical having 1-7 C atoms, R* denotes a straight-chain alkenyl radical having 2-7 C atoms, (O) denotes an O atom or a single bond, and m denotes an integer from 1 to 6. R* preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

R preferably denotes methyl, ethyl, propyl, butyl, pentyl, hexyl, methoxy, ethoxy, propoxy, butoxy or pentoxy.

Especially preferred are compounds of formula IB1, IB2, IB21, IB22, and IB23, in particular those of formula IB2, IB21 and IB23, wherein R is preferably straight-chain alkyl having 1-7 C atoms and R* is preferably CH$_2$=CHCH$_2$CH$_2$—.

Another preferred embodiment of the present invention relates to an LC mixture, and an LC medium comprising said LC mixture, wherein said LC mixture comprises
one or more compounds selected from the first sub-group as described above (preferably compounds having positive Δ∈), preferably in a concentration from 0.5 to 5%, and
one or more compounds selected from the second sub-group as described above (preferably compounds being dielectrically neutral or having negative Δ∈), preferably in a concentration from 0.5 to 12%.

A preferred LC mixture according to this preferred embodiment comprises one or more compounds selected from the group consisting of formulae IA1-IA4, and one or more compounds selected from the group consisting of formulae IB1-IB21.

A very preferred LC mixture according to this preferred embodiment comprises one or more compounds of formula IA1, wherein preferably X$^0$ is F, and one or more compounds of formula IB2, wherein preferably R is a straight-chain alkyl radical having 1-7 C atoms and (O) is a single bond.

Another preferred embodiment of the present invention relates to an LC medium comprising
one or more polymerisable compounds or RMs, and
one or more compounds of formula I, preferably wherein p is 1 (quaterphenyls), very preferably selected from the first sub-group as described above (preferably compounds with positive Δ∈), or an LC mixture containing such compounds,
and to the use of such an LC medium in a process for preparing a PSA display as described above and below, wherein the polymerisable compounds are polymerised by irradiation with UV light having a wavelength of 320 nm or more, preferably 330 nm or more, very preferably 350 nm or more, and preferably 400 nm or less.

This preferred process can be carried out for example by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 320 nm is desired, UV exposure can be carried out using a cut-off filter being substantially transmissive for wavelengths λ>320 nm.

"Substantially transmissive" means that the filter transmits a substantial part, preferably at least 50% of the intensity, of incident light of the desired wavelength(s). "Substantially blocking" means that the filter does not transmit a substantial part, preferably at least 50% of the intensity, of incident light of the undesired wavelengths. "Desired (undesired) wavelength" e.g. in case of a band pass filter means the wavelengths inside (outside) the given range of λ, and in case of a cut-off filter means the wavelengths above (below) the given value of λ.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

Especially preferred LC media and LC host mixtures are indicated below:
a) LC host mixture comprising one or more compounds selected from the following formulae:

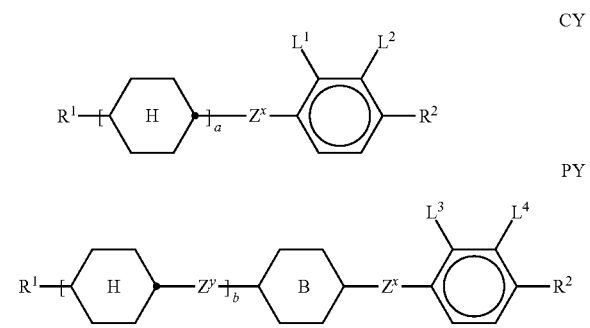

wherein the individual radicals have the following meanings
a denotes 1 or 2,
b denotes 0 or 1,

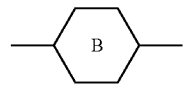

denotes

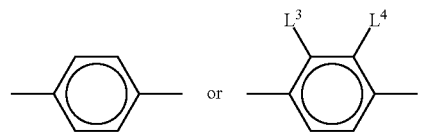

R$^1$ and R$^2$ each, independently of one another, denote alkyl or alkenyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another, preferably alkyl or alkoxy having from 1 to 6 C atoms,
Z$^x$ and Z$^y$ each, independently of one another, denote —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O—, or a single bond, preferably a single bond,
L$^{1-4}$ each, independently of one another, denote F, Cl, OCF$_3$, CF$_3$, CH$_3$, CH$_2$F, CHF$_2$, preferably F or Cl.
Especially preferably both L$^1$ and L$^2$ denote F, or one of L$^1$ and L$^2$ denote F and the other denotes Cl. Further preferably both L$^3$ and L$^4$ denote F, or one of L$^3$ and L$^4$ denote F and the other denotes Cl.

The compounds of formula CY are preferably selected from the following sub-formulae:
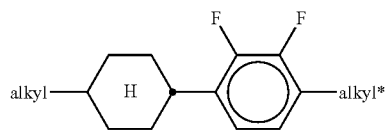
CY1
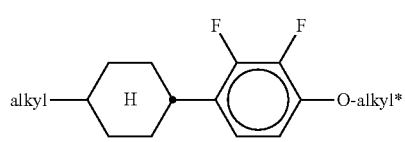
CY2
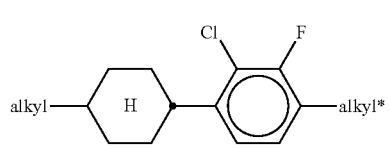
CY3
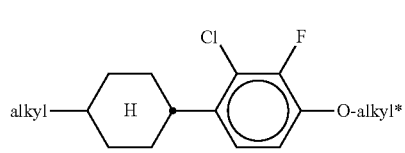
CY4
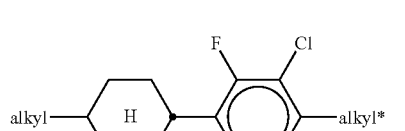
CY5
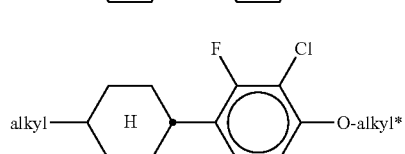
CY6
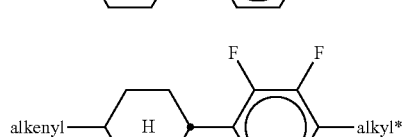
CY7
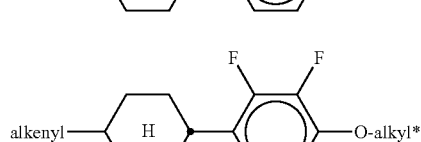
CY8
CY9
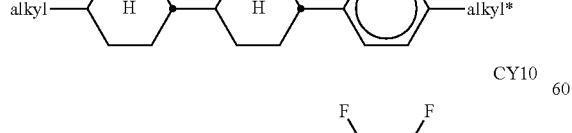
CY10
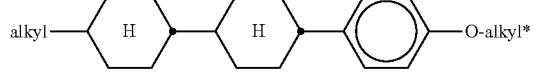
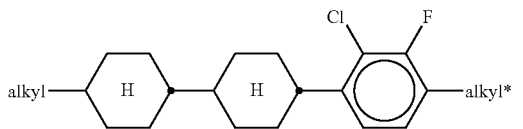
CY11
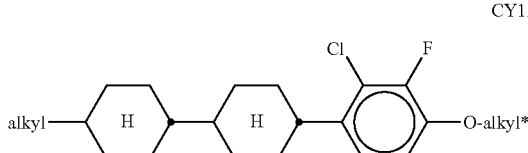
CY12
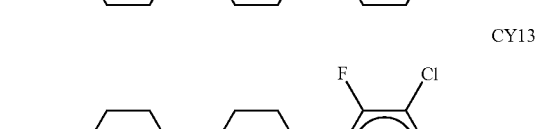
CY13
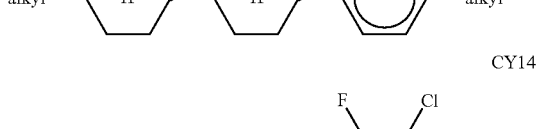
CY14
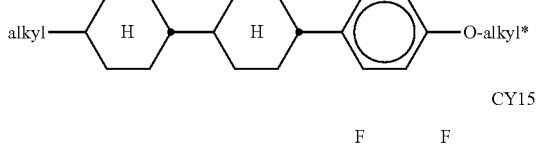
CY15
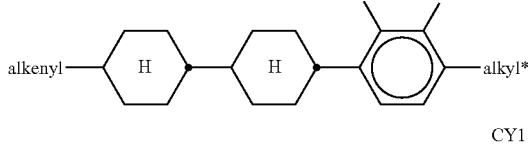
CY16
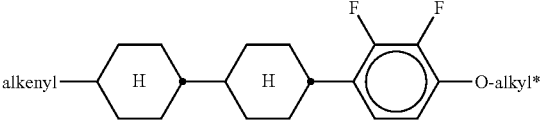
CY17
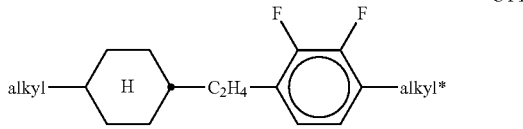
CY18
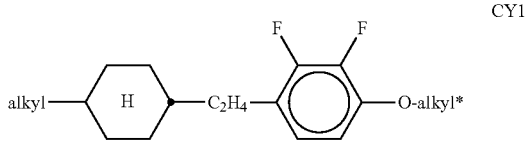
CY19
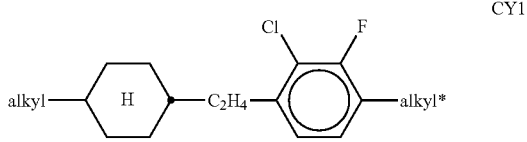
CY20

-continued

CY21 alkyl—[H]—C₂H₄—⟨F,Cl⟩—alkyl*

CY22 alkyl—[H]—C₂H₄—⟨F,Cl⟩—O-alkyl*

CY23 alkyl—[H]—[H]—CF₂O—⟨F,F⟩—O-alkyl*

CY24 alkyl—[H]—[H]—OCF₂—⟨F,F⟩—O-alkyl*

CY25 alkyl—[H]—CF₂O—⟨F,F⟩—(O)alkyl*

CY25 alkyl—[H]—OCF₂—⟨F,F⟩—(O)alkyl*

CY26 alkyl—([H])ₐ—CH=CHCH₂O—⟨F,F⟩—(O)alkyl*

CY27 alkyl—([H])ₐ—CF₂O—⟨F,Cl⟩—(O)alkyl*

CY28 alkyl—([H])ₐ—CF₂O—⟨Cl,F⟩—(O)alkyl* in which a denotes 1 or 2, alkyl and alkyl* each, independently of one another, denote a straight-chain alkyl radical having 1-6 C atoms, alkenyl denotes a straight-chain alkenyl radical having 2-6 C atoms, and (O) denotes an O atom or a single bond. Alkenyl preferably denotes CH₂=CH—, CH₂=CHCH₂CH₂—, CH₃—CH=CH—, CH₃—CH₂—CH=CH—, CH₃—(CH₂)₂—CH=CH—, CH₃—(CH₂)₃—CH=CH— or CH₃—CH=CH—(CH₂)₂—.

The compounds of formula PY are preferably selected from the following sub-formulae:

PY1 alkyl—⟨⟩—⟨F,F⟩—alkyl*

PY2 alkyl—⟨⟩—⟨F,F⟩—O-alkyl*

PY3 alkyl—⟨⟩—⟨Cl,F⟩—alkyl*

PY4 alkyl—⟨⟩—⟨Cl,F⟩—O-alkyl*

PY5 alkyl—⟨⟩—⟨F,Cl⟩—alkyl*

PY6 alkyl—⟨⟩—⟨F,Cl⟩—O-alkyl*

PY7 alkenyl—⟨⟩—⟨F,F⟩—alkyl*

PY8 alkenyl—⟨⟩—⟨F,F⟩—O-alkyl*

PY9 alkyl—[H]—⟨⟩—⟨F,F⟩—alkyl*

PY10 alkyl—[H]—⟨⟩—⟨F,F⟩—O-alkyl*

-continued

PY11
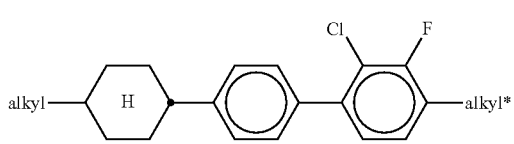

PY12
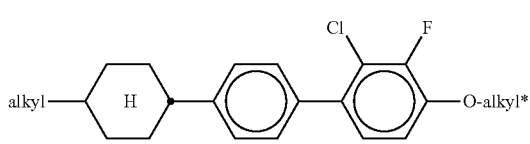

PY13
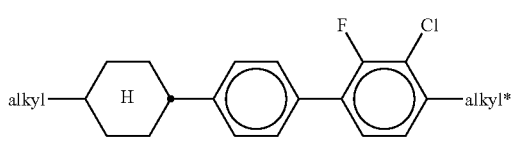

PY14
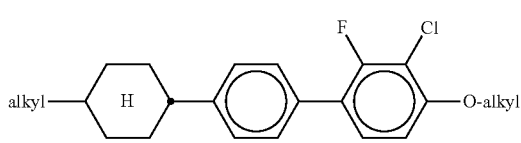

PY15
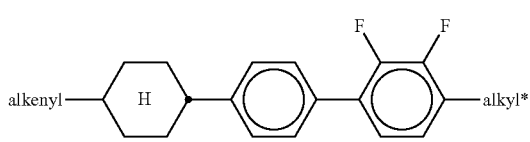

PY16
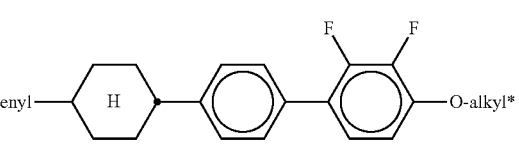

PY17
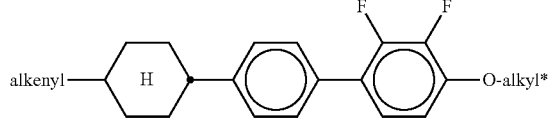

PY18
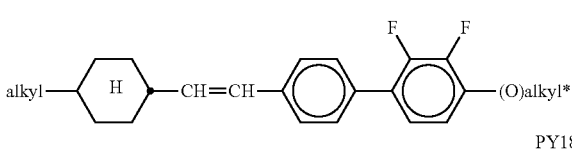

PY19
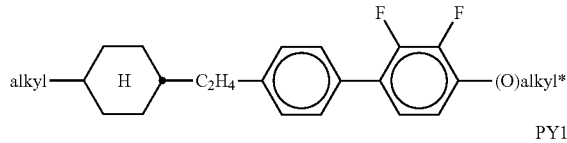

PY20
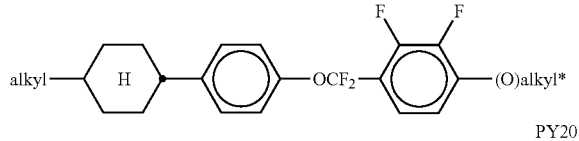

in which alkyl and alkyl* each, independently of one another, denote a straight-chain alkyl radical having 1-6 C atoms, alkenyl denotes a straight-chain alkenyl radical having 2-6 C atoms, and (O) denotes an O atom or a single bond. Alkenyl preferably denotes $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

b) LC host mixture which comprises one or more compounds of the following formula:

ZK
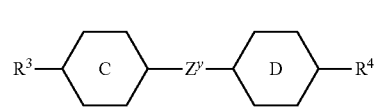

in which the individual radicals have the following meanings:

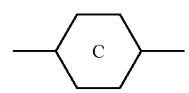

denotes

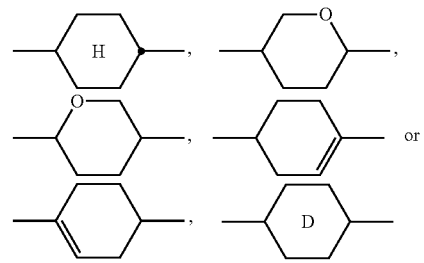

denotes

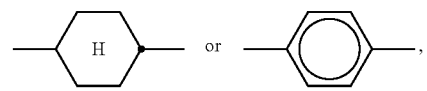

$R^3$ and $R^4$ each, independently of one another, denote alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $Z^y$ denotes —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —CH=$CHCH_2O$— or a single bond, preferably a single bond.

The compounds of the formula ZK are preferably selected from the following sub-formulae:

ZK1
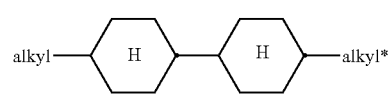

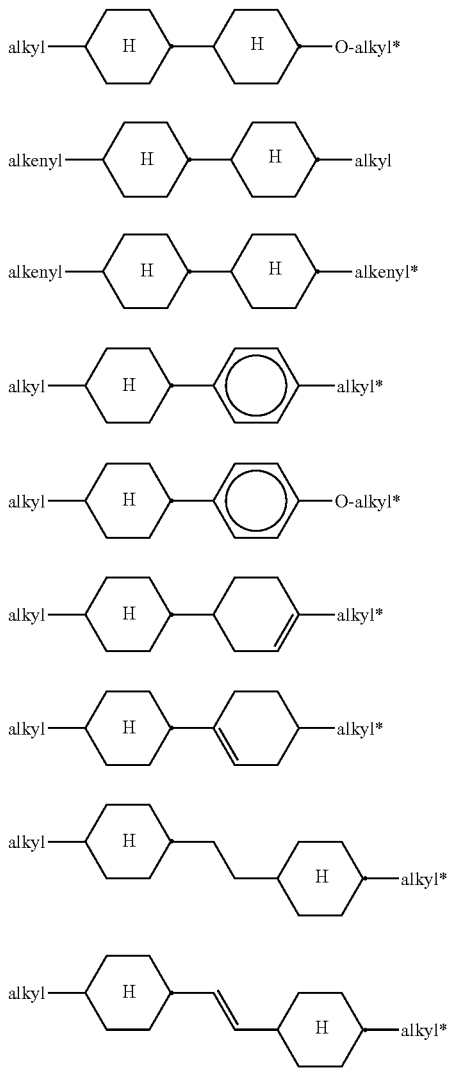

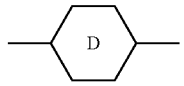

denotes

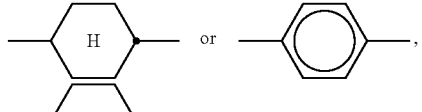

denotes

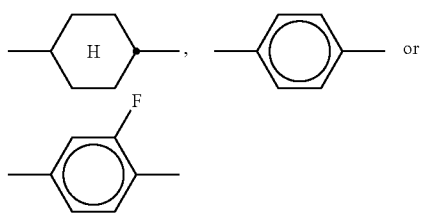

and e denotes 1 or 2.

The compounds of the formula DK are preferably selected from the following sub-formulae:

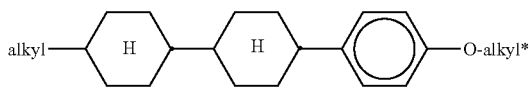

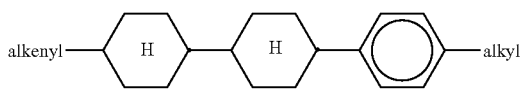

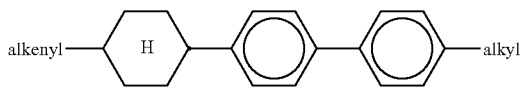

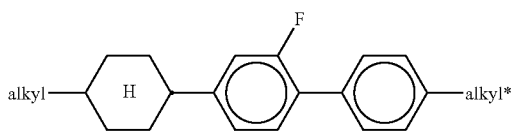

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

c) LC host mixture which additionally comprises one or more compounds of the following formula:

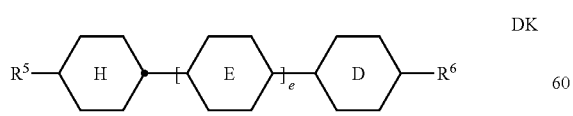

in which the individual radicals have on each occurrence, identically or differently, the following meanings:

$R^5$ and $R^6$ each, independently of one another, have one of the meanings indicated above for $R^1$, -continued

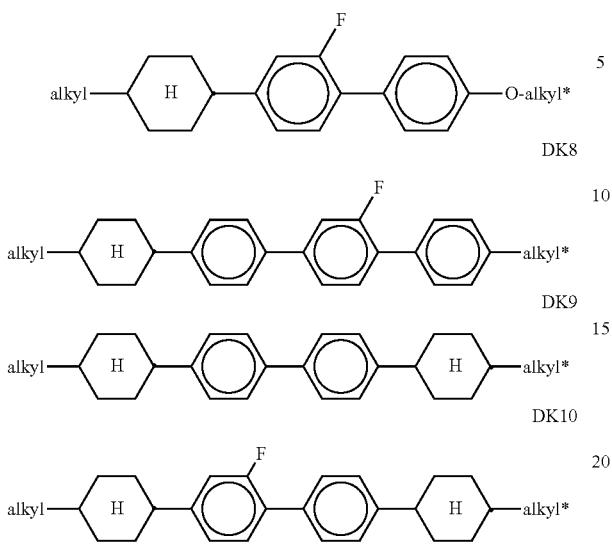

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

d) LC host mixture which additionally comprises one or more compounds of the following formula:

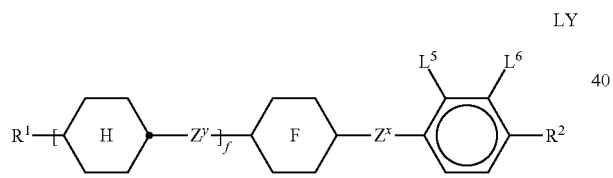

in which the individual radicals have the following meanings:

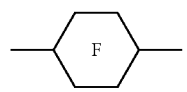

denotes

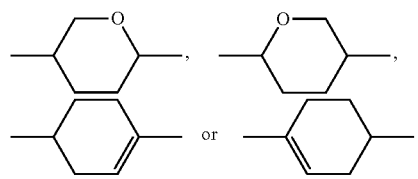

f denotes 0 or 1,
$R^1$ and $R^2$ each, independently of one another, denote alkyl having 1 to 12 C atoms, in which, in addition, one or two non-adjacent $CH_2$ groups may be replaced by $-O-$, $-CH=CH-$, $-CO-$, $-OCO-$ or $-COO-$ in such a way that O atoms are not linked directly to one another, $Z^x$ and $Z^y$ each, independently of one another, denote $-CH_2CH_2-$, $-CH=CH-$, $-CF_2O-$, $-OCF_2-$, $-CH_2O-$, $-OCH_2-$, $-COO-$, $-OCO-$, $-C_2F_4-$, $-CF=CF-$, $-CH=CHCH_2O-$ or a single bond, preferably a single bond, $L^5$ and $L^6$ each, independently of one another, denote F, Cl, $OCF_3$, $CF_3$, $CH_3$, $CH_2F$, $CHF_2$.

Preferably, both radicals $L^5$ and $L^6$ denote F or one of the radicals $L^5$ and $L^6$ denotes F and the other denotes Cl.

The compounds of the formula LY are preferably selected from the following sub-formulae:

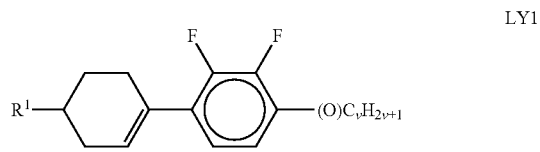

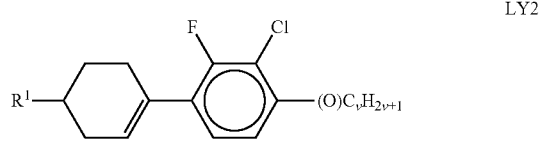

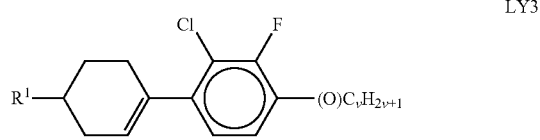

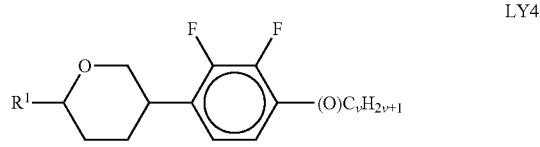

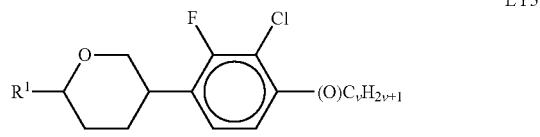

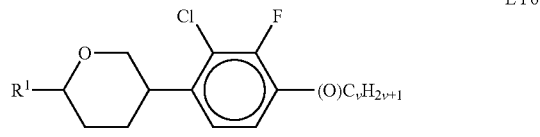

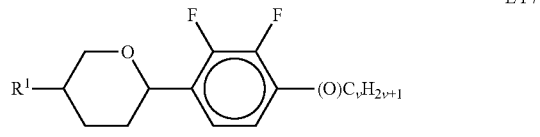

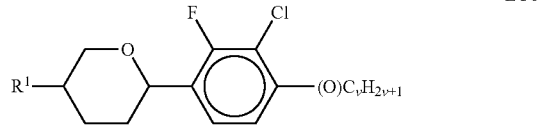

-continued

LY9
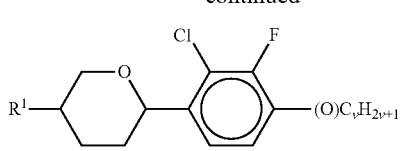

LY10
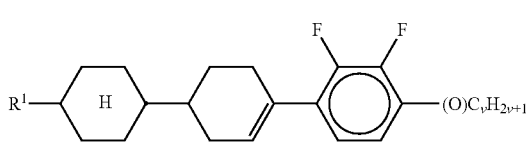

LY11
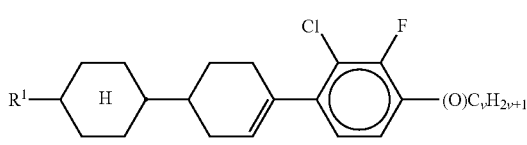

LY12
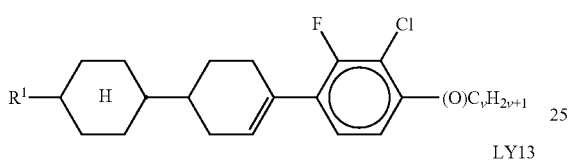

LY13
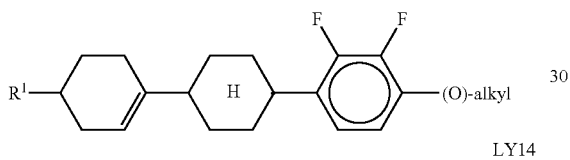

LY14
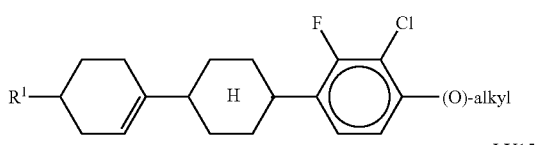

LY15
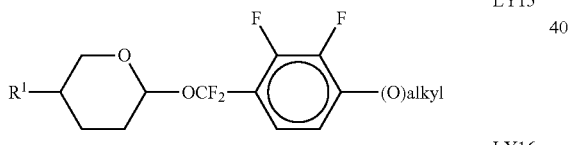

LY16
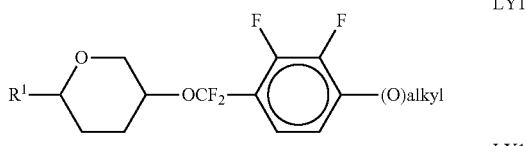

LY17
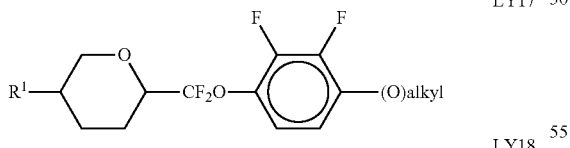

LY18
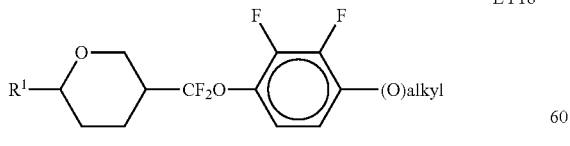

in which $R^1$ has the above-mentioned meaning, (O) denotes an O atom or a single bond, alkyl denotes a straight-chain alkyl radical having 1-6 C atoms, and v denotes an integer from 1 to 6. $R^1$ preferably denotes straight-chain alkyl having 1-6 C atoms or straight-chain alkenyl having 2-6 C atoms, in particular $CH_3$, $C_2H_5$, n-$C_3H_7$, n-$C_4H_9$, n-$C_5H_{11}$, $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—. The LC medium according to the invention preferably comprises one or more compounds of the above-mentioned formulae in amounts of >0 to ≤10% by weight.

e) LC host mixture which additionally comprises one or more compounds selected from the following formulae:

G1
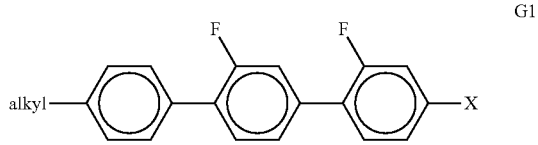

G2
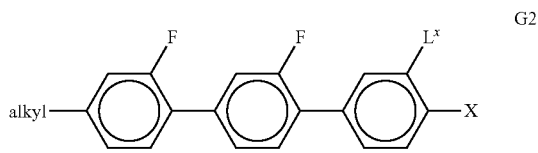

G3
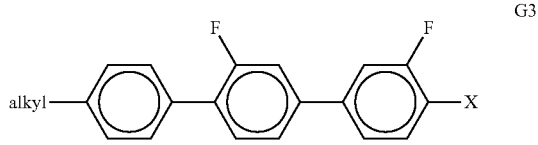

G4
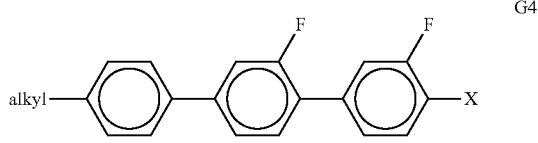

in which alkyl denotes $C_{1-6}$-alkyl, $L^x$ denotes H or F, and X denotes F, Cl, $OCF_3$, $OCHF_2$ or OCH=$CF_2$. Particular preference is given to compounds of the formula G1 in which X denotes F.

f) LC host mixture which additionally comprises one or more compounds selected from the following formulae:

Y1
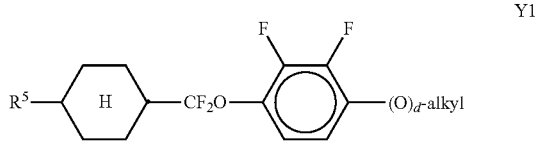

Y2
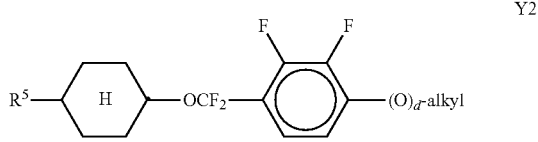

Y3
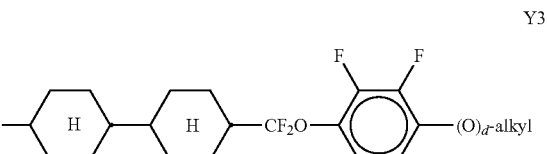

Y4
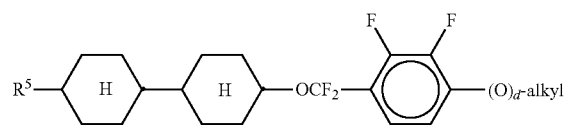

Y5
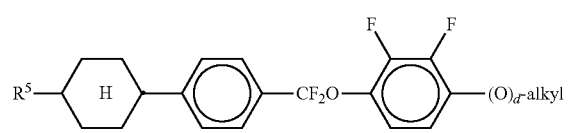

Y6
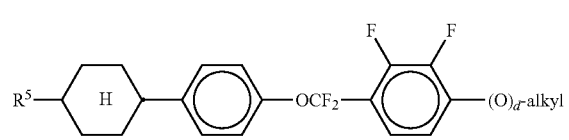

Y7
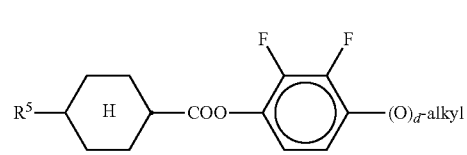

Y8
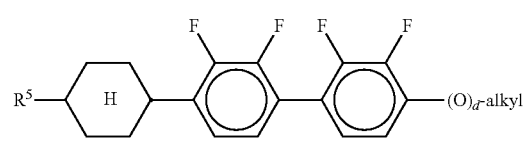

Y9
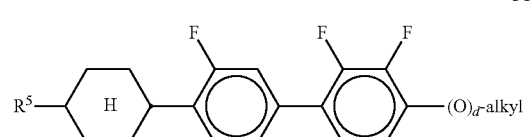

Y10
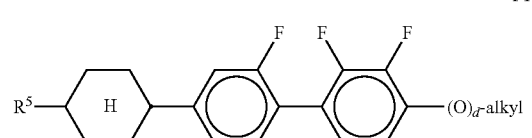

Y11
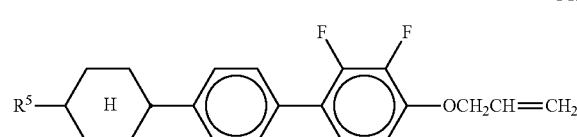

Y12
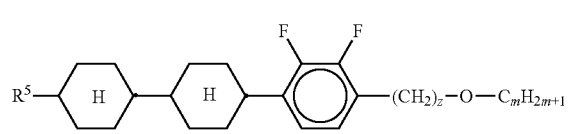

Y13
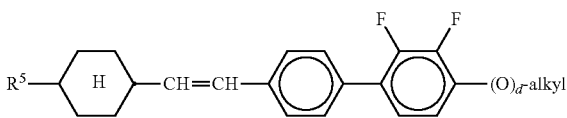

Y14
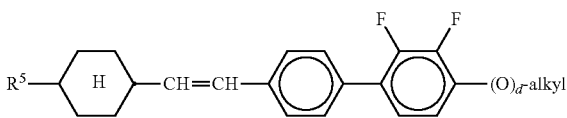

Y15
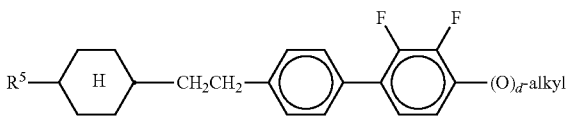

Y16
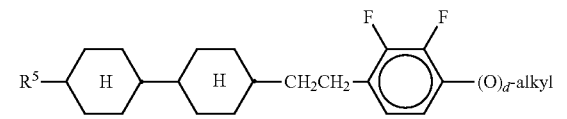

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of >0 to ≤10% by weight.

g) LC host mixture which additionally comprises one or more biphenyl compounds of the following formulae:

B1
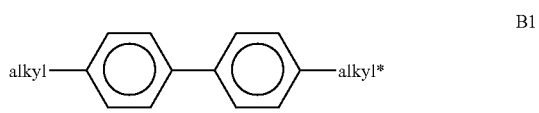

B2
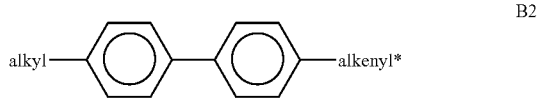

B3
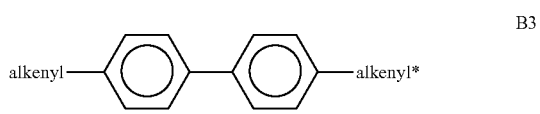

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the following sub-formulae:

B1a

H₃C—⬡—⬡—alkyl*

B2a

H₃C—⬡—⬡—CH=CH₂

B2b

H₃C—⬡—⬡—CH=CH—CH₃

B2c

H₃C—⬡—⬡—CH₂—CH₂—CH=CH₂ in which alkyl* denotes an alkyl radical having 1-6 C atoms. The medium according to the invention particularly preferably comprises one or more compounds of the formulae B1a and/or B2c.

h) LC host mixture which additionally comprises one or more compounds of the following formulae:

O1

$R^1$—H—H—CH₂O—H—$R^2$

O2

$R^1$—H—H—CH₂O—H—H—$R^2$

O3

$R^1$—H—H—COO—H—$R^2$

O4

$R^1$—H—H—COO—⬡—H—$R^2$

O5

$R^1$—H—H—CH₂CH₂—H—$R^2$

O6

$R^1$—H—H—H—$R^2$

O7

$R^1$—H—H—H—$R^2$

O8

$R^1$—H—H—H—$R^2$

-continued

O9

$R^1$—H—CH₂CH₂—H—⬡—$R^2$

O10

$R^1$—H—CH=CH—H—⬡—$R^2$

O11

$R^1$—H—H—H—$R^2$ in which $R^1$ and $R^2$ have the above-mentioned meanings and preferably each, independently of one another, denote straight-chain alkyl or alkenyl.

Preferred mixtures comprise one or more compounds selected from the formulae O1, O3 and O4.

i) LC host mixture which additionally comprises one or more compounds of the following formula:

FI $R^7$—[L]$_q$—indane with $R^9$, F, F, F, (F)

in which

—L— denotes

—H—, —(O-pyran)—,
—(O-pyran)—, —(cyclohexene)—,
—(cyclohexene-O)—, —(O-dioxane)—,
—(O,O-dioxane)—, —(S,S-dithiane)—,
—(S,S-dithiane)—, —(S,O)—, $R^9$ denotes H, CH₃, C₂H₅ or n-C₃H₇, (F) denotes an optional fluoro substituent, q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the following sub-formulae:

FI1
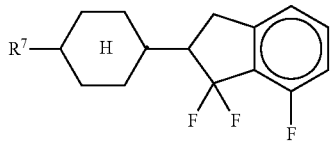

FI2
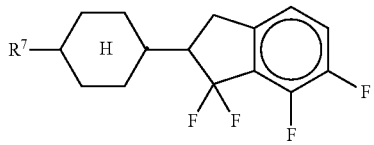

FI3
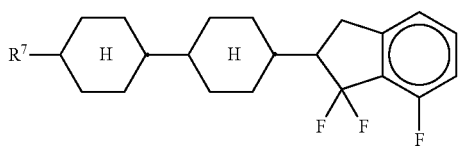

FI4
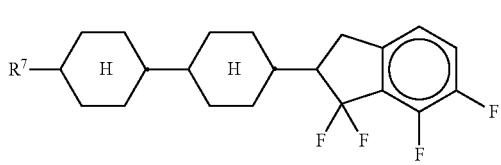

FI5
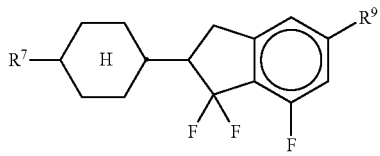

FI6
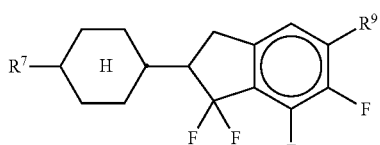

FI7
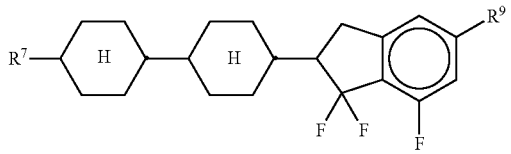

FI8
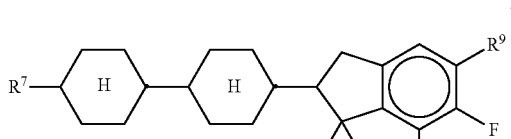

in which $R^7$ preferably denotes straight-chain alkyl having 1-6 C atoms, and $R^9$ denotes $CH_3$, $C_2H_5$ or $n-C_3H_7$. Particular preference is given to the compounds of the formulae FI1, FI2 and FI3.

k) LC host mixture which additionally comprises one or more compounds of the following formulae:

VK1
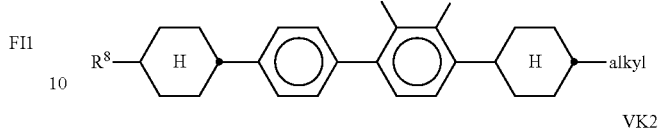

VK2
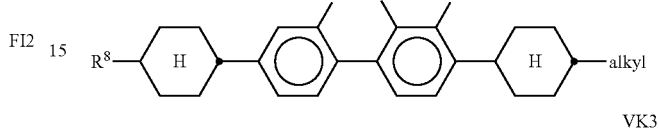

VK3
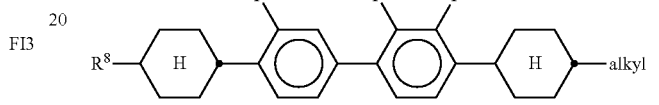

VK4
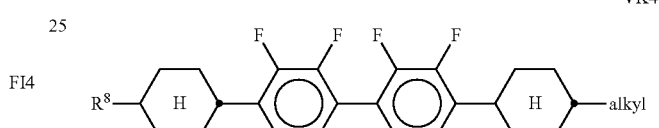

in which $R^8$ has the meaning indicated for $R^1$, and alkyl denotes a straight-chain alkyl radical having 1-6 C atoms.

m) LC host mixture which additionally comprises one or more compounds which contain a tetrahydronaphthyl or naphthyl unit, such as, for example, the compounds selected from the following formulae:

N1
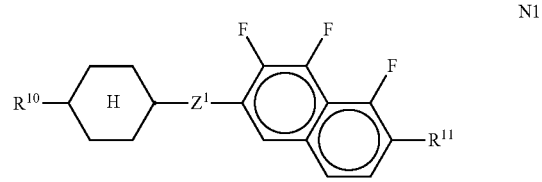

N2
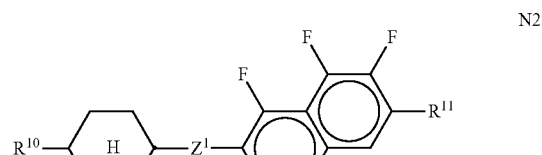

N3
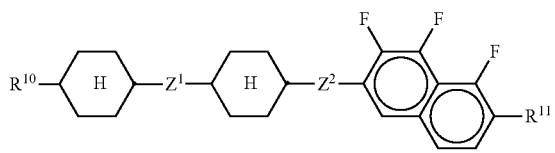

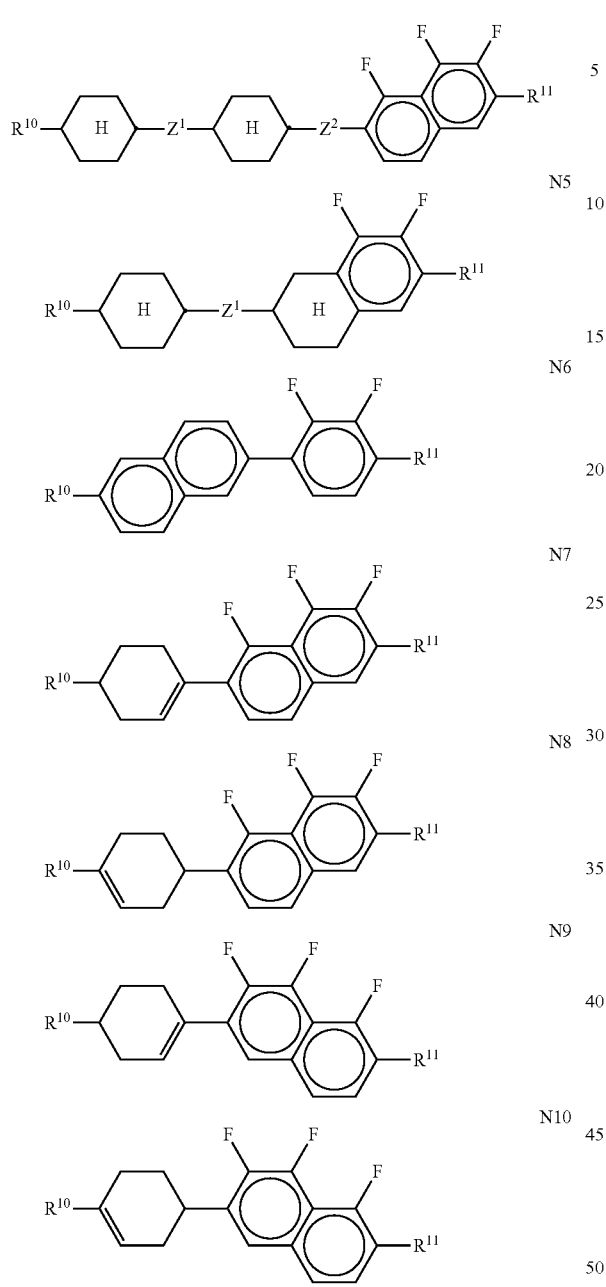

in which $R^{10}$ and $R^{11}$ each, independently of one another, have one of the meanings indicated for $R^1$, preferably denote straight-chain alkyl or straight-chain alkoxy having 1-6 C atoms or straight-chain alkenyl having 2-6 C atoms, and $Z^1$ and $Z^2$ each, independently of one another, denote —$C_2H_4$—, —CH═CH—, —$(CH_2)_4$—, —$(CH_2)_3$—O—, —O$(CH_2)_3$—, —CH═CHCH$_2$CH$_2$—, —CH$_2$CH$_2$CH═CH—, —CH$_2$O—, —OCH$_2$—, —COO—, —OCO—, —$C_2F_4$—, —CF═CF—, —CF═CH—, —CH═CF—, —CH$_2$— or a single bond.

n) LC host mixture which additionally comprises one or more difluoro-dibenzochromans and/or chromans of the following formulae:

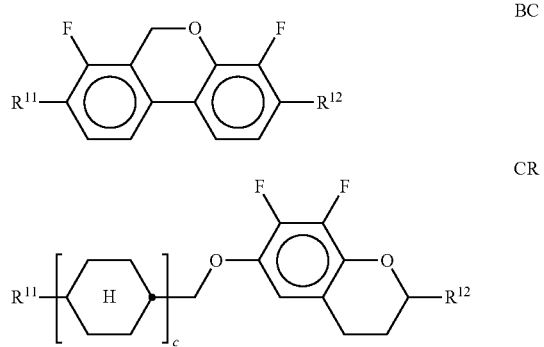

in which $R^{11}$ and $R^{12}$ each, independently of one another, have the above-mentioned meaning, and c denotes 0 or 1, preferably in amounts of 3 to 20% by weight, in particular in amounts of 3 to 15% by weight.

Particularly preferred compounds of the formulae BC and CR are selected from the following sub-formulae:

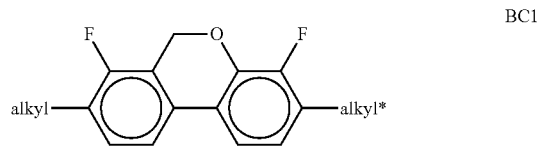

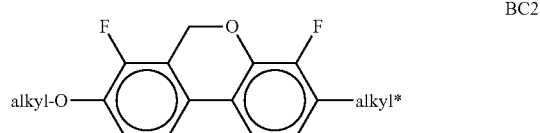

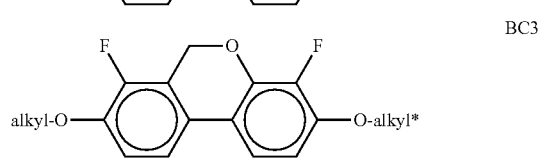

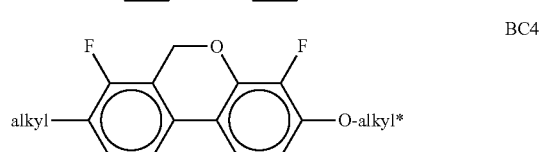

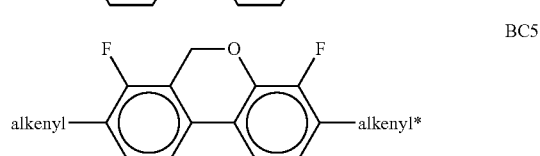

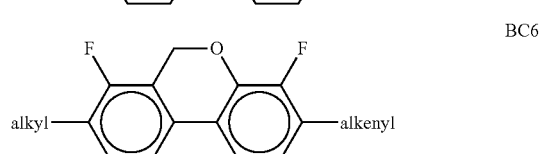

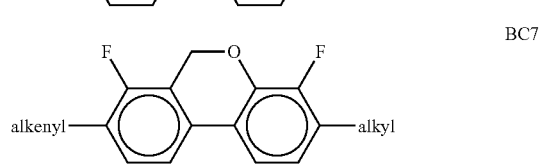

-continued

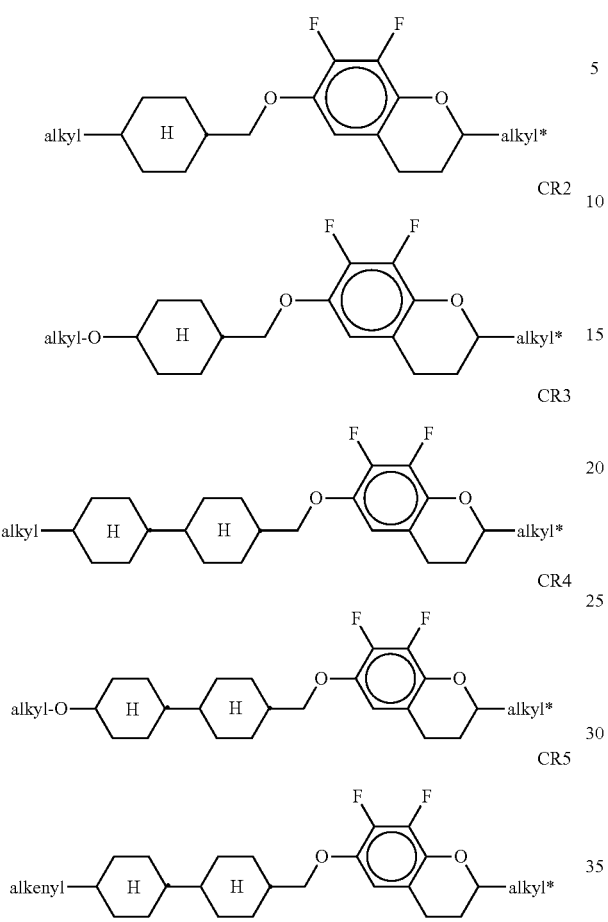

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=CHCH$_2$CH$_2$—, $CH_3$—CH=CH—, $CH_3$—CH$_2$—CH=CH—, $CH_3$—$(CH_2)_2$—CH=CH—, $CH_3$—$(CH_2)_3$—CH=CH— or $CH_3$—CH=CH—$(CH_2)_2$—.

Very particular preference is given to mixtures comprising one, two or three compounds of the formula BC-2.

o) LC host mixture which additionally comprises one or more fluorinated phenanthrenes or dibenzofurans of the following formulae:

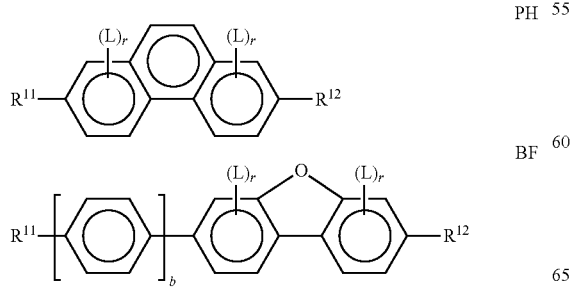

in which $R^{11}$ and $R^{12}$ each, independently of one another, have the above-mentioned meanings, b denotes 0 or 1, L denotes F, and r denotes 1, 2 or 3.

Particularly preferred compounds of the formulae PH and BF are selected from the following sub-formulae:

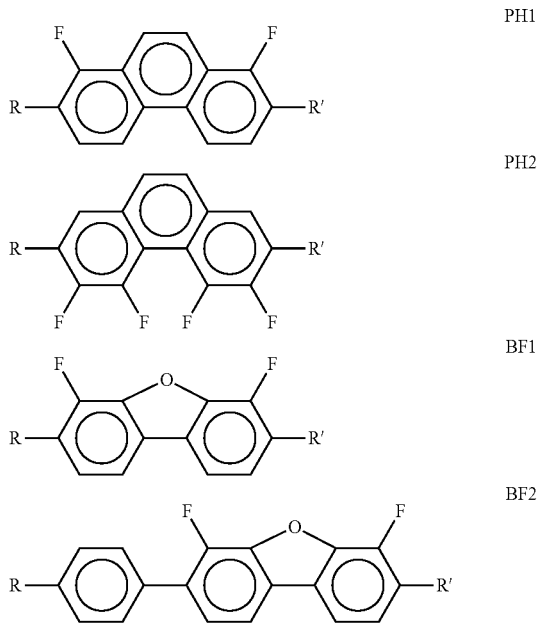

in which R and R' each, independently of one another, denote a straight-chain alkyl or alkoxy radical having 1-7 C atoms.

p) LC host mixture which comprises one or more, preferably from 3 to 20 compounds of the formulae CY, PY and/or TY. The proportion of these compounds in the host mixture as a whole is preferably from 10 to 80% very preferably from 20 to 70%. The content of these individual compounds is preferably in each case from 2 to 25% by weight.

q) LC host mixture or nematic component wherein the compounds of formulae CY, PY and TY are selected from the group consisting of formulae CY1, CY2, CY9, CY10, PY1, PY2, PY9 and PY10.

r) LC host mixture which comprises one or more, preferably from 3 to 20 compounds of the formulae ZK and DK. The proportion of these compounds in the host mixture as a whole is preferably from 5 to 50% very preferably from 10 to 40%. The content of an individual compound of these formulae is preferably in each case from 2 to 20% by weight.

s) LC host mixture or nematic component wherein the compounds of formulae ZK and DK are selected from the group consisting of formulae ZK1, ZK2, ZK5, ZK6, DK1 and DK2.

t) LC host mixture or nematic component which comprises, in addition to the compounds of formula I, one or more compounds that contain an alkenyl group, preferably selected from the group consisting of formulae CY, PY, ZK and DK, furthermore LY. In the preferred alkenyl-containing compounds of formula CY, PY, ZK and DK, one or more of $R^1$ and $R^2$, or of $R^3$ and $R^4$, or of $R^5$ and $R^6$, respectively, denotes alkenyl having 2 to 12, preferably 2 to 6, C atoms. The alkenyl group is preferably selected from the group consisting of $CH_2$=CH—, $CH_2$=CHCH$_2$CH$_2$—, $CH_3$—CH=CH—, $CH_3$—CH$_2$—CH=CH—, $CH_3$—$(CH_2)_2$—

CH=CH—, CH₃—(CH₂)₃—CH=CH— and CH₃—CH=CH—(CH₂)₂—. Especially preferred are compounds selected from the group consisting of formulae ZK3, ZK4 and DK3. Further preferred are compounds selected from the group consisting of formulae CY7, CY8, CY15, CY16, PY7, PY8, PY15, PY16. Further preferred are compounds selected from the group consisting of formulae B2, B3 and their subformulae. Further preferred are compounds selected from the group consisting of formula LY and its subformulae. The proportion of these compounds as a whole in the host mixture is preferably from 2 to 70%, most preferably from 10 to 60%. The content of an individual compound of these formulae is preferably from 2 to 50%.

u) LC host mixture or nematic component which comprises, in addition to the compounds of formula I, one or more compounds selected from the group consisting of formulae ZK3, ZK4 and DK3, most preferably wherein alkenyl denotes CH₂=CH—, CH₂=CHCH₂CH₂—, CH₃—CH=CH—, CH₃—CH₂—CH=CH—, CH₃—(CH₂)₂—CH=CH—, CH₃—(CH₂)₃—CH=CH— or CH₃—CH=CH—(CH₂)₂—. The proportion of these compounds as a whole in the host mixture is preferably from 2 to 70%, most preferably from 10 to 60%. The content of an individual compound of these formulae is preferably from 2 to 50%.

v) LC medium which, apart from the polymerisable compounds as described above and below, contains no compounds which contain a terminal vinyloxy group (—O—CH=CH₂).

w) LC medium which comprises 1 to 5, preferably 1, 2 or 3 polymerisable compounds.

x) LC medium in which the proportion of polymerisable compounds in the medium as a whole is 0.05 to 5%, preferably 0.1 to 1%.

y) LC medium which comprises in addition one or more, preferably low-molecular-weight and/or unpolymerisable, chiral dopants, very preferably selected from Table B, preferably in the concentration ranges given for Table B.

The combination of compounds of the preferred embodiments mentioned above with the polymerised compounds described above and below effects low threshold voltages and very good low-temperature stabilities with maintenance of high clearing points and high HR values in the LC media according to the invention and allows a pretilt angle to be set in PSA displays. In particular, the LC media exhibit significantly shortened response times, in particular also the grey-shade response times, in PSA displays compared with the media from the prior art.

The LC host mixture preferably has a nematic phase range of at least 80 K, particularly preferably at least 100 K, and a rotational viscosity of not greater than 450 mPa·s, preferably not greater than 350 mPa·s, at 20° C.

The LC host mixture preferably has a negative dielectric anisotropy Δ∈, preferably of about −0.5 to −7.5, in particular of about −2.5 to −6.0, at 20° C. and 1 kHz.

The LC host mixture preferably has a birefringence Δn>0.06, very preferably >0.09, most preferably >0.12, and preferably has a birefringence Δn<0.20, very preferably <0.18, most preferably <0.16.

The LC media may also comprise further additives known to the person skilled in the art and described in the literature, like for example polymerisation initiators, inhibitors, stabilizers, surface active compounds or chiral dopants. These additives can be polymerisable or unpolymerisable. Accordingly, polymerisable additives will belong to the polymerisable component, and unpolymerisable additives will belong to the nematic component of the LC media.

The LC media can for example contain one or more chiral dopants, which are preferably selected from the group consisting of compounds from Table B below.

For example, 0 to 15% by weight of pleochroic dyes may be added, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), may be added in order to improve the conductivity, or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments of the LC media according to the invention are either known or the ways in which they are prepared can readily be derived from the prior art by the person skilled in the relevant art since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

Preference is furthermore given to LC media comprising one, two or three polymerisable compounds as described above and below.

Preference is furthermore given to achiral polymerisable compounds and LC media comprising, preferably consisting exclusively of, achiral compounds.

Preference is furthermore given to PSA displays and LC media in which the polymerisable component comprises one or more polymerisable compounds containing a polymerisable group (monoreactive) and one or more polymerisable compounds containing two or more, preferably two, polymerisable groups (di- or multireactive).

Preference is furthermore given to PSA displays and LC media in which the polymerisable component consists exclusively of polymerisable compounds containing two polymerisable groups (direactive).

The polymerisable compounds can be added individually to the LC media, but it is also possible to use mixtures comprising two or more polymerisable compounds according to the invention. Copolymers are formed on polymerisation of such mixtures. The invention furthermore relates to the polymerisable mixtures mentioned above and below. The polymerisable compounds are mesogenic or non-mesogenic, preferably mesogenic or liquid-crystalline.

The proportion of the polymerisable component in the LC media is preferably <5%, especially <1%, very preferably <0.5%.

The proportion of the LC host mixture in the LC media is preferably >95%, very preferably >99%.

In a preferred embodiment of the invention, the polymerisable compounds are selected from formula I*

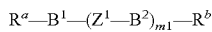   I* in which the individual radicals have the following meanings:
Rᵃ and Rᵇ each, independently of one another, denote P, P-Sp-, H, halogen, SF₅, NO₂, a carbyl group or a hydrocarbyl group,
P on each occurrence, identically or differently, denotes a polymerisable group,
Sp on each occurrence, identically or differently, denotes a spacer group or a single bond, B¹ and B² each, independently of one another, denote an aromatic, heteroaromatic, alicyclic or heterocyclic group, preferably having 4 to 25 ring atoms, which may also contain fused rings, and which is optionally mono- or polysubstituted by L, Z¹ on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, L denotes P, P-Sp-, H, OH, CH$_2$OH, halogen, SF$_5$, NO$_2$, a carbyl group or hydrocarbyl group, R$^0$ and R$^{00}$ each, independently of one another, denote H or alkyl having 1 to 12 C atoms, m1 denotes 0, 1, 2, 3 or 4, n1 denotes 1, 2, 3 or 4, wherein at least one of the radicals R$^a$, R$^b$ and L denotes or contains a group P or P-Sp-, Particularly preferred compounds of the formula I* are those in which B¹ and B² each, independently of one another, denote 1,4-phenylene, naphthalene-1,4-diyl, naphthalen-2,6-diyl, phenanthrene-2,7-diyl, anthracene-2,7-diyl, fluorene-2,7-diyl, coumarin, flavon, in which, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl, octahydro-4,7-methanoindane-2,5-diyl, or phenanthrene-2,7-diyl, where all these groups may be unsubstituted or mono- or polysubstituted by L, L denotes P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, straight-chain or branched alkyl or alkoxy having 1 to 25 C atoms, or straight-chain or branched alkenyl, alkinyl, alkylcarbonyl, alkoxycarbonyl, alkylcarbonyloxy or alkoxycarbonyloxy having 2 to 25 C atoms, wherein in all of these groups, in addition, one or more H atoms may be replaced by F, Cl or P-Sp-, Y¹ denotes halogen, R$^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl or P-Sp-, an optionally substituted aryl or aryloxy group having 6 to 40 C atoms, or an optionally substituted heteroaryl or heteroaryloxy group having 2 to 40 C atoms, where at least one of the radicals R$^a$, R$^b$ and L denotes P or P-Sp-.

Particular preference is given to compounds of the formula I* in which one or both of the radicals R$^a$ and R$^b$ denote P or P-Sp-.

Particularly preferred compounds of the formula I* are selected from the following sub-formulae:

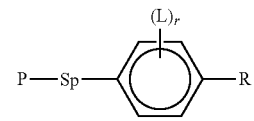
I*1

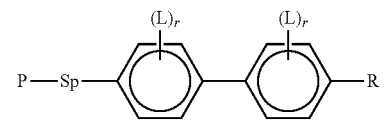
I*2

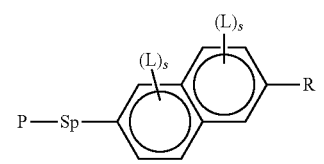
I*3

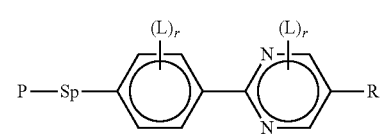
I*4

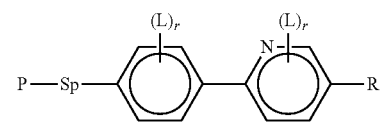
I*5

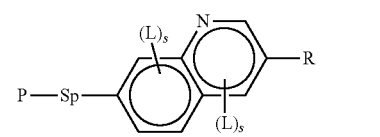
I*6

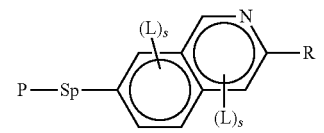
I*7

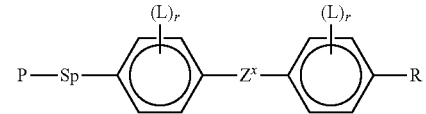
I*8

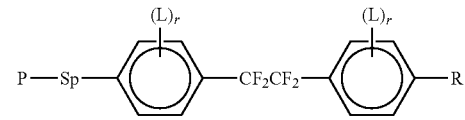
I*9

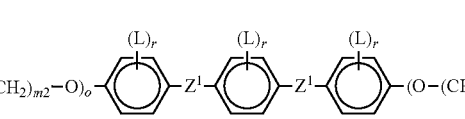
I*10

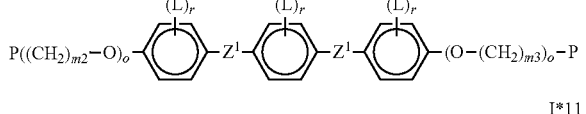
I*11

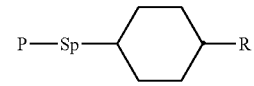
I*12

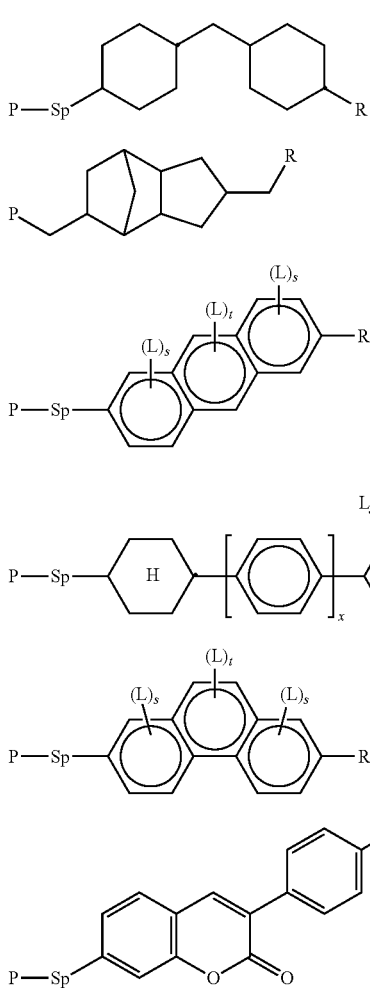

in which P, Sp, L and $Z^1$ on each occurrence, identically or differently, have one of the above-mentioned meanings, P preferably denotes acrylate or methacrylate, and Sp preferably denotes a single bond, R has one of the meanings indicated for $R^x$ and preferably denotes P or P-Sp-, or straight-chain or branched alkyl or alkoxy having 1 to 12 C atoms, L is as defined above and preferably denotes F or $CH_3$, $Z^1$ preferably denotes —COO—, —OCO— or a single bond, $Z^x$ denotes —O—, —CO— or $CR^yR^z$, $R^y$ and $R^z$ denote independently of one another H, F, $CH_3$ or $CF_3$, m2 and m3 each, independently of one another, denote an integer from 1 to 8, o denotes 0 or 1, r denotes 0, 1, 2, 3 or 4, s denotes 0, 1, 2 or 3, t denotes 0, 1 or 2, x denotes 0 or 1.

In a further preferred embodiment of the invention, the polymerisable compounds are chiral compounds selected from formula II*:

$$(R^*-(B^1-Z^1)_{m1})_k-Q \qquad \text{II*}$$

in which $B^1$, $Z^1$ and m1 have on each occurrence, identically or differently, one of the meanings indicated in formula I*, R* on each occurrence, identically or differently, has one of the meanings indicated for $R^a$ in formula I*, Q denotes a k-valent chiral group, which is optionally mono- or polysubstituted by L, k is 1, 2, 3, 4, 5 or 6, where the compounds contain at least one radical R* or L which denotes or contains a group P-Sp- as defined above.

Particularly preferred compounds of the formula II* contain a monovalent group Q of the formula III*

III* in which L and r have on each occurrence, identically or differently, the meanings indicated above, A* and B* each, independently of one another, denote fused benzene, cyclohexane or cyclohexene, t on each occurrence, identically or differently, denotes 0, 1 or 2, and u on each occurrence, identically or differently, denotes 0, 1 or 2.

Particular preference is given to groups of the formula III* in which x denotes 1 or 2.

Further preferred compounds of the formula II* contain a monovalent group Q or one or more groups R* of the formula IV*

$$-Q^1-\overset{*}{\underset{Q^3}{CH}}-Q^2 \qquad \text{IV*}$$

in which $Q^1$ denotes alkylene or alkyleneoxy having 1 to 9 C atoms or a single bond, $Q^2$ denotes optionally fluorinated alkyl or alkoxy having 1 to 10 C atoms, in which, in addition, one or two non-adjacent $CH_2$ groups may be replaced by —O—, —S—, —CH=CH—, —CO—, —OCO—, —COO—, —O—COO—, —S—CO—, —CO—S— or —C≡C— in such a way that O and/or S atoms are not linked directly to one another, $Q^3$ denotes F, Cl, CN or alkyl or alkoxy as defined for $Q^2$, but different from $Q^2$ Preferred groups of the formula IV* are, for example, 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyl-oxy, 5-methylheptyloxycarbonyl, 2-methylbutyryloxy, 3-methylvaleroyloxy, 4-methylhexanoyloxy, 2-chloropropionyloxy, 2-chloro-3-methylbutyryloxy, 2-chloro-4-methylvaleryloxy, 2-chloro-3- methylvaleryloxy, 2-methyl-3-oxa-pentyl, 2-methyl-3-oxa-hexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoro-methyloctyloxy.

Further preferred compounds of the formula II* contain a divalent group Q of the formula V*

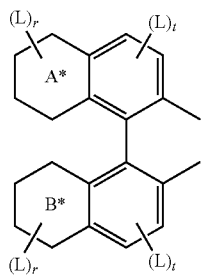

V* in which L, r, t, A* and B* have the meanings indicated above.

Further preferred compounds of the formula II* contain a divalent group Q selected from the following formulae:

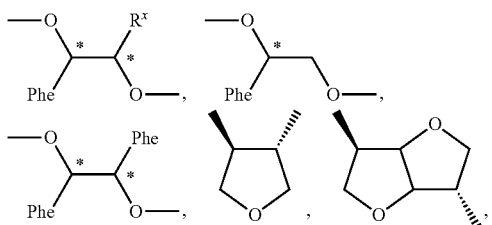

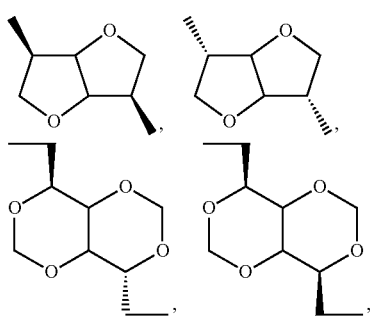

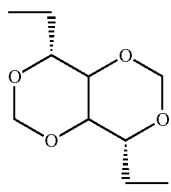

in which Phe denotes phenyl, which is optionally mono- or polysubstituted by L, and $R^x$ denotes F or optionally fluorinated alkyl having 1 to 4 C atoms.

Particularly preferred compounds of the formula II* are selected from the following sub-formulae:

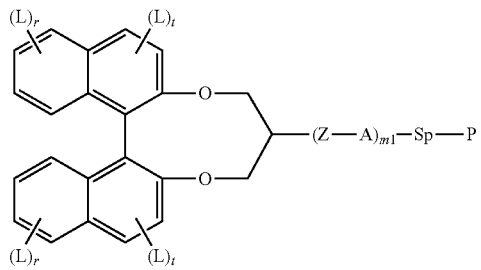

II*1

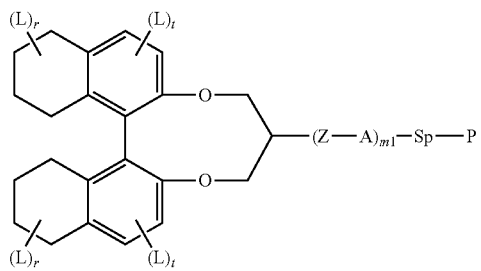

II*2

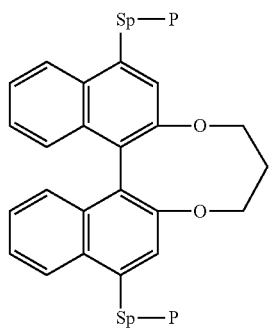

II*3

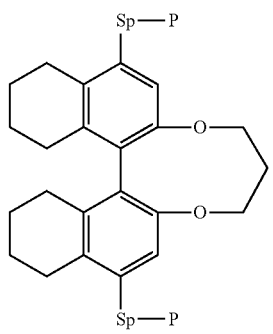

II*4

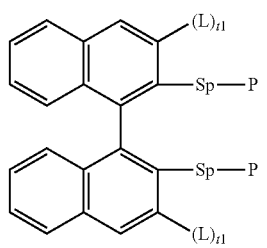

II*5

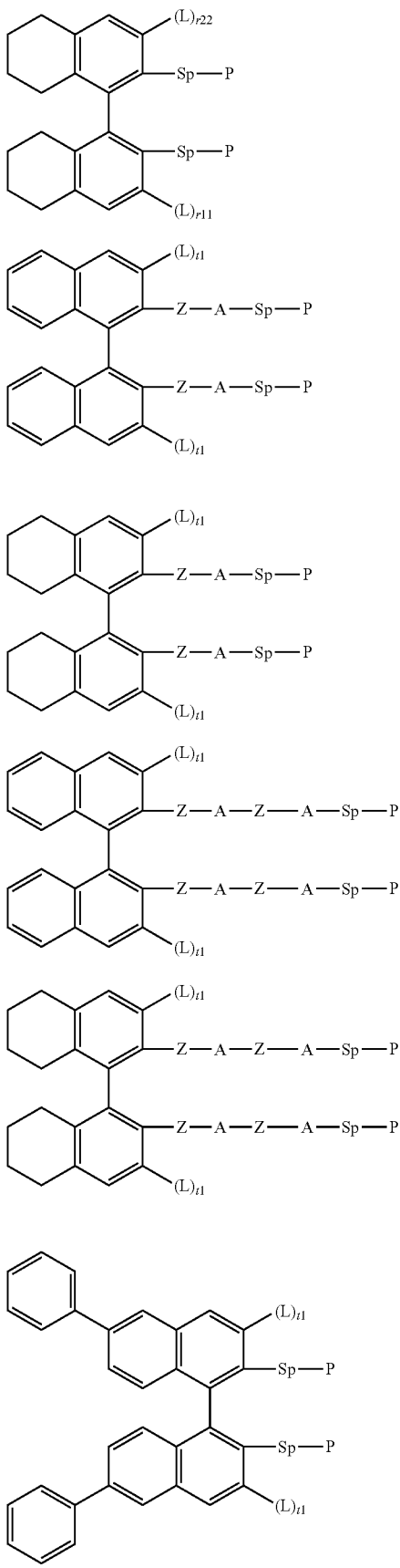

in which L, P, Sp, m1, r and t have the meanings indicated above, Z and A have on each occurrence, identically or differently, one of the meanings indicated for $Z^1$ and $A^1$ respectively, and t1 on each occurrence, identically or differently, denotes 0 or 1.

The chiral compounds of formula II* can be employed either in optically active form, i.e. as pure enantiomers, or as any desired mixture of the two enantiomers, or as the racemate thereof. The use of the racemates is preferred. The use of the racemates has some advantages over the use of pure enantiomers, such as, for example, significantly more straightforward synthesis and lower material costs.

Above and below, "carbyl group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). "Hydrocarbyl group" denotes a carbyl group which additionally contains one or more H atoms and optionally one or more heteroatoms, such as, for example, N, O, S, P, Si, Se, As, Te or Ge. "Halogen" denotes F, Cl, Br or I.

A carbyl or hydrocarbyl group can be a saturated or unsaturated group. Unsaturated groups are, for example, aryl, alkenyl or alkynyl groups. A carbyl or hydrocarbyl radical having more than 3 C atoms can be straight-chain, branched and/or cyclic and may also have spiro links or condensed rings.

Above and below, the terms "alkyl", "aryl", "heteroaryl", etc., also encompass polyvalent groups, for example alkylene, arylene, heteroarylene, etc. The term "aryl" denotes an aromatic carbon group or a group derived therefrom. The term "heteroaryl" denotes "aryl" in accordance with the above definition containing one or more heteroatoms.

Preferred carbyl and hydrocarbyl groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms.

Further preferred carbyl and hydrocarbyl groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ alkyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbyl and hydrocarbyl groups are straight-chain, branched or cyclic alkyl radicals having 1 to 40, preferably 1 to 25 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoro-methyl, perfluoro-n-butyl, 2,2,2-trifluoroethyl, perfluorooctyl, perfluoro-hexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, iso-indole, indolizine, indazole, benzimidazole, benzotriazole, purine, naphth-imidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups.

The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those which contain exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or poly-cyclic, i.e. contain a plurality of rings (such as, for example, decahydro-naphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbyl and hydrocarbyl radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, in which $R^x$ has the above-mentioned meaning, and $Y^1$ denotes halogen, optionally substituted silyl or aryl having 6 to 40, preferably 6 to 20 C atoms, and straight-chain or branched alkyl, alkoxy, alkyl-carbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^o$, —$OR^o$, —CO—$R^o$, —CO—O—$R^o$, —O—CO—$R^o$ or —O—CO—O—$R^o$, in which $R^o$ has the above-mentioned meaning.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

is preferably

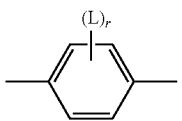

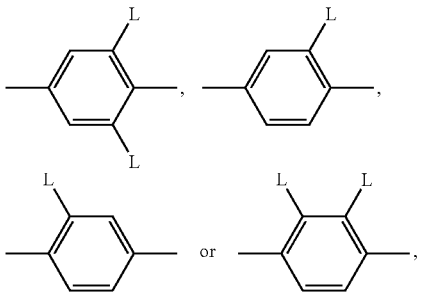

in which L has one of the above-mentioned meanings.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or C≡C triple bond, and groups which are suitable for polymerisation with ring opening, such as, for example, oxetane or epoxide groups.

Preferred polymerisable groups are selected from the group consisting of $CH_2=CW^1—COO—$, $CH_2=CW^1—CO—$,

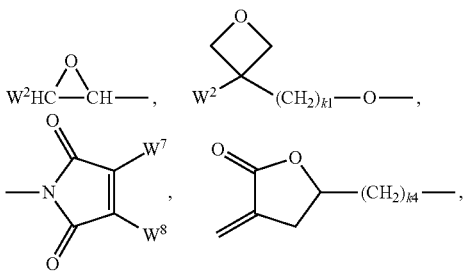

$CH_2=CW^2—(O)_{k3}—$, $CW^1=CH—CO—(O)_{k3}—$, $CW^1=CH—CO—NH—$, $CH_2=CW^1—CO—NH—$, $CH_3—CH=CH—O—$, $(CH_2=CH)_2CH—OCO—$, $(CH_2=CH—CH_2)_2CH—OCO—$, $(CH_2=CH)_2CH—O—$, $(CH_2=CH—CH_2)_2N—$, $(CH_2=CH—CH_2)_2N—CO—$, $HO—CW^2W^3—$, $HS—CW^2W^3—$, $HW^2N—$, $HO—CW^2W^3—NH—$, $CH_2=CW^1—CO—NH—$, $CH_2=CH—(COO)_{k1}$-Phe-$(O)_{k2}—$, $CH_2=CH—(CO)_{k1}$-Phe-$(O)_{k2}—$, Phe-CH=CH—, HOOC—, OCN— and $W^4W^5W^6Si—$, in which $W^1$ denotes H, F, Cl, CN, $CF_3$, phenyl or alkyl having 1 to 5 C atoms, in particular H, F, $C_1$ or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as being defined above but being different from P-Sp, and $k_1$, $k_2$ and $k_3$ each, independently of one another, denote 0 or 1, $k_3$ preferably denotes 1, and $k_4$ is an integer from 1 to 10.

Particularly preferred groups P are $CH_2=CH—COO—$, $CH_2=C(CH_3)—COO—$, $CH_2=CF—COO—$, $CH_2=CH—$, $CH_2=CH—O—$, $(CH_2=CH)_2CH—OCO—$, $(CH_2=CH)_2CH—O—$,

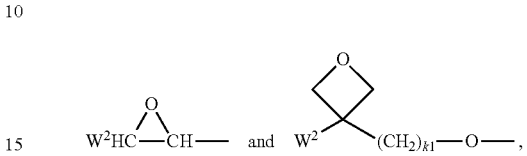

in particular vinyloxy, acrylate, methacrylate, fluoroacrylate, chloroacrylate, oxetane and epoxide.

In a further preferred embodiment of the invention, the polymerisable compounds of the formulae I* and II* and sub-formulae thereof contain, instead of one or more radicals P-Sp-, one or more branched radicals containing two or more polymerisable groups P (multifunctional polymerisable radicals). Suitable radicals of this type, and polymerisable compounds containing them, are described, for example, in U.S. Pat. No. 7,060,200 B1 or US 2006/0172090 A1. Particular preference is given to multifunctional polymerisable radicals selected from the following formulae:

| | |
|---|---|
| —X-alkyl-CHP$^1$—CH$_2$—CH$_2$P$^2$ | I*a |
| —X-alkyl-C(CH$_2$P$^1$)(CH$_2$P$^2$)—CH$_2$P$^3$ | I*b |
| —X-alkyl-CHP$^1$CHP$^2$—CH$_2$P$^3$ | I*c |
| —X-alkyl-C(CH$_2$P$^1$)(CH$_2$P$^2$)—C$_{aa}$H$_{2aa+1}$ | I*d |
| —X-alkyl-CHP$^1$—CH$_2$P$^2$ | I*e |
| —X-alkyl-CHP$^1$P$^2$ | I*f |
| —X-alkyl-CP$^1$P$^2$—C$_{aa}$H$_{2aa+1}$ | I*g |
| —X-alkyl-C(CH$_2$P$^1$)(CH$_2$P$^2$)—CH$_2$OCH$_2$—C(CH$_2$P$^3$)(CH$_2$P$^4$)CH$_2$P$^5$ | I*h |
| —X-alkyl-CH((CH$_2$)$_{aa}$P$^1$)((CH$_2$)$_{bb}$P$^2$) | I*i |
| —X-alkyl-CHP$^1$CHP$^2$—C$_{aa}$H$_{2aa+1}$ | I*k | in which alkyl denotes a single bond or straight-chain or branched alkylene having 1 to 12 C atoms, in which one or more non-adjacent CH$_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where R$^x$ has the above-mentioned meaning and preferably denotes R$^0$ as defined above, aa and bb each, independently of one another, denote 0, 1, 2, 3, 4, 5 or 6, X has one of the meanings indicated for X$^1$, and P$^{1-5}$ each, independently of one another, have one of the meanings indicated above for P.

Preferred spacer groups Sp are selected from the formula Sp'-X', so that the radical "P-Sp-" conforms to the formula "P-Sp'-X'—", where

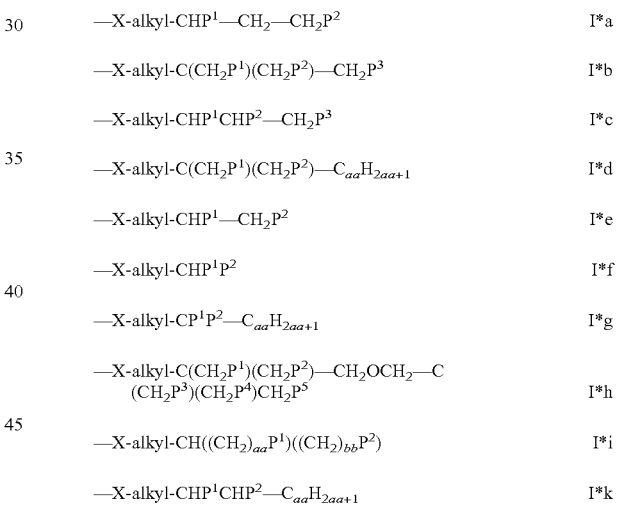

Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by —O—, —S—, —NH—, —NR$^0$—, —SiR$^0$R$^{00}$—, —CO—, —COO—, —OCO—, —OCO—O—, —S—CO—, —CO—S—, —NR$^0$—CO—O—, —O—CO—NR$^0$—, —NR$^0$—CO—NR$^0$—, —CH=CH— or —C≡C— in such a way that O and/or S atoms are not linked directly to one another, X' denotes —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—COO—, —OCO—CH=CH— or a single bond, R$^0$ and R$^{00}$ each, independently of one another, denote H or alkyl having 1 to 12 C atoms, and Y$^2$ and Y$^3$ each, independently of one another, denote H, F, Cl or CN.

X' is preferably —O—, —S—, —CO—, —COO—, —OCO—, —O—COO—, —CO—NR$^0$—, —NR$^0$—CO—, —NR$^0$—CO—NR$^0$— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, in which p1 is an integer from 1 to 12, q1 is an integer from 1 to 3, and R$^0$ and R$^{00}$ have the above-mentioned meanings.

Particularly preferred groups —X'-Sp'— are —(CH$_2$)$_{p1}$—, —O—(CH$_2$)$_{p1}$—, —OCO—(CH$_2$)$_{p1}$—, —OCOO—(CH$_2$)$_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethyl-ene-N-methyliminoethylene, 1-methylalkylene, ethenylene, propenylene and butenylene.

The polymerisable compounds are prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. The synthesis of polymerisable acrylates and methacrylates of the formula I can be carried out analogously to the methods described in U.S. Pat. No. 5,723,066. Further, particularly preferred methods are given in the examples.

In the simplest case, the synthesis is carried out by esterification or etherification of commercially available diols of the general formula HO-A$^1$-(Z$^1$-A$^2$)$_{m1}$-OH, in which A$^1$, A$^2$, Z$^1$ and m1 have the above-mentioned meanings, such as, for example, 2,6-dihydroxynaphthalene (naphthalene-2,6-diol), or 1-(4-hydroxyphenyl)phenyl-4-ol, using corresponding acids, acid derivatives, or halogenated compounds containing a group P, such as, for example, methacryloyl chloride or methacrylic acid, in the presence of a dehydrating reagent, such as, for example, DCC (dicyclohexylcarbodiimide).

The polymerisable compounds are polymerised or crosslinked (if a compound contains two or more polymerisable groups) by in-situ polymerisation in the LC medium between the substrates of the LC display with application of a voltage. Suitable and preferred polymerisation methods are, for example, thermal or photopolymerisation, preferably photopolymerisation, in particular UV photopolymerisation. If necessary, one or more initiators may also be added here. Suitable conditions for the polymerisation, and suitable types and amounts of initiators, are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion in the mixture as a whole is preferably 0.001 to 5% by weight, particularly preferably 0.001 to 1% by weight. However, the polymerisation can also take place without addition of an initiator. In a further preferred embodiment, the LC medium does not comprise a polymerisation initiator.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers of the Irganox® series (Ciba AG). If stabilisers are employed, their proportion, based on the total amount of RMs or polymerisable component A), is preferably 10-5000 ppm, particularly preferably 50-500 ppm.

The polymerisable compounds according to the invention are also suitable for polymerisation without initiator, which is associated with considerable advantages, such as, for example, lower material costs and in particular less contamination of the LC medium by possible residual amounts of the initiator or degradation products thereof.

The polymerisable compounds according to the invention can be added individually to the LC media, but it is also possible to use mixtures comprising two or more polymerisable compounds. On polymerisation of mixtures of this type, copolymers are formed. The invention furthermore relates to the polymerisable mixtures mentioned above and below.

The LC media which can be used in accordance with the invention are prepared in a manner conventional per se, for example by mixing one or more of the above-mentioned compounds with one or more polymerisable compounds as defined above and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The construction of the LC displays according to the invention corresponds to the conventional geometry for PSA displays, as described in the prior art cited at the outset. Geometries without protrusions are preferred, in particular those in which, in addition, the electrode on the colour filter side is unstructured and only the electrode on the TFT side has slits. Particularly suitable and preferred electrode structures for PSA-VA displays are described, for example, in US 2006/0066793 A1.

Unless the context clearly indicates otherwise, as used herein plural forms of the terms herein are to be construed as including the singular form and vice versa.

Throughout the description and claims of this specification, the words "comprise" and "contain" and variations of the words, for example "comprising" and "comprises", mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The following examples explain the present invention without limiting it. However, they show the person skilled in the art preferred mixture concepts with compounds preferably to be employed and the respective concentrations thereof and combinations thereof with one another. In addition, the examples illustrate which properties and property combinations are accessible.

In the tables below the following abbreviations are used:
(n, m, z: each, independently of one another, 1, 2, 3, 4, 5 or 6)

TABLE A

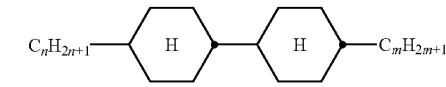

CCH-nm

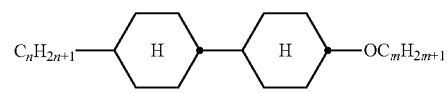

CCH-nOm

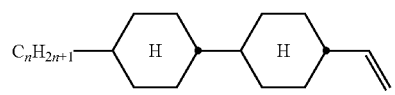

CC-n-V

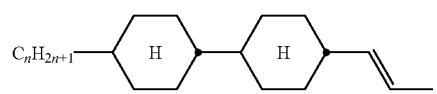

CC-n-V1

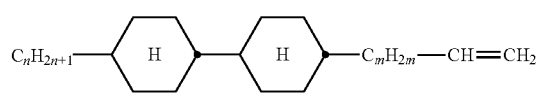

CC-n-mV

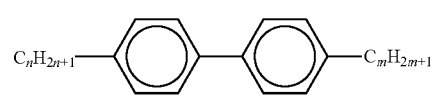

PP-n-m

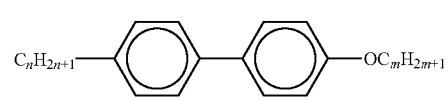

PP-n-Om

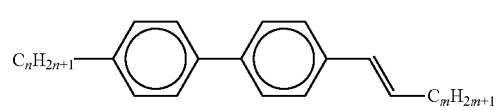

PP-n-Vm

TABLE A-continued
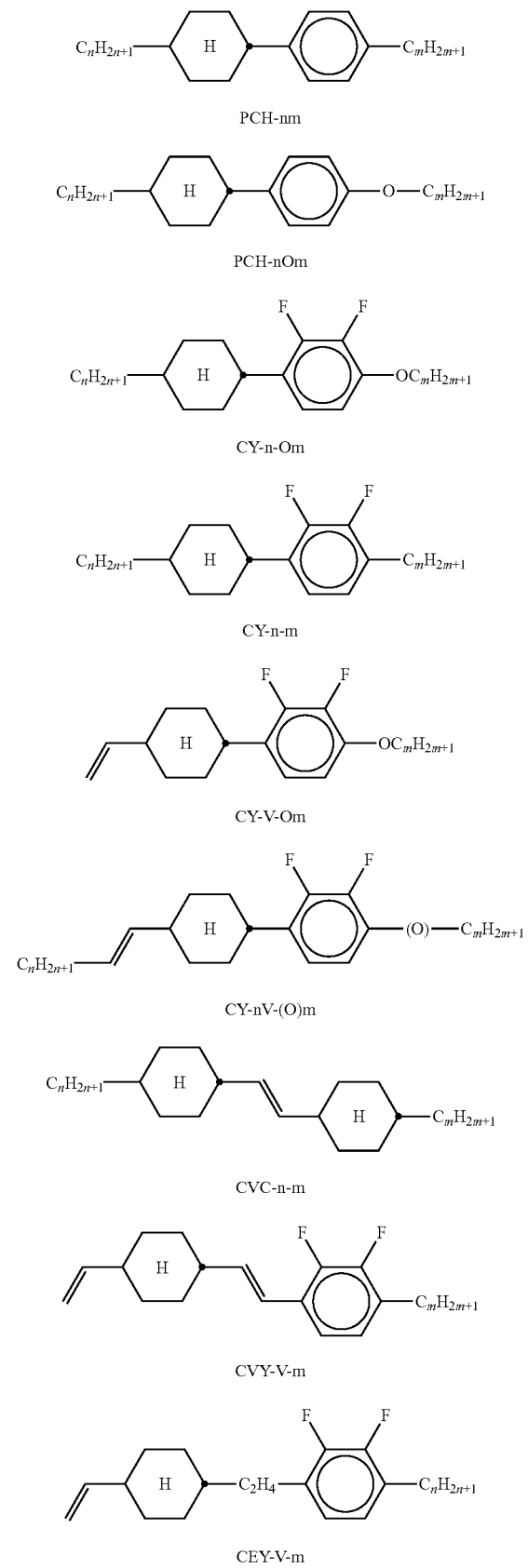

TABLE A-continued
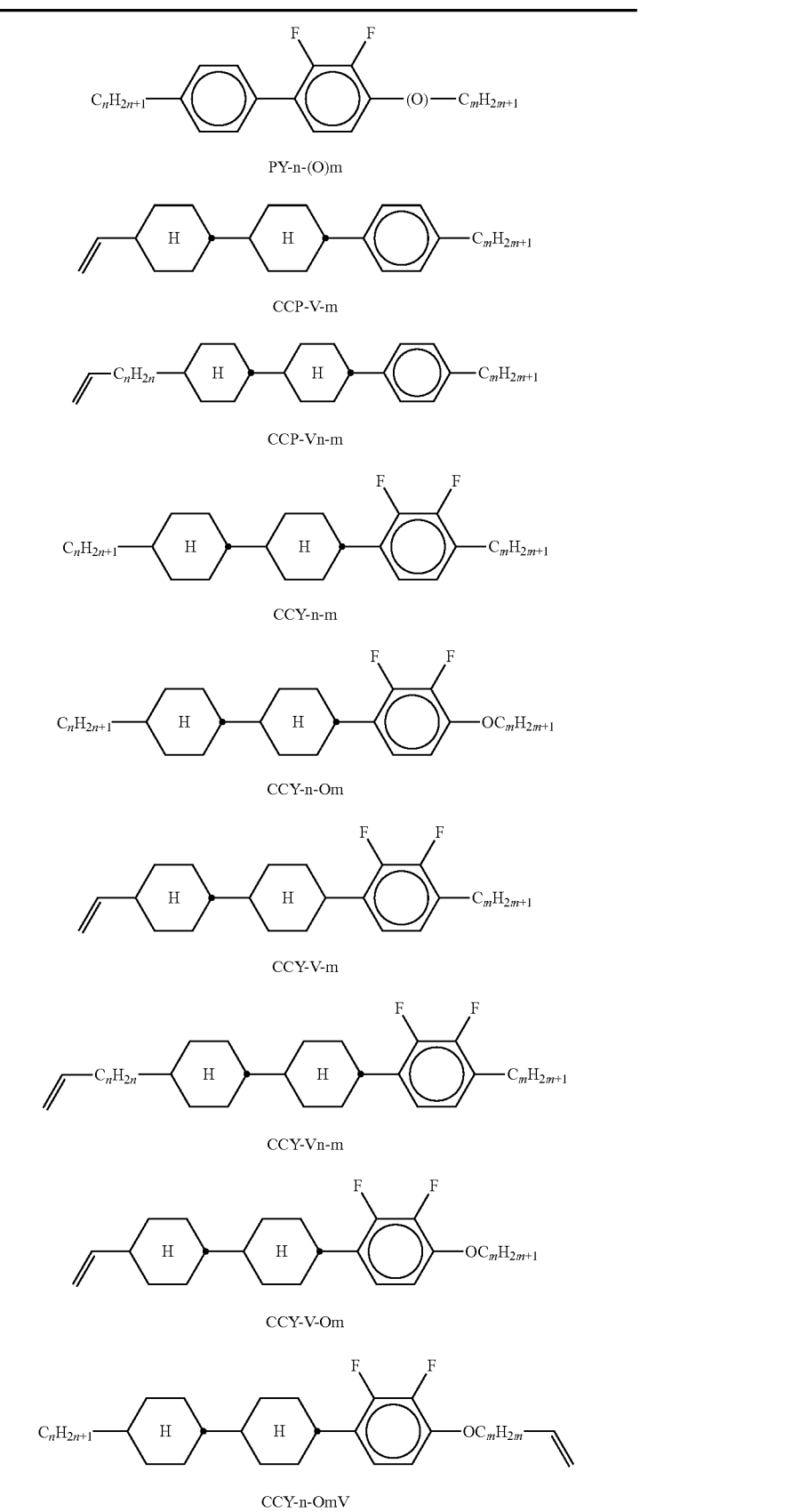

TABLE A-continued
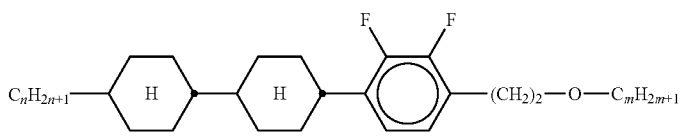
CCY-n-zOm
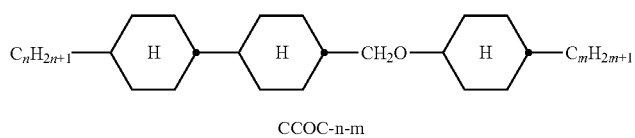
CCOC-n-m
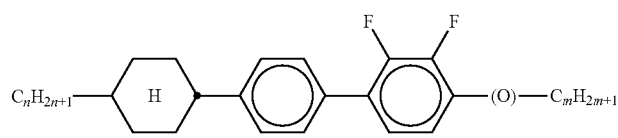
CPY-n-(O)m
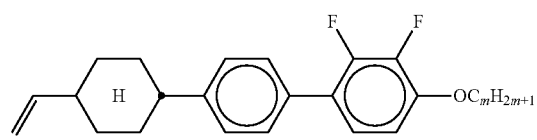
CPY-V-Om
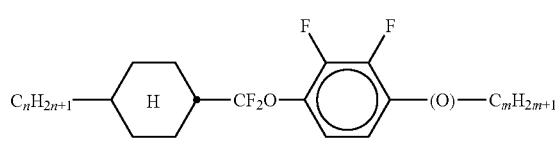
CQY-n-(O)m
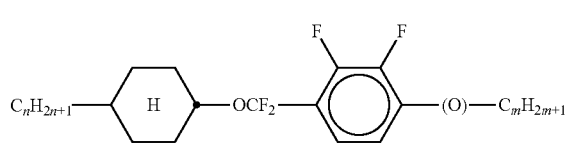
CQIY-n-(O)m
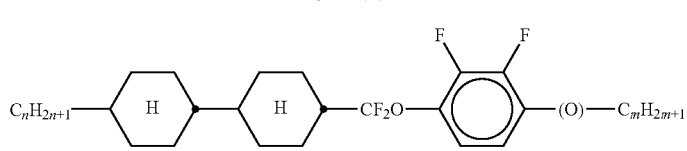
CCQY-n-(O)m
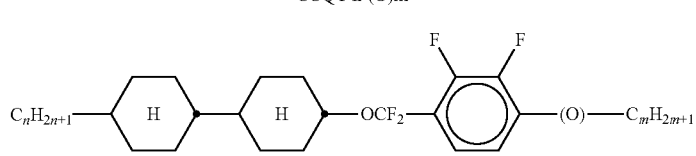
CCQIY-n-(O)m
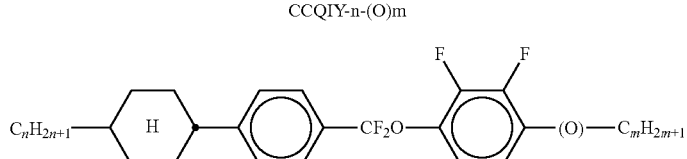
CPQY-n-(O)m TABLE A-continued
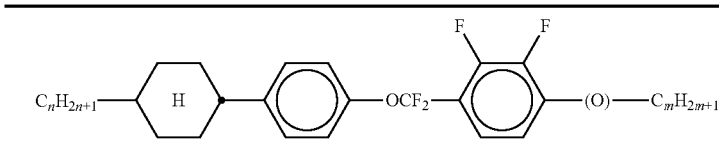
CPQIY-n-Om
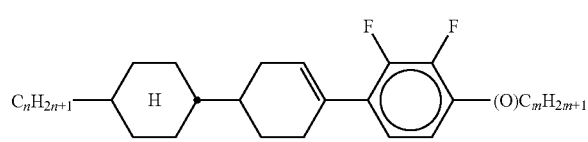
CLY-n-(O)m
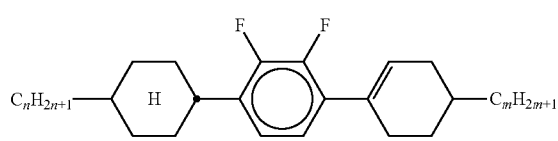
CYLI-n-m
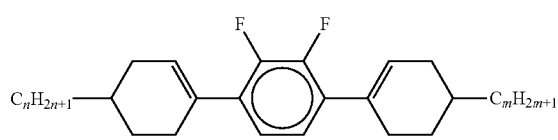
LYLI-n-m
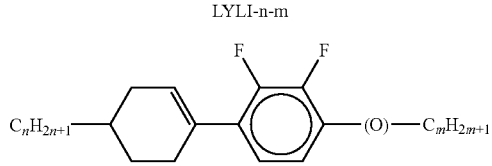
LY-n-(O)m
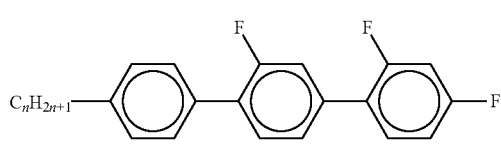
PGIGI-n-F
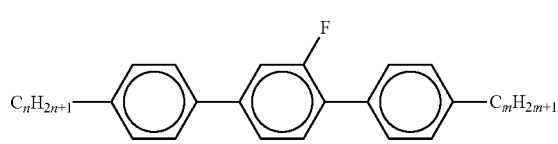
PGP-n-m
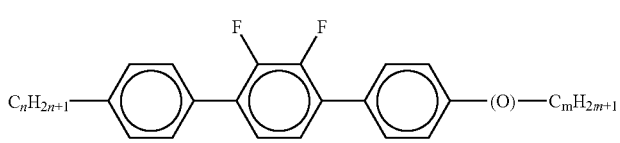
PYP-n-(O)m
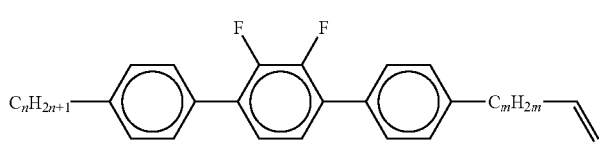
PYP-n-mV TABLE A-continued
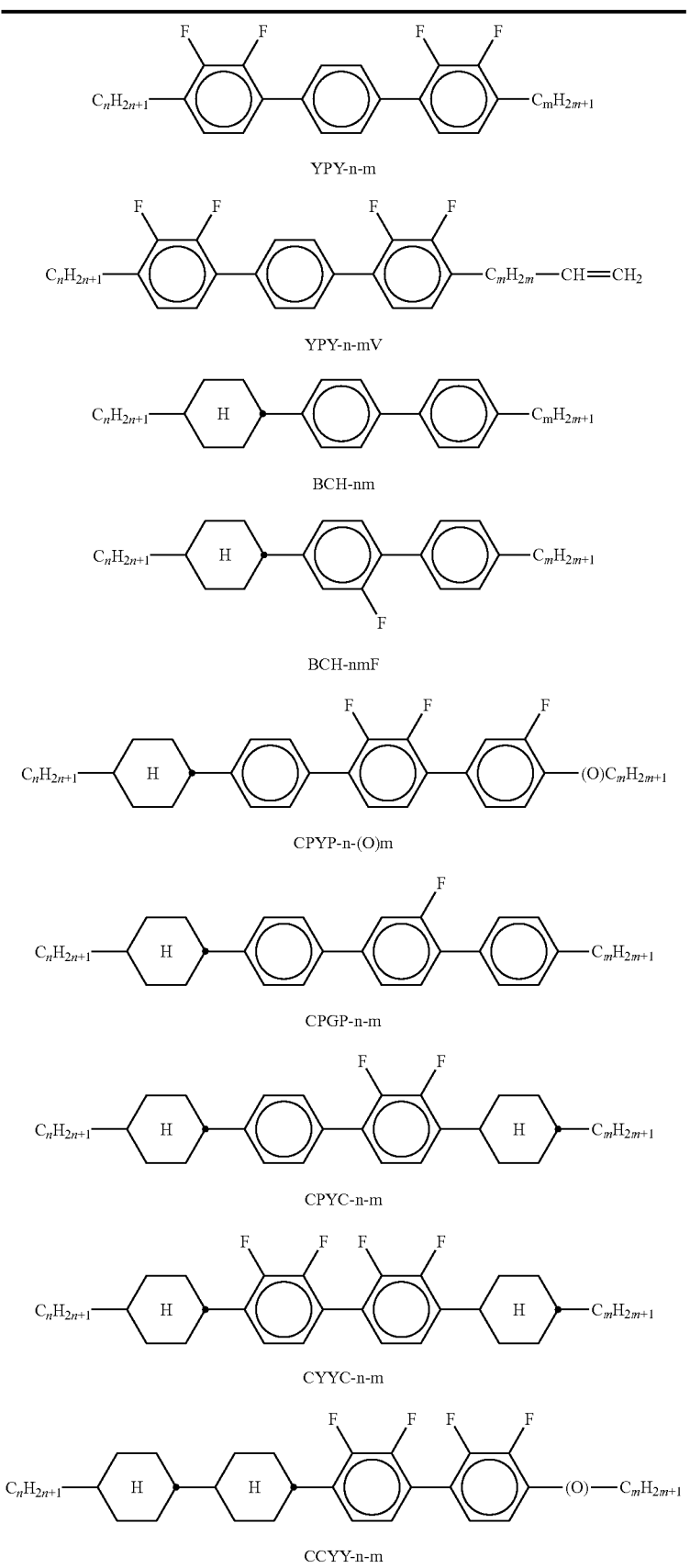

TABLE A-continued
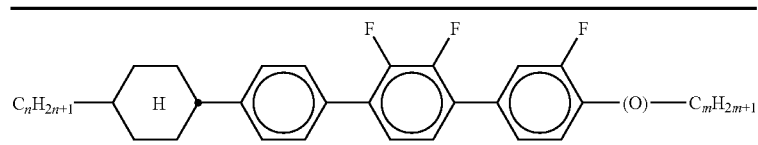
CPYG-n-(O)m
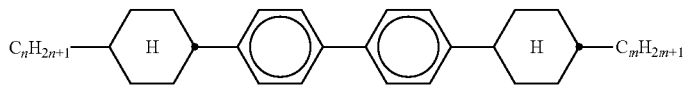
CBC-nm
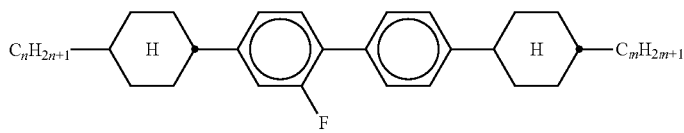
CBC-nmF
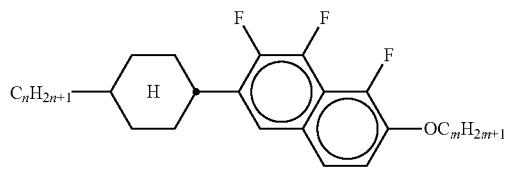
CNap-n-Om
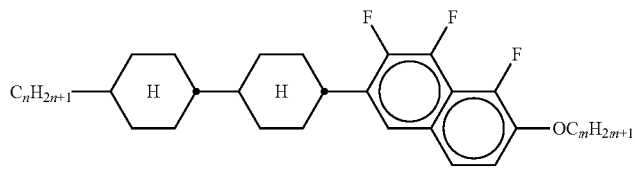
CCNap-n-Om
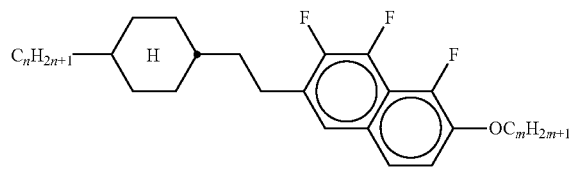
CENap-n-Om
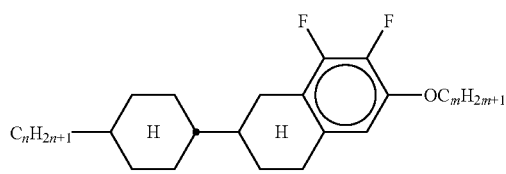
CTNap-n-Om
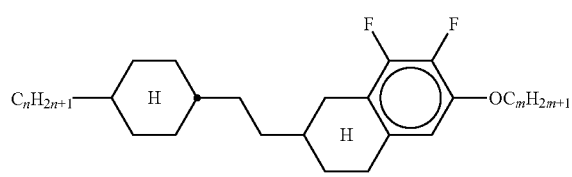
CETNap-n-Om

TABLE A-continued
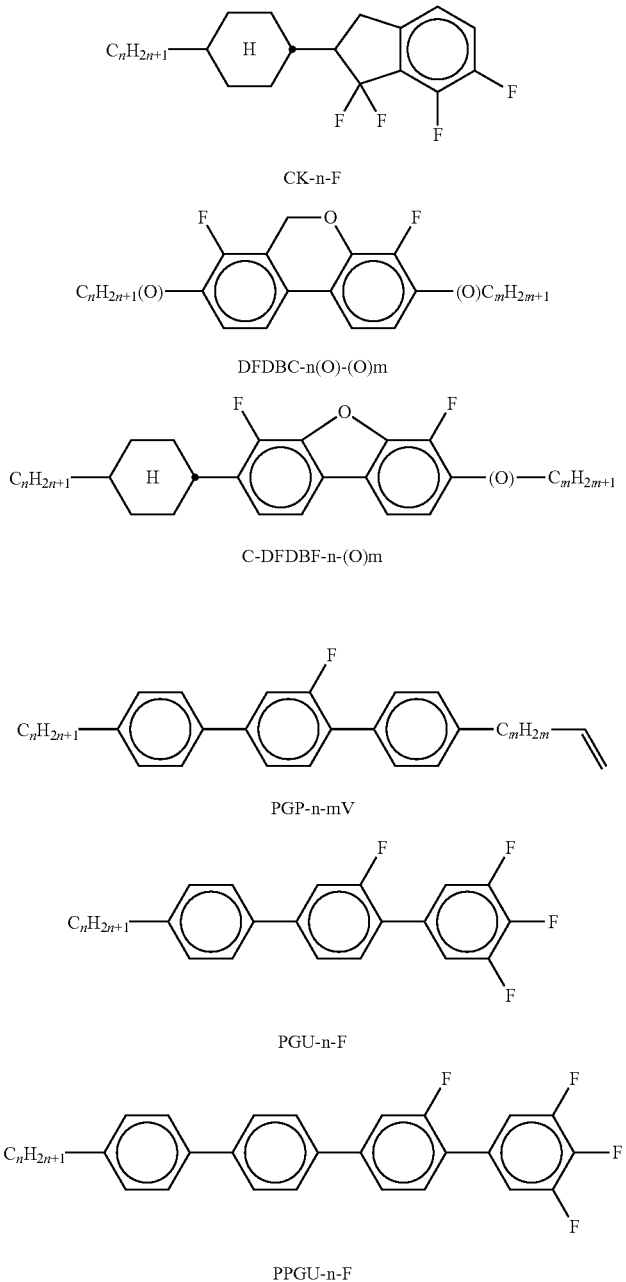
In a preferred embodiment of the present invention, the LC media according to the invention comprise one or more compounds selected from the group consisting of compounds from Table A.
TABLE B
Table B indicates possible dopants which can be added to the LC media according to the invention.
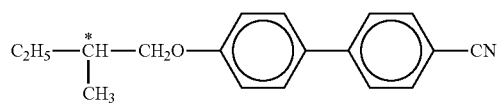
C15

TABLE B-continued
Table B indicates possible dopants which can be added to the LC media according to the invention.
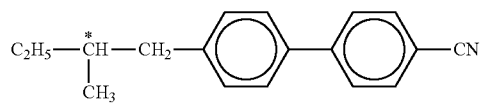 CB15
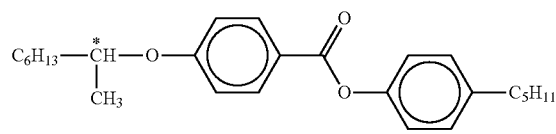 CM 21
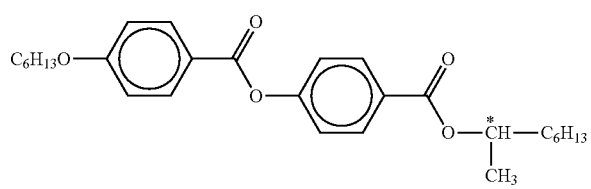 R/S-811
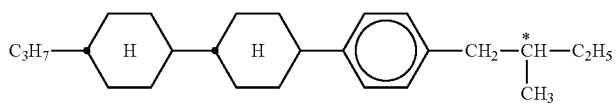 CM 44
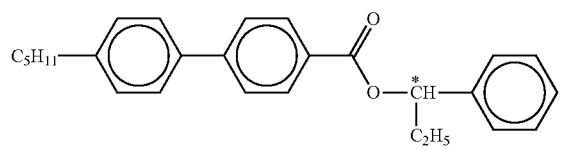 CM 45
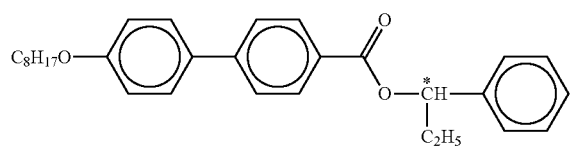 CM 47
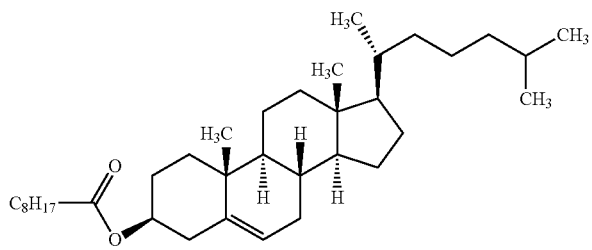 CN
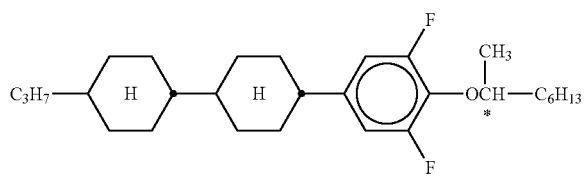 R/S-2011
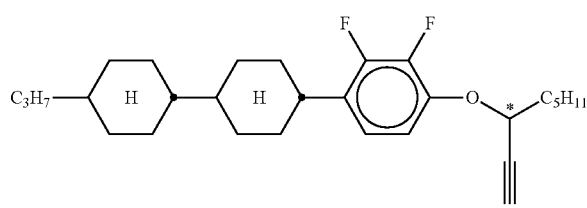 R/S-3011

TABLE B-continued

Table B indicates possible dopants which can be added to the LC media according to the invention.

R/S-4011

R/S-5011

R/S-1011

The LC media preferably comprise 0 to 10% by weight, in particular 0.01 to 5% by weight and particularly preferably 0.1 to 3% by weight, of dopants. The LC media preferably comprise one or more dopants selected from the group consisting of compounds from Table B.

TABLE C

Table C indicates possible stabilisers which can be added to the LC media according to the invention (n here denotes an integer from 1 to 12, terminal methyl groups ar not shown).

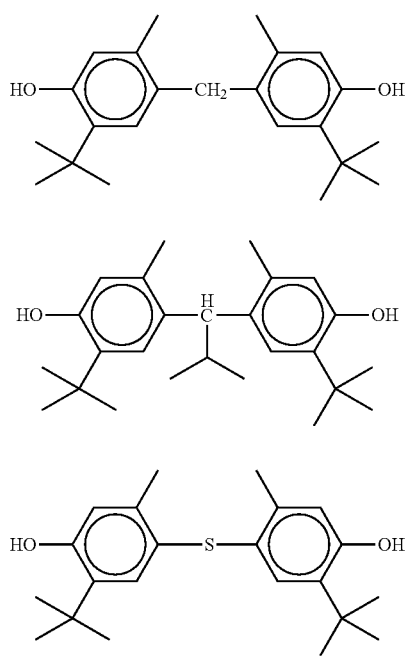

TABLE C-continued
Table C indicates possible stabilisers which can be added to the LC media according to the invention (n here denotes an integer from 1 to 12, terminal methyl groups ar not shown).
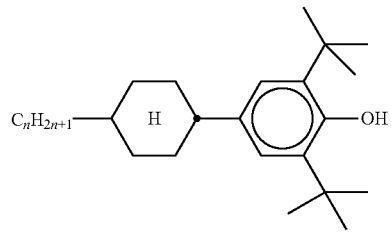
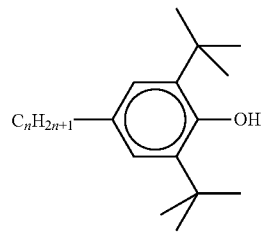
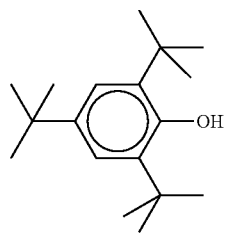
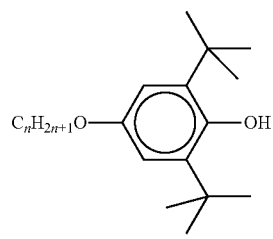
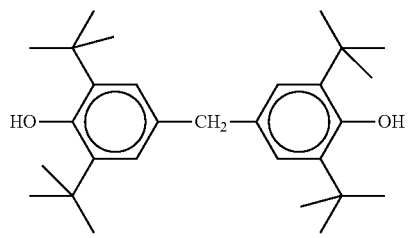
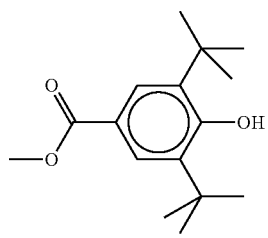

TABLE C-continued
Table C indicates possible stabilisers which can be added to the LC media according to the invention (n here denotes an integer from 1 to 12, terminal methyl groups ar not shown).
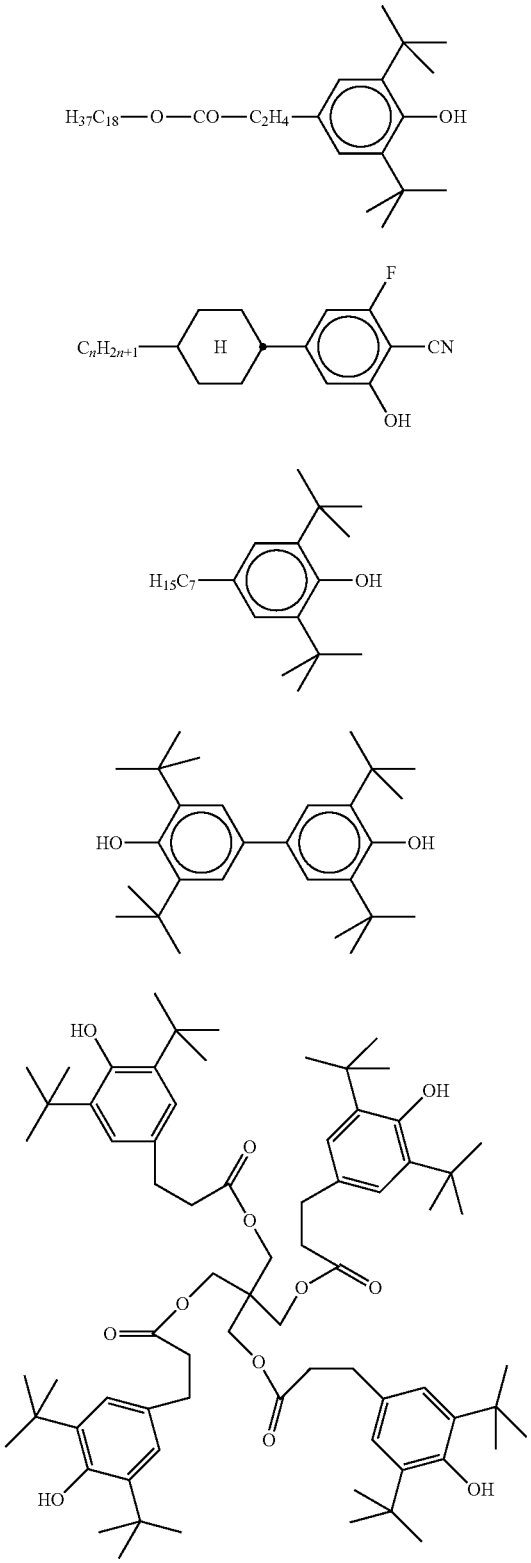

TABLE C-continued
Table C indicates possible stabilisers which can be added to the LC media according to the invention (n here denotes an integer from 1 to 12, terminal methyl groups ar not shown).
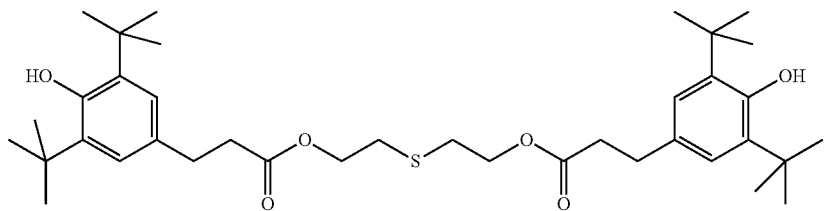 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
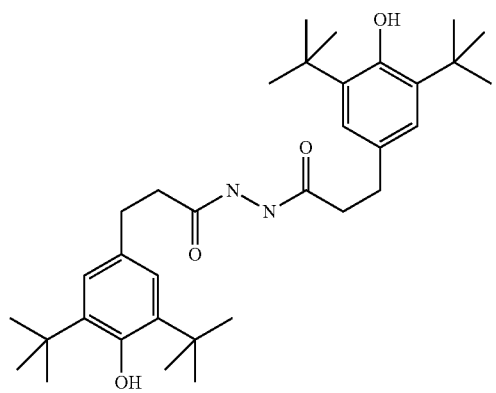 [SMILES: CC(C)(C)c1cc(CCC(=O)NNC(=O)CCc2cc(C(C)(C)C)c(O)c(C(C)(C)C)c2)cc(C(C)(C)C)c1O]
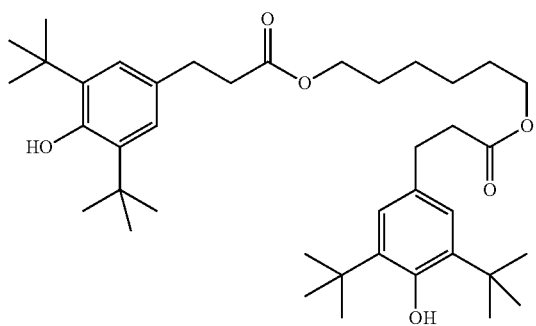 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
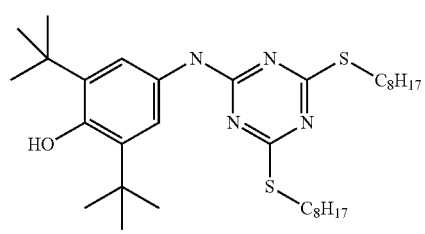

TABLE C-continued
Table C indicates possible stabilisers which can be added to the LC media according to the invention (n here denotes an integer from 1 to 12, terminal methyl groups ar not shown).
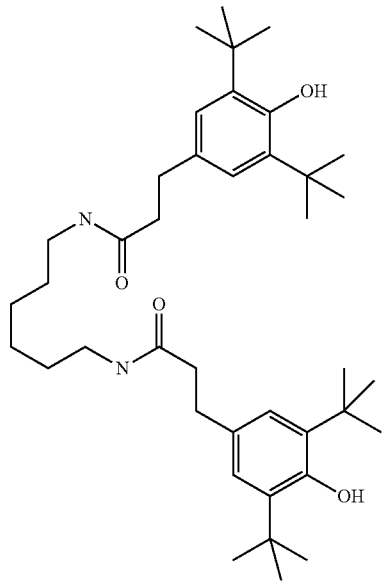 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
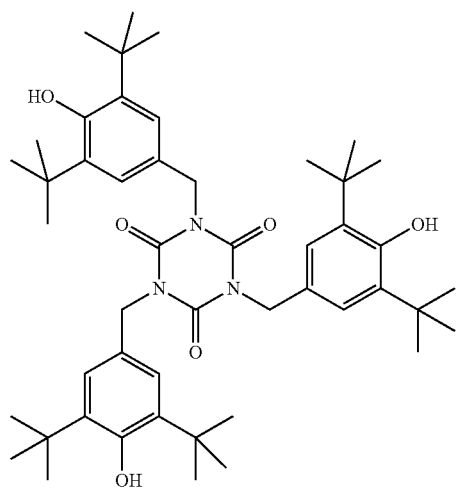 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
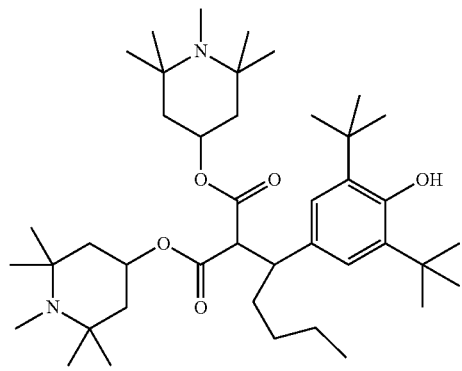 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE C-continued
Table C indicates possible stabilisers which can be added to the LC media according to the invention (n here denotes an integer from 1 to 12, terminal methyl groups ar not shown).
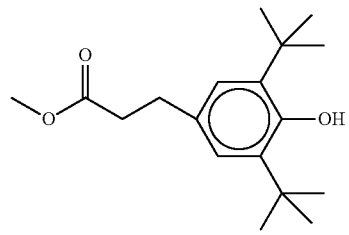
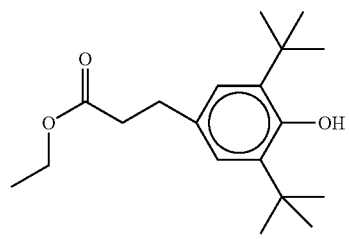
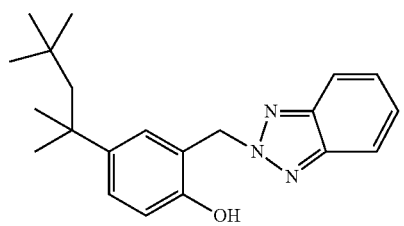 [SMILES: CC(C)(C)CC(C)(C)c1ccc(O)c(Cn2nc3ccccc3n2)c1]
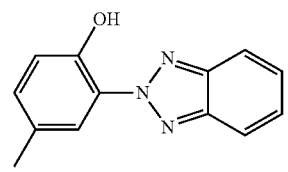 [SMILES: Cc1ccc(O)c(-n2nc3ccccc3n2)c1]
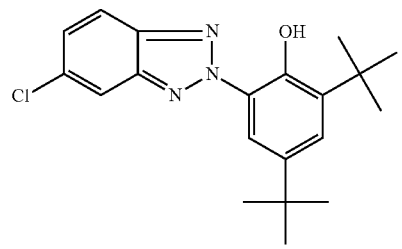 [SMILES: CC(C)(C)c1cc(-n2nc3ccc(Cl)cc3n2)c(O)c(C(C)(C)C)c1]
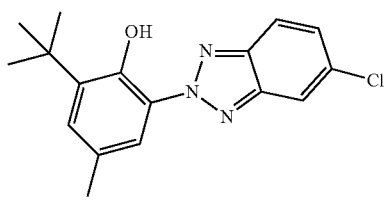 [SMILES: Cc1cc(-n2nc3ccc(Cl)cc3n2)c(O)c(C(C)(C)C)c1]

TABLE C-continued
Table C indicates possible stabilisers which can be added to the LC media according to the invention (n here denotes an integer from 1 to 12, terminal methyl groups ar not shown).
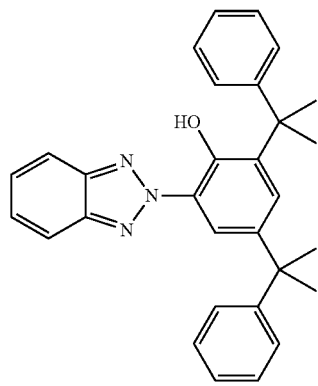 [SMILES: CC(C)(c1ccccc1)c1cc(-n2nc3ccccc3n2)c(O)c(C(C)(C)c2ccccc2)c1]
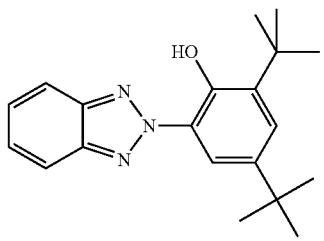 [SMILES: CC(C)(C)c1cc(-n2nc3ccccc3n2)c(O)c(C(C)(C)C)c1]
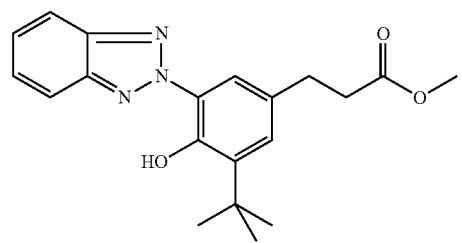 [SMILES: COC(=O)CCc1cc(-n2nc3ccccc3n2)c(O)c(C(C)(C)C)c1]
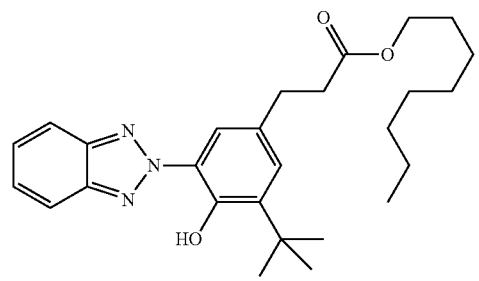 [SMILES: CCCCCCCCOC(=O)CCc1cc(-n2nc3ccccc3n2)c(O)c(C(C)(C)C)c1]

TABLE C-continued
Table C indicates possible stabilisers which can be added to the LC media according to the invention (n here denotes an integer from 1 to 12, terminal methyl groups ar not shown).
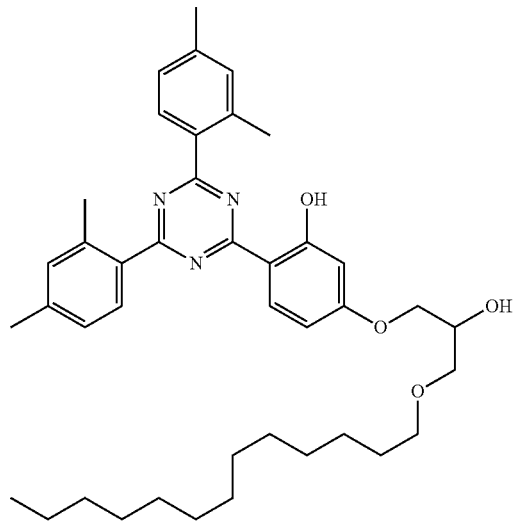 [SMILES: CCCCCCCCCCCCCOCC(O)COc1ccc(-c2nc(-c3ccc(C)cc3C)nc(-c3ccc(C)cc3C)n2)c(O)c1]
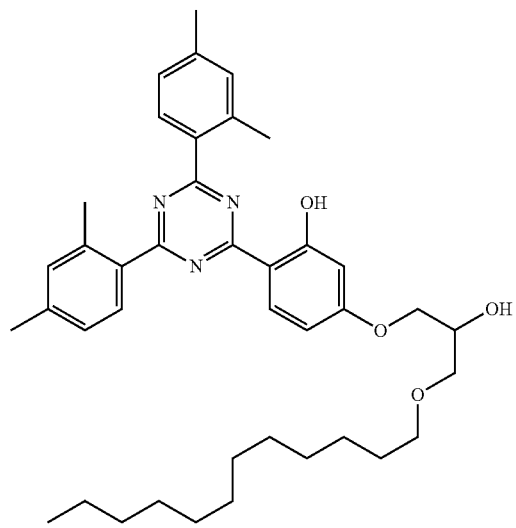 [SMILES: CCCCCCCCCCCCOCC(O)COc1ccc(-c2nc(-c3ccc(C)cc3C)nc(-c3ccc(C)cc3C)n2)c(O)c1]
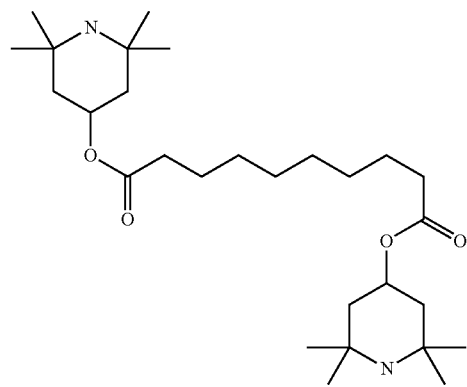

TABLE C-continued

Table C indicates possible stabilisers which can be added to the LC media according to the invention (n here denotes an integer from 1 to 12, terminal methyl groups ar not shown).

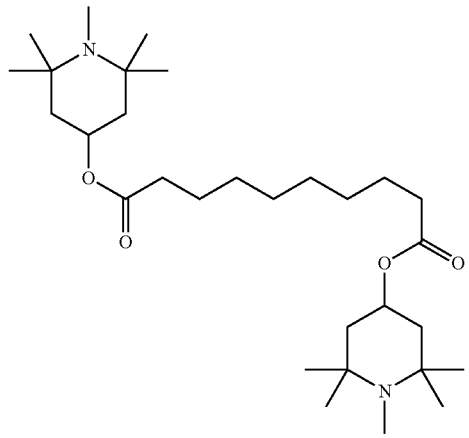

The LC media preferably comprise 0 to 10% by weight, in particular 1 ppm to 5% by weight and particularly preferably 1 ppm to 3% by weight, of stabilisers. The LC media preferably comprise one or more stabilisers selected from the group consisting of compounds from Table C.

TABLE D

Table D indicates possible reactive mesogens which can be used in the polymerizable component of LC media according to the invention.

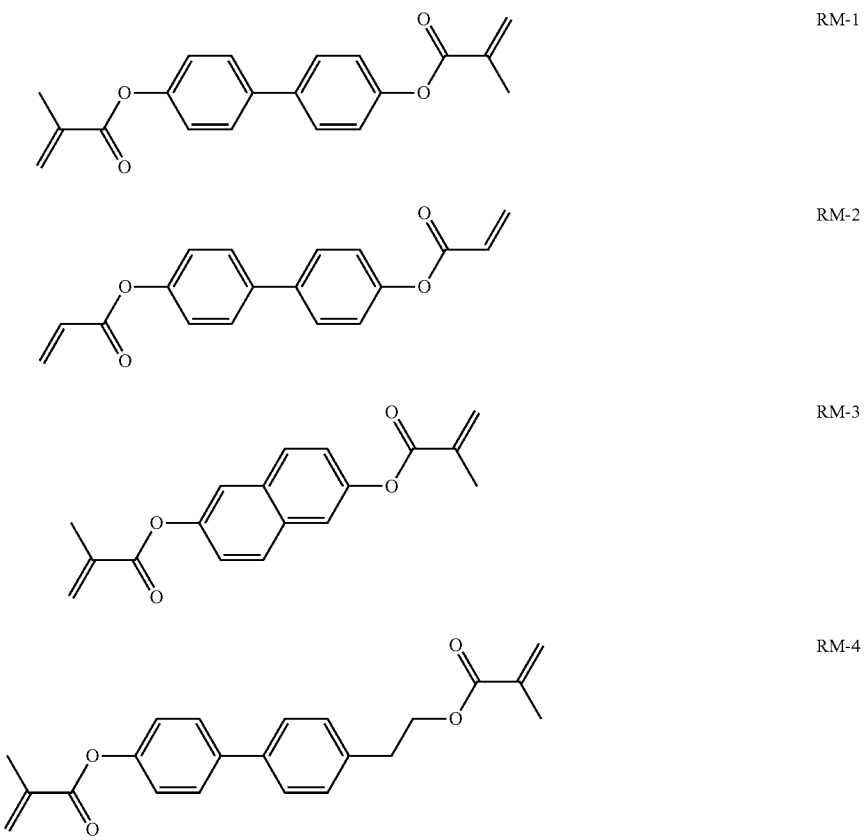

TABLE D-continued
Table D indicates possible reactive mesogens which can be used in the polymerizable component of LC media according to the invention.
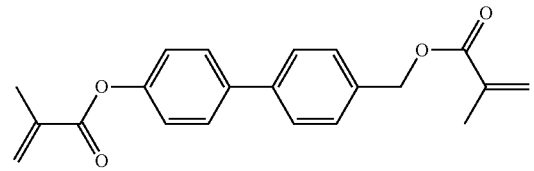 [SMILES: C=C(C)C(=O)OCc1ccc(-c2ccc(OC(=O)C(=C)C)cc2)cc1]
RM-5
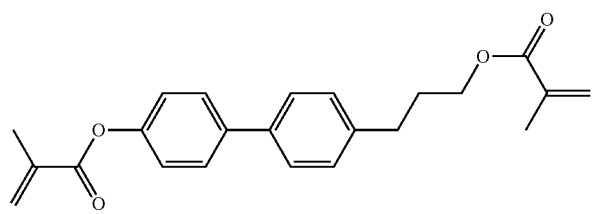 [SMILES: C=C(C)C(=O)OCCCc1ccc(-c2ccc(OC(=O)C(=C)C)cc2)cc1]
RM-6
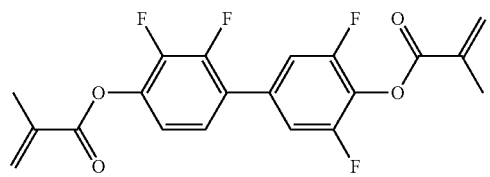
RM-7
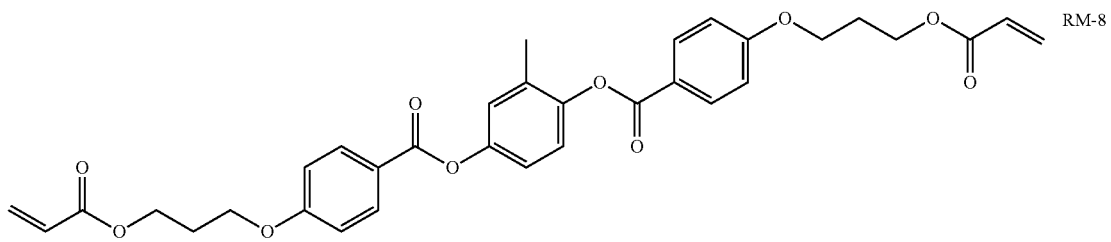
RM-8
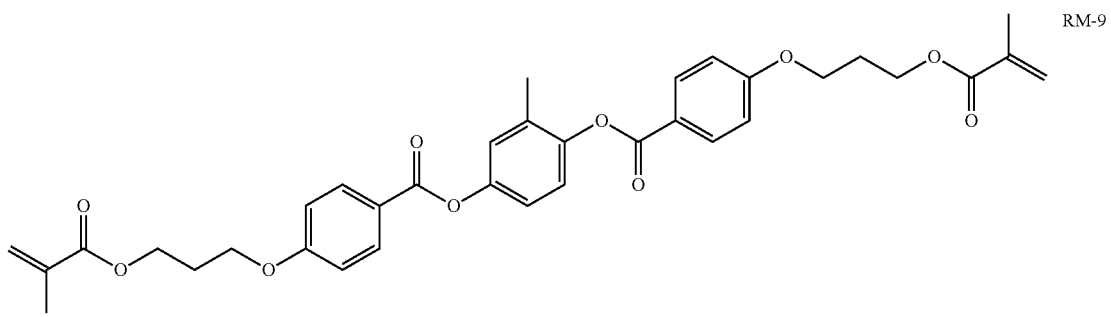
RM-9
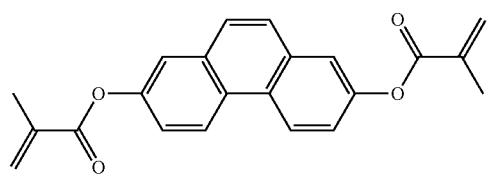
RM-10
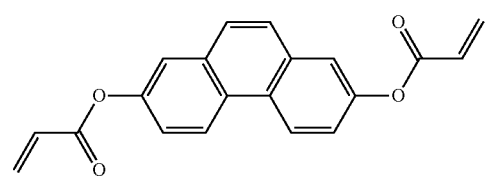
RM-11

TABLE D-continued
Table D indicates possible reactive mesogens which can be used in the polymerizable component of LC media according to the invention.
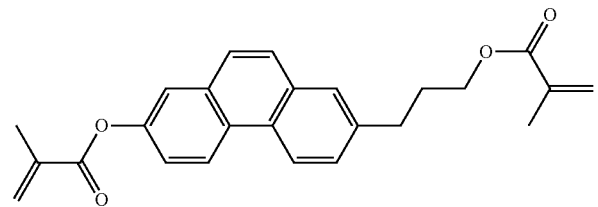
RM-12
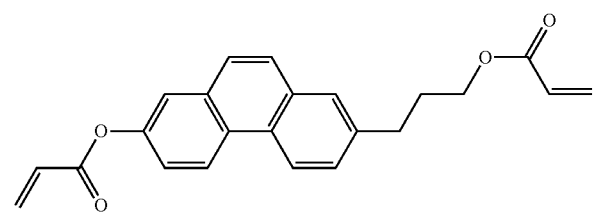
RM-13
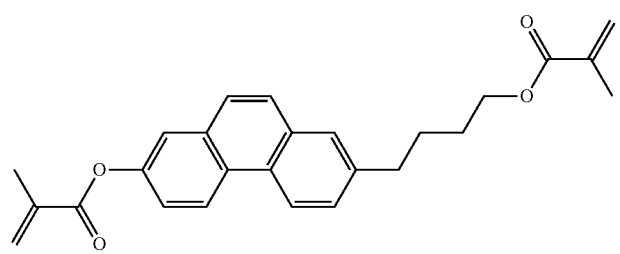
RM-14
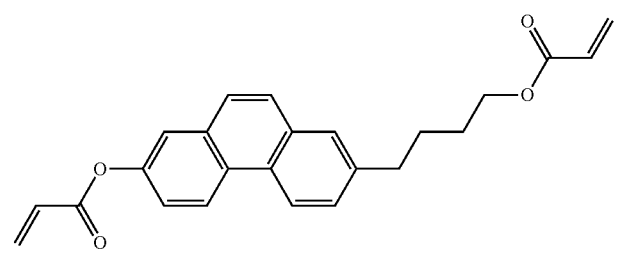
RM-15
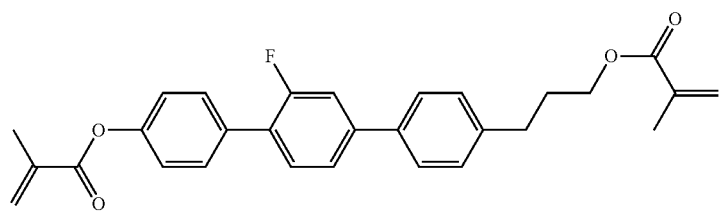
RM-16
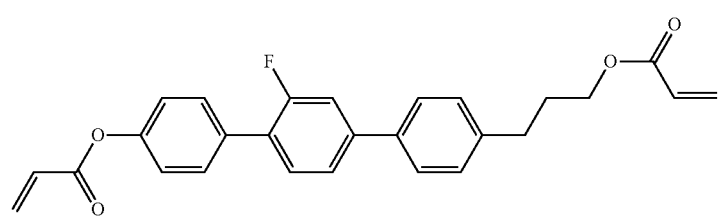
RM-17

TABLE D-continued

Table D indicates possible reactive mesogens which can be used in the
polymerizable component of LC media according to the invention.

RM-18
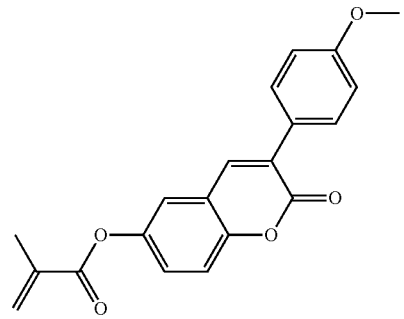

RM-19
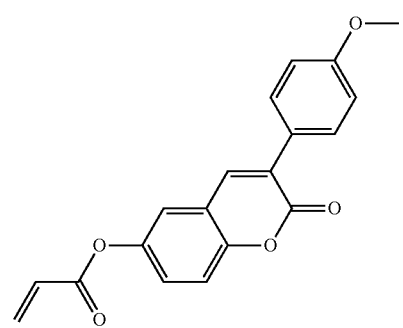

RM-20
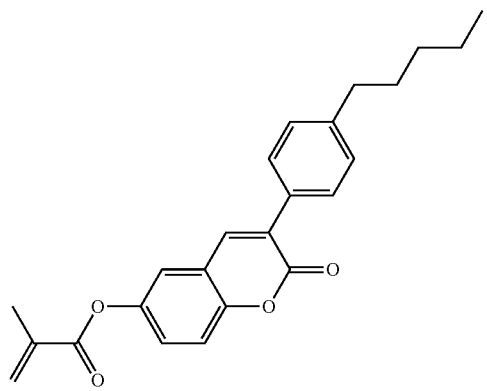

RM-21
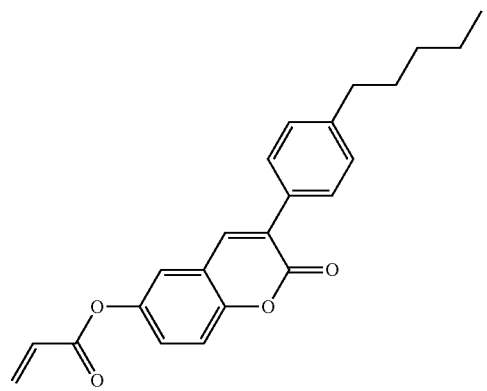

The LC media preferably comprise one or more reactive mesogens selected from the group consisting of compounds from Table D.

In addition, the following abbreviations and symbols are used:

$V_o$ denotes threshold voltage, capacitive [V] at 20° C.,
$n_e$ denotes extraordinary refractive index at 20° C. and 589 nm,
$n_o$ denotes ordinary refractive index at 20° C. and 589 nm,
$\Delta n$ denotes optical anisotropy at 20° C. and 589 nm, $\epsilon_\perp$ denotes the dielectric permittivity perpendicular to the director at 20° C. and 1 kHz,
$\epsilon_\parallel$ denotes dielectric permittivity parallel to the director at 20° C. and 1 kHz,
$\Delta\epsilon$ denotes dielectric anisotropy at 20° C. and 1 kHz,
cl.p., T(N,I) denotes clearing point [° C.],
$\gamma_1$ denotes rotational viscosity at 20° C. [mPa·s],
$K_1$ denotes elastic constant, "splay" deformation at 20° C. [pN],
$K_2$ denotes elastic constant, "twist" deformation at 20° C. [pN],
$K_3$ denotes elastic constant, "bend" deformation at 20° C. [pN],
LTS denotes low-temperature stability (phase), determined in test cells,
$HR_{20}$ denotes voltage holding ratio at 20° C. [%], and
$HR_{100}$ denotes voltage holding ratio at 100° C. [%].

Unless explicitly noted otherwise, all concentrations in the present application are indicated in percent by weight and relate to the corresponding mixture or mixture component, unless explicitly indicated otherwise.

Unless explicitly noted otherwise, all temperature values indicated in the present application, such as, for example, the melting point T(C,N), the transition from the smectic (S) to the nematic (N) phase T(S,N) and the clearing point T(N,I), are indicated in degrees Celsius (° C.).

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and ΔE is determined at 1 kHz, unless explicitly indicated otherwise in each case.

For the present invention, the term "threshold voltage" relates to the capacitive threshold ($V_0$), also known as the Freedericksz threshold, unless explicitly indicated otherwise. In the examples, as is generally usual, the optical threshold for 10% relative contrast ($V_{10}$) may also be indicated.

The display used for measurement of the capacitive threshold voltage has two plane-parallel outer plates at a separation of 4 μm and electrode layers with overlying alignment layers of rubbed polyimide on the insides of the outer plates, which cause a homeotropic edge alignment of the liquid-crystal molecules.

The polymerisable compounds are polymerised in the display by UV irradiation for a pre-determined time, with a voltage simultaneously being applied to the display (usually 10 V to 30 V alternating current, 1 kHz). In the examples, unless indicated otherwise, a 25 mW/cm² mercury vapour lamp was used, the intensity was measured using a standard UV meter (model Ushio UNI meter) fitted with a band-pass filter and/or cut-off filter transmitting the desired UV wavelengths.

The tilt angle is determined by a rotational crystal experiment (Autronic-Melchers TBA-105). A small value (i.e. a large deviation from a 90° angle) corresponds to a large tilt here.

Example 1

The following nematic LC host mixture H1 is formulated:

| | | | |
|---|---|---|---|
| CY-3-O2 | 15.00% | Cl.p. | +80.5 |
| CY-5-O4 | 8.00% | Δn | 0.0909 |
| CCY-3-O3 | 9.00% | Δε | −3.4 |
| CCY-4-O2 | 5.50% | $\epsilon_\parallel$ | 3.7 |
| CPY-2-O2 | 9.00% | $\gamma_1$ | 138 |
| CPY-3-O2 | 9.00% | | |
| CCY-3-1 | 7.00% | | |
| CCH-34 | 9.00% | | |
| CCH-25 | 5.00% | | |
| CCH-23 | 11.00% | | |
| CCH-301 | 5.00% | | |
| CCH-31 | 6.00% | | |
| PPGU-3-F | 1.00% | | |

The mixture contains the compound PPGU-3-F of formula I selected from the first sub-group (dielectrically positive) and wherein p is 1.

Example 2

The following nematic LC host mixture H2 is formulated:

| | | | |
|---|---|---|---|
| CY-3-O2 | 15.00% | Cl.p. | +80.5 |
| CY-3-O4 | 10.00% | Δn | 0.0912 |
| CCY-3-O2 | 6.50% | Δε | −3.3 |
| CCY-3-O3 | 9.00% | $\epsilon_\parallel$ | 4.2 |
| CCY-4-O2 | 8.00% | $\gamma_1$ | 144 |
| CPY-2-O2 | 8.50% | | |
| CPY-3-O2 | 6.00% | | |
| CCH-34 | 9.00% | | |
| CCH-25 | 5.00% | | |
| CCH-23 | 11.00% | | |
| CCH-301 | 3.00% | | |
| CCP-31 | 6.00% | | |
| PGU-3-F | 3.00% | | |

The mixture contains the compound PGU-3-F of formula I selected from the first sub-group (dielectrically positive) and wherein p is 0.

Example 3

The following nematic LC host mixture H3 is formulated:

| | | | |
|---|---|---|---|
| CY-3-O2 | 15.00% | Cl.p. | +80.0 |
| CY-3-O4 | 5.50% | Δn | 0.0919 |
| CCY-3-O3 | 9.00% | Δε | −3.3 |
| CCY-4-O2 | 7.00% | $\epsilon_\parallel$ | 3.5 |
| CPY-2-O2 | 8.50% | $\gamma_1$ | 125 |
| CPY-3-O2 | 9.00% | | |
| CCY-3-1 | 3.00% | | |
| CCH-34 | 9.00% | | |
| CCH-25 | 5.00% | | |
| CCH-23 | 11.00% | | |
| CCH-301 | 9.00% | | |
| CCP-31 | 6.00% | | |
| PGP-2-2V | 3.00% | | |

The mixture contains compound PGP-2-2V of formula I selected from the second sub-group (dielectrically neutral or negative) and wherein p is 0.

Example 4

The following nematic LC host mixture H4 is formulated:

| | | | |
|---|---|---|---|
| CY-3-O2 | 15.00% | Cl.p. | +80.0 |
| CY-3-O4 | 5.50% | Δn | 0.0916 |
| CCY-3-O3 | 9.00% | Δε | −3.3 |
| CCY-4-O2 | 8.00% | $\epsilon_\parallel$ | 3.5 |
| CPY-2-O2 | 8.50% | $\gamma_1$ | 130 |
| CPY-3-O2 | 9.00% | | |
| CCY-3-1 | 3.00% | | |

-continued

| | |
|---|---|
| CCH-34 | 9.00% |
| CCH-25 | 5.00% |
| CCH-23 | 11.00% |
| CCH-301 | 9.00% |
| CCP-31 | 5.00% |
| PGP-2-3 | 3.00% |

The mixture contains compound PGP-2-3 of formula I selected from the second sub-group (dielectrically neutral or negative) and wherein p is 0.

Example 5

The following nematic LC host mixture H5 is formulated:

| | | | |
|---|---|---|---|
| CY-3-O2 | 15.00% | Cl.p. | +80.5 |
| CY-3-O4 | 4.50% | Δn | 0.0915 |
| CCY-3-O3 | 9.00% | Δε | −3.3 |
| CCY-4-O2 | 7.00% | ε∥ | 3.5 |
| CPY-2-O2 | 9.00% | γ₁ | 130 |
| CPY-3-O2 | 9.00% | | |
| CCY-3-1 | 4.00% | | |
| CCH-34 | 9.00% | | |
| CCH-25 | 5.00% | | |
| CCH-23 | 11.00% | | |
| CCH-301 | 8.50% | | |
| CCP-31 | 6.00% | | |
| PYP-2-4 | 3.00% | | |

The mixture contains compound PYP-2-4 of formula I selected from the second sub-group (dielectrically neutral or negative) and wherein p is 0.

Example 6

The following nematic LC host mixture H6 is formulated:

| | | | |
|---|---|---|---|
| CY-3-O4 | 19.50% | Cl.p. | +79.5 |
| CY-5-O2 | 10.00% | Δn | 0.1059 |
| CCY-3-O2 | 11.00% | Δε | −5.0 |
| CCY-3-O3 | 4.00% | ε∥ | 4.1 |
| CCY-4-O2 | 9.00% | γ₁ | 189 |
| CPY-2-O2 | 10.00% | | |
| CPY-3-O2 | 10.00% | | |
| CCH-23 | 10.00% | | |
| CCH-34 | 3.00% | | |
| CCH-301 | 7.00% | | |
| PYP-2-3 | 6.00% | | |
| PPGU-3-F | 0.50% | | |

The mixture contains the compound PPGU-3-F of formula I selected from the first sub-group (dielectrically positive) wherein p is 1, and the compound PYP-2-3 of formula I selected from the second sub-group (dielectrically neutral or negative) wherein p is 0.

To the nematic LC host mixture H6 0.20% of either the reactive mesogen R1 or the reactive mesogen R4, respectively, as shown below are added to form the polymerisable LC media M61 and M64, respectively.

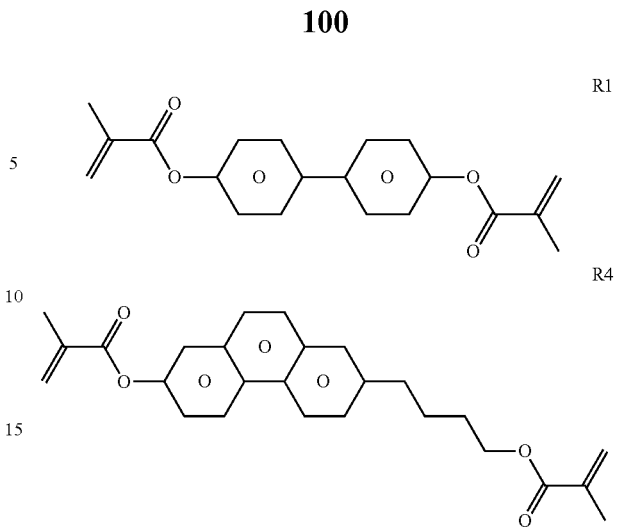

The LC media M61 and M64 are filled into test cells prepared as described above, and exposed to UV light (25 mW, 4 min) using a wide band pass filter with 300 nm<λ<400 nm, to photopolymerise the reactive mesogen.

Example 7

The following nematic LC host mixture H7 is formulated:

| | | | |
|---|---|---|---|
| CY-3-O4 | 19.00% | Cl.p. | +79.5 |
| CY-5-O2 | 10.00% | Δn | 0.1135 |
| CCY-3-O2 | 11.00% | Δε | −5.0 |
| CCY-3-O3 | 3.00% | ε∥ | 4.1 |
| CCY-4-O2 | 8.50% | γ₁ | 198 |
| CPY-2-O2 | 10.00% | | |
| CPY-3-O2 | 10.00% | | |
| CCH-23 | 10.50% | | |
| CCH-301 | 7.50% | | |
| PYP-2-3 | 10.00% | | |
| PPGU-3-F | 0.50% | | |

The mixture contains the compound PPGU-3-F of formula I selected from the first sub-group (dielectrically positive) wherein p is 1, and the compound PYP-2-3 of formula I selected from the second sub-group (dielectrically neutral or negative) wherein p is 0.

To the nematic LC host mixture H7 0.20% of the reactive mesogen R1 are added to form the polymerisable LC medium M7. The LC medium M7 is filled into a test cell prepared as described above, and exposed to UV light (25 mW, 4 min) using a wide band pass filter with 300 nm<λ<400 nm, to photopolymerise the reactive mesogen.

Example 8

The following nematic LC host mixture H8 is formulated:

| | | | |
|---|---|---|---|
| CCH-35 | 7.00% | Cl.p. | +82.1 |
| CCH-501 | 6.00% | Δn | 0.1030 |
| CCY-2-1 | 5.00% | Δε | −3.4 |
| CCY-3-1 | 5.00% | ε∥ | 3.6 |
| CCY-3-O2 | 10.00% | γ₁ | 184 |
| CCY-5-O2 | 8.00% | | |
| CPY-2-O2 | 12.50% | | |
| CY-3-O4 | 12.50% | | |
| CY-5-O4 | 12.50% | | |
| PCH-53 | 10.00% | | |
| BCH-32 | 6.00% | | |

-continued

| | |
|---|---|
| BCH-52 | 6.00% |
| PPGU-3-F | 0.50% |

The mixture contains the compound PPGU-3-F of formula I selected from the first sub-group (dielectrically positive) wherein p is 1.

To the nematic LC host mixture H8 0.30% of the reactive mesogen R1 are added to form the polymerisable LC medium M8. The LC medium M8 is filled into a test cell prepared as described above, and exposed to UV light (25 mW, 4 min) using a wide band pass filter with 300 nm<λ<400 nm, to photopolymerise the reactive mesogen.

Example 9

The following nematic LC host mixture H9 is formulated:

| | | | |
|---|---|---|---|
| CC-3-V1 | 6.00% | Cl.p. | +105.2 |
| CC-3-V | 14.00% | Δn | 0.1265 |
| CCPC-33 | 1.00% | Δε | −3.5 |
| CCY-3-O2 | 7.00% | ε∥ | 3.5 |
| CCY-3-O3 | 7.50% | γ₁ | 189 |
| CCY-4-O2 | 9.50% | | |
| CPY-2-O2 | 11.00% | | |
| CPY-3-O2 | 10.00% | | |
| CY-3-O2 | 9.00% | | |
| CY-3-O4 | 2.50% | | |
| PGP-2-3 | 2.50% | | |
| PGP-2-4 | 6.00% | | |
| PYP-2-3 | 7.50% | | |
| CCH-34 | 4.00% | | |
| CCH-35 | 2.50% | | |

The mixture contains the compounds PGP-2-3, PGP-2-4 and PYP-2-3 of formula I selected from the second sub-group (dielectrically neutral or negative) wherein p is 0.

To the nematic LC host mixture H9 0.30% of the reactive mesogen R1 are added to form the polymerisable LC medium M9. The LC medium M9 is filled into a test cell prepared as described above, and exposed to UV light (25 mW, 4 min) using a wide band pass filter with 300 nm<λ<400 nm, to photopolymerise the reactive mesogen.

Example 10

The following nematic LC host mixture H10 is formulated:

| | | | |
|---|---|---|---|
| CC-3-V1 | 6.50% | Cl.p. | +112.5 |
| CC-3-V | 12.50% | Δn | 0.1275 |
| CCPC-33 | 2.00% | Δε | −3.5 |
| CCPC-35 | 1.50% | ε∥ | 3.5 |
| CCY-3-O2 | 7.00% | γ₁ | 217 |
| CCY-3-O3 | 7.00% | | |
| CCY-4-O2 | 10.00% | | |
| CPY-2-O2 | 10.00% | | |
| CPY-3-O2 | 11.00% | | |
| CY-3-O2 | 10.00% | | |
| CY-3-O4 | 2.00% | | |
| PGP-2-3 | 4.00% | | |
| PGP-2-4 | 6.00% | | |
| PYP-2-3 | 5.00% | | |
| CCH-34 | 1.50% | | |
| CCH-35 | 4.00% | | |

The mixture contains the compounds PGP-2-3, PGP-2-4 and PYP-2-3 of formula I selected from the second sub-group (dielectrically neutral or negative) wherein p is 0.

To the nematic LC host mixture H10 0.30% of the reactive mesogen R1 are added to form the polymerisable LC medium M20. The LC medium M10 is filled into a test cell prepared as described above, and exposed to UV light (25 mW, 4 min) using a wide band pass filter with 300 nm<λ<400 nm, to photopolymerise the reactive mesogen.

Comparative Example 1

The following nematic LC host mixture HC is formulated:

| | | | |
|---|---|---|---|
| CY-3-O4 | 14.00% | Cl.p. | +80.5 |
| CCY-3-O2 | 9.00% | Δn | 0.0909 |
| CCY-3-O3 | 9.00% | Δε | −3.4 |
| CPY-2-O2 | 10.00% | ε∥ | 3.7 |
| CPY-3-O2 | 10.00% | γ₁ | 138 |
| CCY-3-1 | 8.00% | | |
| CCH-34 | 9.00% | | |
| CCH-35 | 9.00% | | |
| PCH-53 | 10.00% | | |
| CCH-301 | 6.00% | | |
| CCH-303 | 9.00% | | |

The mixture does not contain a compound of formula I according to the present invention.

Use Example A

To each of the nematic LC host mixtures H1-H5 of Examples 1-5 and the nematic LC host mixture HC of comparative Example 6, respectively, 0.20% of the reactive mesogen R1

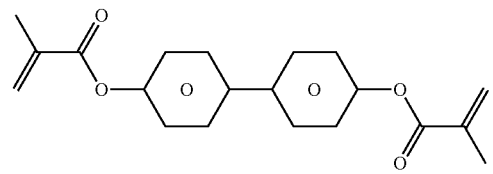

R1 are added to give the polymerisable LC media M1-M5 and MC, respectively.

The LC media M1-M5 and MC are filled into test cells prepared as described above, and exposed to UV light (25 mW, 4 min) using a wide band pass filter with 300 nm<λ<400 nm, to photopolymerise the reactive mesogen. The pretilt angle generated in the LC host mixture after polymerisation is determined as described above. The results are shown in Table 1 below.

TABLE 1

| Mixture | M1 | M2 | M3 | M4 | M5 | MC |
|---|---|---|---|---|---|---|
| Tilt angle/° | 86.8 | 85.4 | 85.6 | 85.5 | 85.6 | 88.1 |

It can be seen that, in the LC media M1-M5 wherein the LC host mixture contains a compound of formula I according to the present invention, a smaller tilt angle was generated than in the LC medium MC, wherein the LC host mixture does not contain a compound of formula I.

Use Example B

The LC media M1-M5 of Example A are filled into test cells and exposed to UV light as described in Use Example A, but using a cut-off filter with λ>320 nm instead of the band pass filter, to photopolymerise the reactive mesogen. The pretilt angle generated in the LC host mixture after polymerisation is determined as described above. The results are shown in Table 2 below.

TABLE 2

|  | Mixture | | | | |
| --- | --- | --- | --- | --- | --- |
|  | M1 | M2 | M3 | M4 | M5 |
| Tilt angle/° | 87.9 | 88.4 | 88.6 | 88.5 | 89.2 |

It can be seen that even with higher wavelengths a pretilt angle can be generated. In LC medium M1, which contains a compound of formula I wherein p is 1, the tilt angle from the vertical direction is even larger than in LC media M2-M5 containing a compound of formula I wherein p is 0.

This shows that the LC media according to the present invention, especially those containing a compound of formula I wherein p is 1, are also suitable for preparing PSA displays by polymerisation at a longer UV wavelength.

Use Example C

To each of the nematic LC host mixtures H1, H4 and H5 of Examples 1, 4 and 5, 0.20% of one of the reactive mesogens R1, R2 and R3 are added:

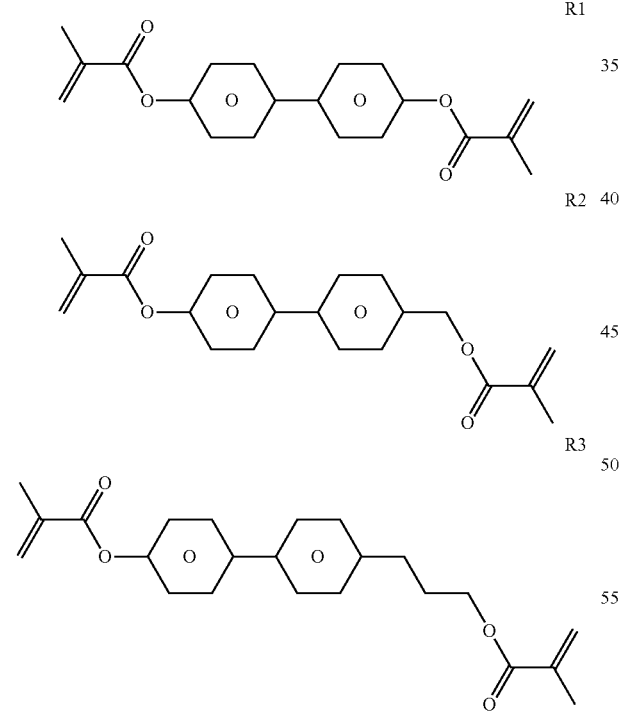

In compound R1, both polymerizable functional groups are attached directly to the mesogenic core. In compounds R2 and R3 one of the polymerizable functional groups is attached to the mesogenic core via a spacer group and the other is attached directly. The compositions of the resulting polymerisable LC media M11-M53 are shown in Table 3 below.

TABLE 3

| Mixture | M11 | M12 | M13 | M41 | M42 | M43 | M51 | M52 | M53 |
| --- | --- | --- | --- | --- | --- | --- | --- | --- | --- |
| Host (99.8%) | H1 | H1 | H1 | H4 | H4 | H4 | H5 | H5 | H5 |
| RM (0.2%) | R1 | R2 | R3 | R1 | R2 | R3 | R1 | R2 | R3 |

The LC media M11-M53 are then filled into test cells as described in Use Example A, and exposed to UV light (25 mW, 4 min) using a wide band pass filter with 300 nm<λ<400 nm, to photopolymerise the reactive mesogen. The pretilt angle generated in the LC host mixture after polymerisation is determined as described above. The results are shown in Table 4 below.

TABLE 4

| Mixture | M11 | M12 | M13 | M41 | M42 | M43 | M51 | M52 | M53 |
| --- | --- | --- | --- | --- | --- | --- | --- | --- | --- |
| Tilt angle/° | 86.8 | 88.3 | 88.2 | 85.5 | 88.0 | 87.8 | 85.6 | 87.9 | 88.0 |

When comparing the effect of the reactive mesogen, it can be seen that in the LC media M11, M41 and M51 containing the reactive mesogen R1 (without spacer groups) the smallest tilt angle is generated, compared to the other LC media containing the reactive mesogen R2 or R3.

When comparing the effect of the host mixture, it can be seen that in the LC media M11, M12 and M13 containing the LC host mixture H1 with a compound of formula I wherein p is 1, the variation of the tilt angle when using different reactive mesogens is smaller, compared to LC media containing the LC host mixture H4 or H5.

This shows that compounds of formula I wherein p is 1, and LC media containing them, are especially suitable for preparing PSA displays using reactive mesogens either with or without a spacer group.

The invention claimed is:
1. A PS or PSA display comprising a liquid crystalline mixture having a negative dielectric anisotropy Δ∈ and
one or more polymerizable compounds or reactive mesogens, or a polymer obtained by polymerizing one or more polymerizable compounds or reactive mesogens,
wherein the liquid crystalline mixture comprises one or more compounds of formula I

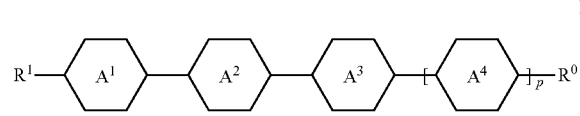

in which

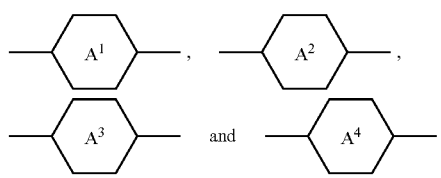

denote independently of each other

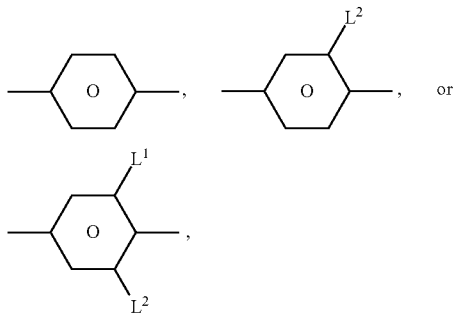

R$^1$ denotes alkyl or alkenyl having 1 to 12 C atoms, in which optionally one or two non-adjacent CH$_2$ groups are replaced by —O—, —CH=CH—, —CO—, —OCO— or —COO— in such a way that 0 atoms are not linked directly to one another, R$^0$ has one of the meanings given for R$^1$ or denotes X$^0$, X$^0$ is F, Cl, halogenated alkyl or alkoxy having 1 to 6 C atoms, or halogenated alkenyl or alkenyloxy having 2 to 6 C atoms, L$^1$ and L$^2$ each, independently of one another, denote F, Cl, OCF$_3$, CF$_3$, CH$_3$, CH$_2$F, CHF$_2$, and p denotes 1, and wherein one or more compounds of formula I contain one or more rings

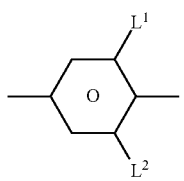

and/or two or more rings

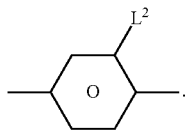

2. A PS or PSA display according to claim 1, wherein a compound of formula I is of one of the following formulae:

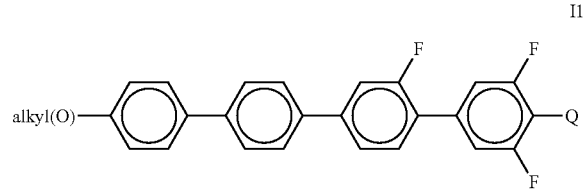

I1

-continued

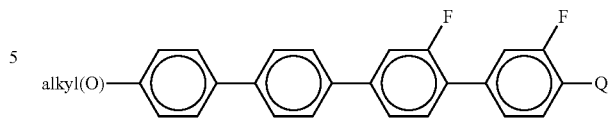

I3 wherein
alkyl denotes a straight-chain alkyl radical with 1 to 6 C atoms, (O) denotes an O atom or a single bond, and
Q denotes F or OCF$_3$.

3. A PS or PSA display according to claim 1, wherein the LC mixture additionally comprises one or more compounds selected from compounds of the following formulae:

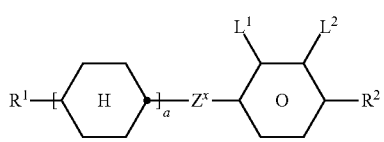

CY

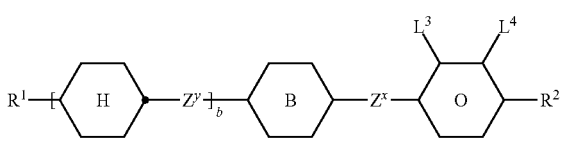

PY wherein
a denotes 1 or 2,
b denotes 0 or 1,

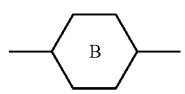

denotes

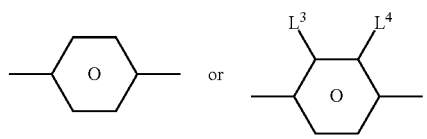

R$^1$ and R$^2$ each, independently of one another, denote alkyl or alkenyl having 1 to 12 C atoms, in which one or two non-adjacent CH$_2$ groups are optionally replaced by —O—, —CH=CH—, —CO—, —OCO— or —COO— in such a way that O atoms are not linked directly to one another, Z$^x$ and Z$^y$ each, independently of one another, denote —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O—, or a single bond, and L$^{1-4}$ each, independently of one another, denote F, Cl, OCF$_3$, CF$_3$, CH$_3$, CH$_2$F, or CHF$_2$.

4. A PS or PSA display according to claim 3, wherein the LC mixture comprises one or more compounds of formulae CY, and/or PY, which contain an alkenyl group.

5. A PS or PSA display according to claim 3, wherein in formula CY and PY,
$Z^x$ and $Z^y$ denote a single bond.

6. A PS or PSA display according to claim 3, wherein in formula CY and PY,
$L^{1-4}$ denote F or Cl.

7. A PS or PSA display according to claim 1, wherein the LC mixture additionally comprises one or more compounds selected from compounds of the following formulae:

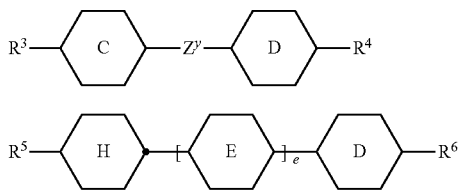

in which

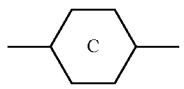

denotes

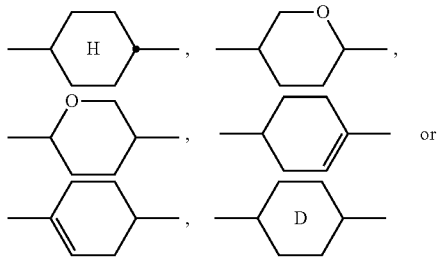

denotes

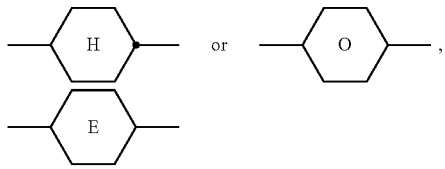

denotes

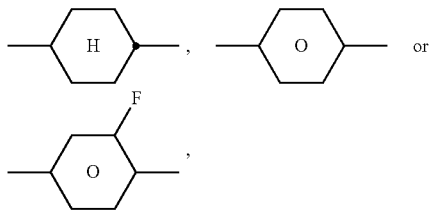

$R^3$ and $R^4$ each, independently of one another, denote alkyl having 1 to 12 C atoms, in which one or two non-adjacent $CH_2$ groups are optionally replaced by —O—, —CH=CH—, —CO—, —OCO— or —COO— in such a way that O atoms are not linked directly to one another, $Z^y$ denotes —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —$CH$=$CHCH_2O$— or a single bond, $R^5$ and $R^6$ each, independently of one another, denote alkyl or alkenyl having 1 to 12 C atoms, in which optionally one or two non-adjacent $CH_2$ groups are replaced by —O—, —CH=CH—, —CO—, —OCO— or —COO— in such a way that O atoms are not linked directly to one another, and e denotes 1 or 2.

8. A PS or PSA display according to claim 7, wherein the LC mixture comprises one or more compounds of formulae ZK and/or DK, which contain an alkenyl group.

9. A PS or PSA display according to claim 7, wherein in formula DK,
$Z^y$ denotes a single bond.

10. A PS or PSA display according to claim 7, wherein the LC mixture contains one or more compounds of formula ZK3

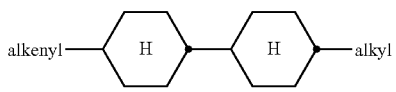

in which
alkyl denotes a straight-chain alkyl radical having 1-6 C atoms, and
alkenyl denotes a straight-chain alkenyl radical having 2-6 C atoms.

11. A PS or PSA display according to claim 1, wherein the one or more polymerizable compounds or reactive mesogens are of formula I* or II*

$$R^a\text{—}B^1\text{—}(Z^1\text{—}B^2)_{m1}\text{—}R^b \qquad \text{I*}$$

$$(R^*\text{—}(B^1\text{—}Z^1)_{m1})_k\text{-}Q \qquad \text{II*}$$

in which
$R^a$ and $R^b$ each, independently of one another, denote P, P-Sp-, H, halogen, $SF_5$, $NO_2$, a carbyl group or hydrocarbyl group, where at least one of the radicals $R^a$ and $R^b$ denotes P-Sp-,
P on each occurrence, identically or differently, denotes a polymerizable group,
Sp on each occurrence, identically or differently, denotes a spacer group or a single bond,
$B^1$ and $B^2$ each, independently of one another, denote an aromatic, heteroaromatic, alicyclic or heterocyclic group, which optionally contains fused rings, and which is optionally mono- or polysubstituted by L,
$Z^1$ on each occurrence, identically or differently, denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCO—CH=CH—, $CR^0R^{00}$ or a single bond,
L denotes P, P-Sp-, H, OH, $CH_2OH$, halogen, $SF_5$, $NO_2$, a carbyl group or hydrocarbyl group,
$R^0$ and $R^{00}$ each, independently of one another, denote H or alkyl having 1 to 12 C atoms, m1 denotes 0, 1, 2, 3 or 4,
n1 denotes 1, 2, 3 or 4,
R* on each occurrence, identically or differently, denotes P, P-Sp-, H, halogen, $SF_5$, $NO_2$, a carbyl group or hydrocarbyl group,
Q denotes a k-valent chiral group, which is optionally mono- or poly-substituted by L, and
k denotes 1, 2, 3, 4, 5 or 6.

12. A PS or PSA display according to claim 11, wherein in the compounds of formula I* and II*,
$B^1$ and $B^2$ each, independently of one another, denote 1,4-phenylene, naphthalene-1,4-diyl, naphthalen-2,6-diyl, phenanthrene-2,7-diyl, anthracene-2,7-diyl, fluorene-2,7-diyl, coumarin, or flavon, in any of which, one or more CH groups are optionally replaced by N, cyclohexane-1,4-diyl, in which one or more non-adjacent $CH_2$ groups are optionally replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl, octahydro-4,7-methanoindane-2,5-diyl, or phenanthrene-2,7-diyl, wherein any of which is unsubstituted or mono- or polysubstituted by L,
L denotes P, P-Sp-, OH, $CH_2OH$, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl having 6 to 20 C atoms, straight-chain or branched alkyl or alkoxy having 1 to 25 C atoms, or straight-chain or branched alkenyl, alkinyl, alkylcarbonyl, alkoxycarbonyl, alkylcarbonyloxy or alkoxycarbonyloxy having 2 to 25 C atoms, wherein in any of which one or more H atoms are optionally replaced by F, Cl or P-Sp-,
$Y^1$ denotes halogen, and
$R^x$ denotes P, P-Sp-, H, halogen, straight-chain, branched or cyclic alkyl having 1 to 25 C atoms, in which one or more non-adjacent $CH_2$ groups are optionally replaced by —O—, —S—, —CO—, —CO—O—, —O—CO—, or —O—CO—O— in such a way that O and/or S atoms are not linked directly to one another, and in which one or more H atoms are optionally replaced by F, Cl or P-Sp-, an optionally substituted aryl or aryloxy group having 6 to 40 C atoms, or an optionally substituted heteroaryl or heteroaryloxy group having 2 to 40 C atoms,
wherein at least one of the radicals $R^a$, $R^b$ and L denotes P or P-Sp-.

13. A PS or PSA display according to claim 11, wherein a compound of formula I* is of formulae I*1 to I*18

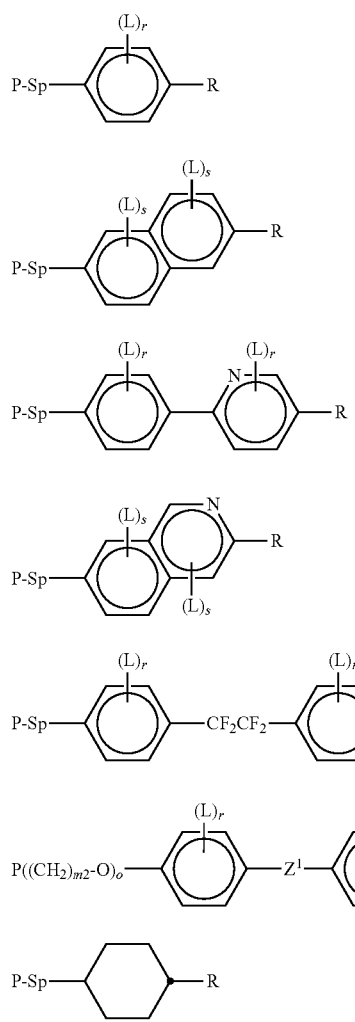

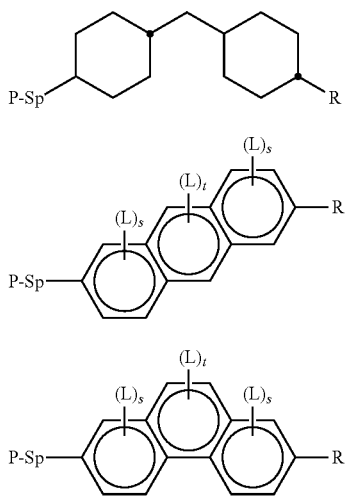

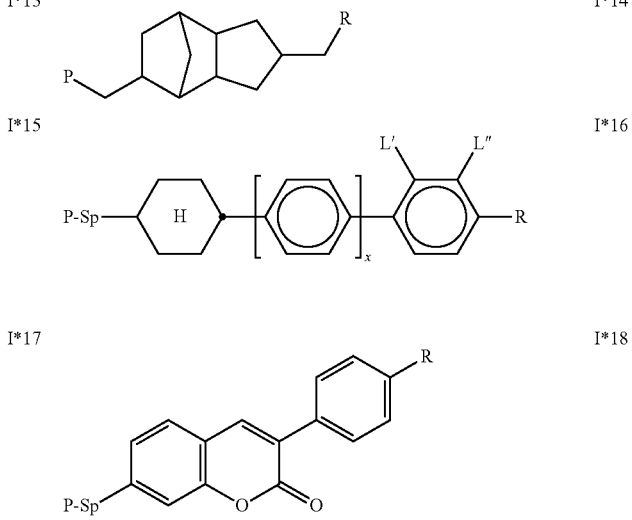

in which
P, Sp, L and $Z^1$ on each occurrence, identically or differently, are defined as for the compound of formula I*,
R denotes P, P-Sp-, H, halogen, straight-chain, branched or cyclic alkyl having 1 to 25 C atoms, in which one or more non-adjacent $CH_2$ groups are optionally replaced by —O—, —S—, —CO—, —CO—O—, —O—CO—, or —O—CO—O— in such a way that O and/or S atoms are not linked directly to one another, and in which one or more H atoms are optionally replaced by F, Cl or P-Sp-, an optionally substituted aryl or aryloxy group having 6 to 40 C atoms, or an optionally substituted heteroaryl or heteroaryloxy group having 2 to 40 C atoms,
$Z^x$ denotes —O—, —CO— or $CR^yR^z$,
$R^y$ and $R^z$ denote, independently of one another, H, F, $CH_3$ or $CF_3$,
L' and L" have the meaning of L for the compound of formula I*,
m2 and m3 each, independently of one another, denote an integer from 1 to 8,
o denotes 0 or 1,
r denotes 0, 1, 2, 3 or 4,
s denotes 0, 1, 2 or 3,
t denotes 0, 1 or 2, and
x denotes 0 or 1.

14. A PS or PSA display according to claim 13, wherein a compound of formula I* is of formulae I*1 to I*15 and I*17 to I*18.

15. A PS or PSA display according to claim 11, wherein in formula I*,
P is a vinyloxy, acrylate, methacrylate, fluoroacrylate, chloroacrylate, oxetane or epoxide group.

16. A PS or PSA display according to claim 11, wherein in formula I*,
Sp is Sp'-X',
X' is —O—, —S—, —CO—, —OCO—, —COO—, —O—COO—, —CO—$NR^0$—, —$NR^0$—CO—, —$NR^0$—CO—$NR^0$— or a single bond,
Sp' is —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —$(SiR^0R^{00}$—O$)_{p1}$—,
p1 is an integer from 1 to 12,
q1 is an integer from 1 to 3, and
$R^0$ and $R^{00}$ each, independently of one another, denote H or alkyl having 1 to 12 C atoms.

17. A PS or PSA display according to claim 11, wherein a compound of formula I* is of formulae RM-1 to RM-21

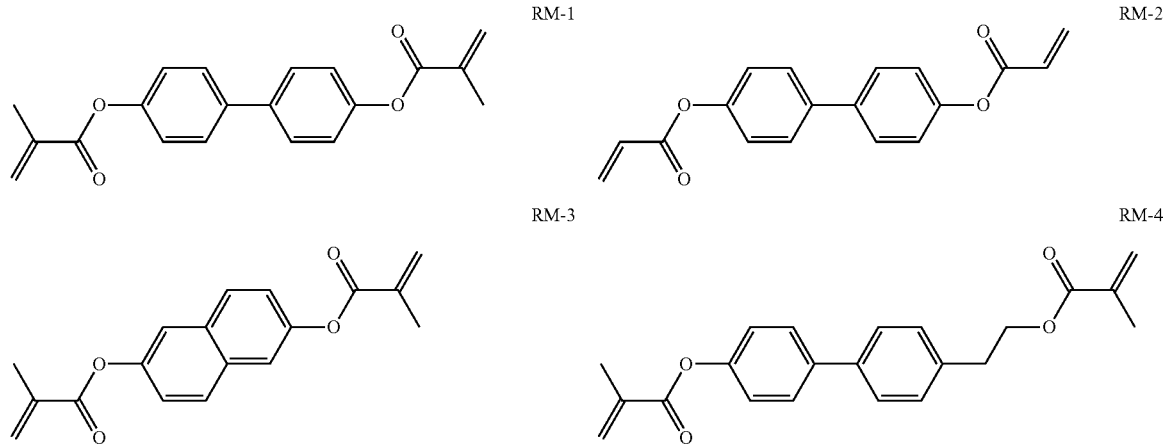

-continued
RM-5
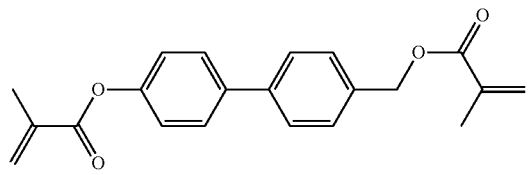
RM-6
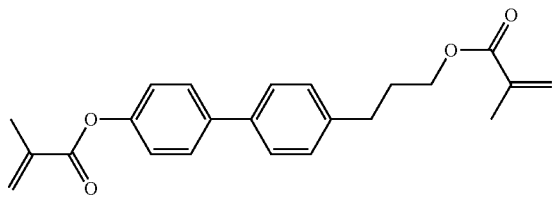
RM-7
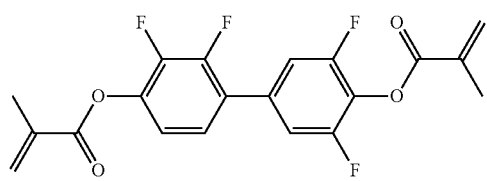 [SMILES: C=C(C)C(=O)Oc1ccc(-c2cc(F)c(OC(=O)C(=C)C)c(F)c2)c(F)c1F]
RM-8
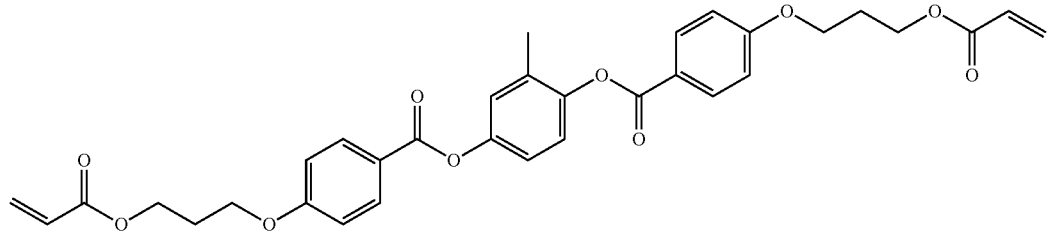 [SMILES: C=CC(=O)OCCCOc1ccc(C(=O)Oc2ccc(OC(=O)c3ccc(OCCCOC(=O)C=C)cc3)c(C)c2)cc1]
RM-9
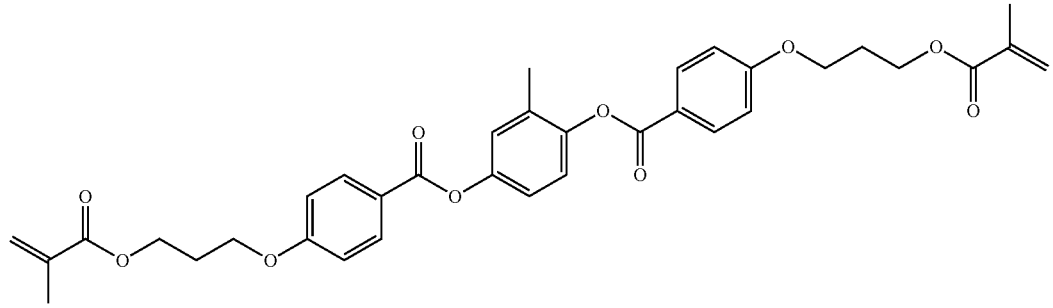 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-10
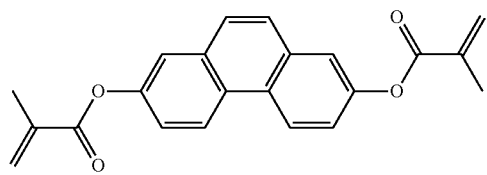 [SMILES: C=C(C)C(=O)Oc1ccc2c(ccc3cc(OC(=O)C(=C)C)ccc32)c1]
RM-11
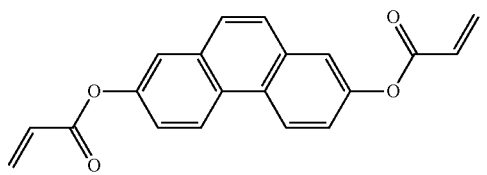 [SMILES: C=CC(=O)Oc1ccc2c(ccc3cc(OC(=O)C=C)ccc32)c1]
RM-12
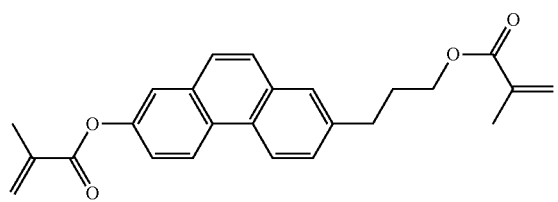 [SMILES: C=C(C)C(=O)OCCCc1ccc2c(ccc3cc(OC(=O)C(=C)C)ccc32)c1]
RM-13
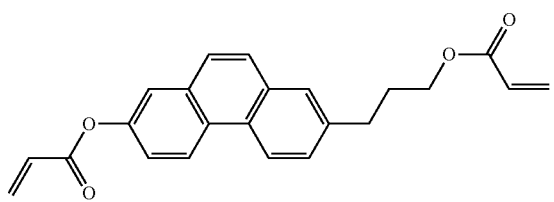 [SMILES: C=CC(=O)OCCCc1ccc2c(ccc3cc(OC(=O)C=C)ccc32)c1]
RM-14
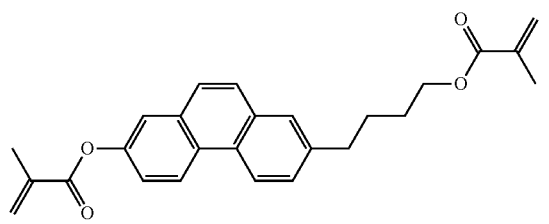 [SMILES: C=C(C)C(=O)OCCCCc1ccc2c(ccc3cc(OC(=O)C(=C)C)ccc32)c1]
RM-15
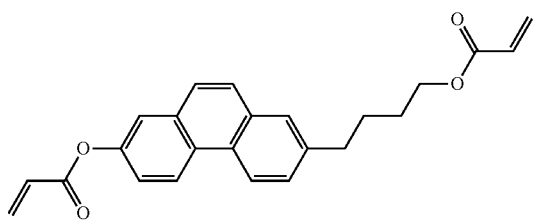 [SMILES: C=CC(=O)OCCCCc1ccc2c(ccc3cc(OC(=O)C=C)ccc32)c1]

-continued

RM-16
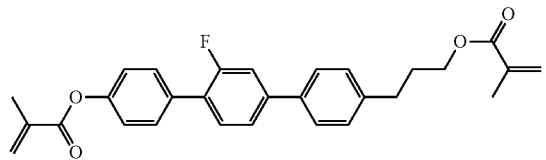 [SMILES: C=C(C)C(=O)OCCCc1ccc(-c2ccc(-c3ccc(OC(=O)C(=C)C)cc3)c(F)c2)cc1]

RM-17
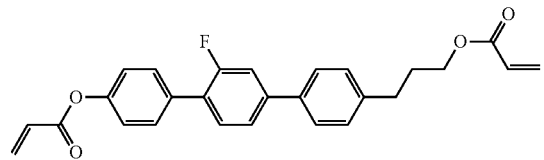

RM-18
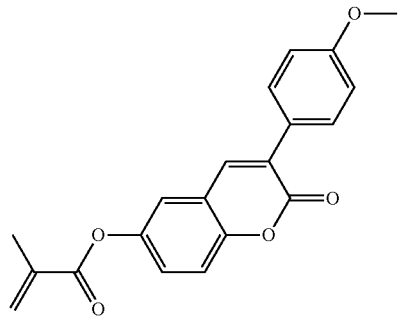 [SMILES: C=C(C)C(=O)Oc1ccc2oc(=O)c(-c3ccc(OC)cc3)cc2c1]

RM-19
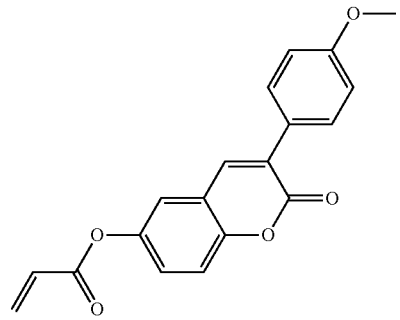 [SMILES: C=CC(=O)Oc1ccc2oc(=O)c(-c3ccc(OC)cc3)cc2c1]

RM-20
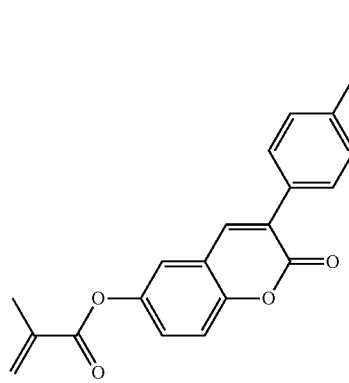

RM-21
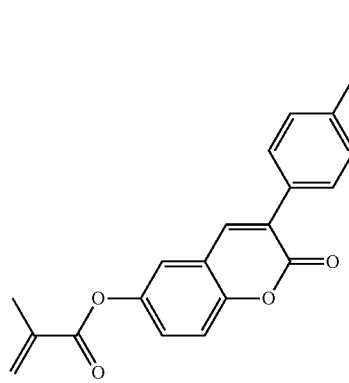

18. A PS or PSA display according to claim 1, which is a display of the PS-VA or PS-IPS mode.

19. A PS or PSA display according to claim 1, wherein the one or more polymerizable compounds or reactive mesogens are polymerized.

20. A PS or PSA display according to claim 1, wherein in formula I,
$L^1$ and $L^2$ denote F or Cl.

21. A PS or PSA display according to claim 1, wherein in formula I,
$R^1$ is straight chain alkyl or alkoxy having 1 to 6 C atoms or straight chain alkenyl having 2 to 6 C atoms.

22. A PS or PSA display according to claim 1, wherein a compound of formula I contains one or more rings

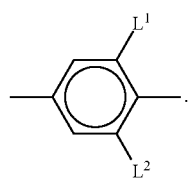

23. A PS or PSA display containing a display cell comprising two substrates and two electrodes, wherein at least one substrate is transparent to light and at least one substrate has one or two electrodes provided thereon, and a layer of an LC medium having a negative dielectric anisotropy $\Delta\epsilon$ comprising a polymerized component and a low-molecular-weight component located between the substrates, wherein the polymerized component is obtainable by polymerization of one or more polymerizable compounds between the substrates of the display cell in the LC medium, optionally while applying a voltage to the electrodes, wherein the low-molecular-weight component is an LC mixture comprising one or more compounds of formula I

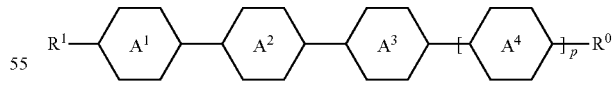  I in which

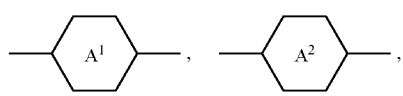

-continued

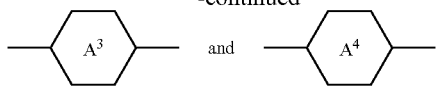

denote independently of each other

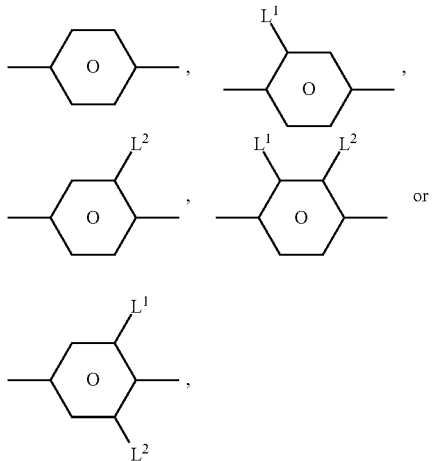

$R^1$ denotes alkyl or alkenyl having 1 to 12 C atoms, in which one or two non-adjacent $CH_2$ groups are optionally replaced by —O—, —CH=CH—, —CO—, —OCO— or —COO— in such a way that O atoms are not linked directly to one another, $R^0$ has one of the meanings given for $R^1$ or denotes $X^0$, $X^0$ is F, Cl, halogenated alkyl or alkoxy having 1 to 6 C atoms, or halogenated alkenyl or alkenyloxy having 2 to 6 C atoms, $L^1$ and $L^2$ each, independently of one another, denote F, Cl, $OCF_3$, $CF_3$, $CH_3$, $CH_2F$, $CHF_2$, and p denotes 1.

24. A method for preparing a PS or PSA display according to claim 23, comprising providing an LC medium comprising one or more polymerizable compounds and the LC mixture into a display cell comprising two substrates and two electrodes, wherein at least one substrate is transparent to light and at least one substrate has one or two electrodes provided thereon, and polymerizing one or more of the polymerizable compounds, optionally while applying a voltage to the electrodes.

25. A method according to claim 24, wherein the polymerizable compounds are polymerized by exposure to UV light having a wavelength from 320 nm to 400 nm.

* * * * *